US006934756B2

(12) United States Patent
Maes

(10) Patent No.: US 6,934,756 B2
(45) Date of Patent: Aug. 23, 2005

(54) CONVERSATIONAL NETWORKING VIA TRANSPORT, CODING AND CONTROL CONVERSATIONAL PROTOCOLS

(75) Inventor: Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 10/104,925

(22) Filed: Mar. 21, 2002

(65) Prior Publication Data

US 2002/0184373 A1 Dec. 5, 2002

Related U.S. Application Data

(63) Continuation-in-part of application No. 09/703,574, filed on Nov. 1, 2001.
(60) Provisional application No. 60/277,770, filed on Mar. 21, 2001.

(51) Int. Cl.[7] .............................................. G06F 15/16
(52) U.S. Cl. ........................ 709/227; 709/203; 709/230; 704/270.1; 370/352; 370/356
(58) Field of Search ........................ 709/227–230, 709/203; 718/105; 704/257, 270; 370/352, 356

(56) References Cited

U.S. PATENT DOCUMENTS

| 5,960,399 | A | * | 9/1999 | Barclay et al. | 704/720.1 |
|---|---|---|---|---|---|
| 6,233,235 | B1 | * | 5/2001 | Burke et al. | 370/356 |
| 6,771,639 | B1 | * | 8/2004 | Holden | 370/352 |
| 2002/0120760 | A1 | * | 8/2002 | Kimchi et al. | 709/230 |
| 2002/0129236 | A1 | * | 9/2002 | Nuutinen | 713/151 |
| 2004/0047437 | A1 | * | 3/2004 | Hamiti et al. | 375/326 |

* cited by examiner

*Primary Examiner*—Wen-Tai Lin
(74) *Attorney, Agent, or Firm*—Frank V. DeRosa

(57) ABSTRACT

A system and method for implementing conversational protocols for distributed conversational networking architectures and/or distributed conversational applications, as well as real-time conversational computing between network-connected pervasive computing devices and/or servers over a computer network. The implementation of distributed conversational systems/applications according to the present invention is based, in part, on a suitably defined conversational coding, transport and control protocols. The control protocols include session control protocols, protocols for exchanging of speech meta-information, and speech engine remote control protocols.

21 Claims, 27 Drawing Sheets

FIG. 4 – RecoVC File Header

| Field Name | M/O | Number of Bytes | Value(s) | Description |
|---|---|---|---|---|
| Recovc magic number | M | 4 bytes | 0x2E727663 | A fixed value which equals ".rvc" in ASCII representation. Used to verify that this is indeed a Recovc file. |
| Header length | M | 2 byte | 13-(2^16-1) | Total number of bytes in this header |
| Version Major | M | 1 byte | 0-255 | File format major version number |
| Version Minor | M | 1 byte | 0-255 | File format minor version number |
| Frame duration | M | 1 byte | 0x00 | Index into the frame duration table below. |
| Frames per block | M | 1 byte | 1-255 | Each block can contain one intra-frame only, or one intra-frame with up to 244 additional inter-frames. |
| Sampling rate | M | 1 byte | 0x00, 0x01 or 0x02 | Index into sampling rate table below. |
| Cepstra dimension | M | 1 byte | 0x00 or 0x01 | Index into Cepstra vector dimension / type below |
| Language | M | 1 byte | 0x00 | Index into language table below |
| Profile | M | 1 byte | 0x00 or 0x01 | Index into profile table below |
| Total frames | O | 4 bytes | 0-(2^32-2) or 0xFFFFFFFF | Total number of audio frames in this file, INCLUDING silence frames. |
| Total speech frames | O | 4 bytes | 0-(2^32-2) or 0xFFFFFFFF | Total number of audio frames in this file, EXCLUDING silence frames. |
| <Ancillary Data> | O | | | Reserved for future usage |

Frame Duration Table

| Code | Duration (msec) |
|---|---|
| 0x00 | 10 |
| 0x01-0xFF | Reserved |

Sampling Rate Table

| Code | Input Sampling Rate [Hz] |
|---|---|
| 0x00 | 8000 |
| 0x01 | 11025 (or 11000) |
| 0x02 | 16000 |
| 0x03 | 22050 (or 22000) |
| 0x04-0xFF | Reserved |

Cepstra Vector Dimension/type Table

| Code | Value |
|---|---|
| 0x00 | 13 |
| 0x01 | 24 |
| 0x02-0xFF | Reserved |

Language Table

| Code | Description |
|---|---|
| 0x00 | English |
| 0x01-0xFF | Reserved |

FIG. 5

Profile Table

| Code | Description |
|---|---|
| 0x00 | Recognition only-Only Cepstra is available in this file |
| 0x01 | Reconstruction enabled-Cepstra and pitch is available in the file |
| 0x02-0xFF | Reserved |

Speech and Silence Segment Headers (5 Byte)

| Field Name | M/O | Number of bytes | Value(s) | Description |
|---|---|---|---|---|
| Segment type | M | 1 byte | 0x00 or 0x01 | Index into segment type table below (speech or silence) |
| Number of frames | M | 4 bytes | $0-(2^{31}-2)$ or 0xFFFFFFFF | The total number of frames in this segment. |

End of Stream and Data Segment Headers

| Field Name | M/O | Number of bytes | Value(s) | Description |
|---|---|---|---|---|
| Segment type | M | 1 byte | 0x02 or 0x03-0xFF | Index into segment type table below (end of stream or data) |
| Segment length | M | 4 bytes | $5-(2^{31}-1)$ | The total number of bytes in this segment. |
| <Ancillary Data> | O | | | Place optional data here |

FIG. 6

Protocols structure:

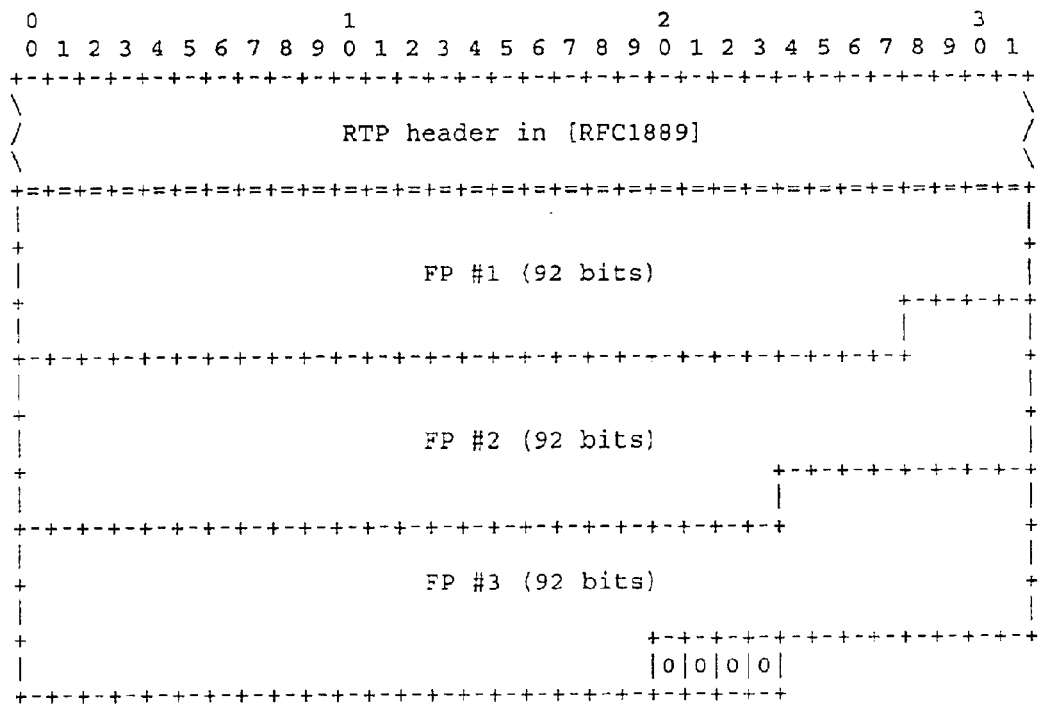
(a)
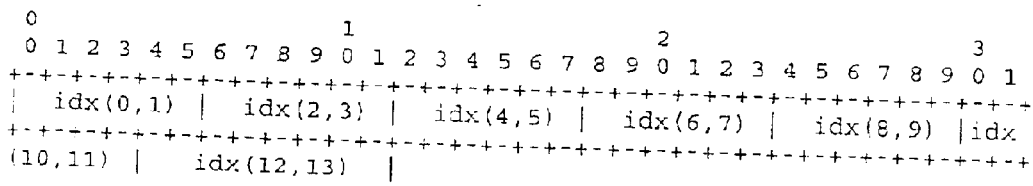
(b)
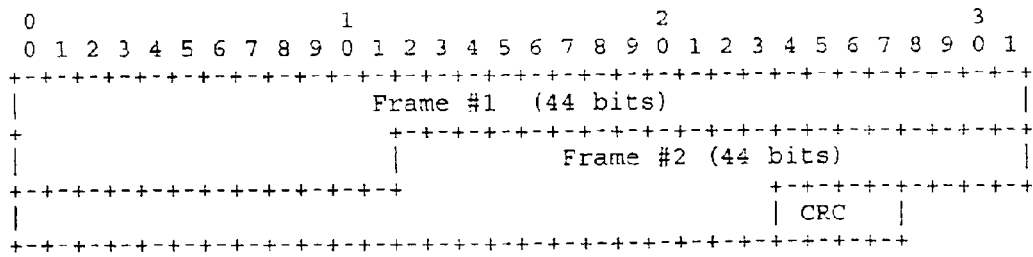
(c)
Fig 29

CONVERSATIONAL NETWORKING VIA TRANSPORT, CODING AND CONTROL CONVERSATIONAL PROTOCOLS

CROSS REFERENCE TO RELATED APPLICATIONS

This application is a Continuation-in-Part of U.S. patent application Ser. No. 09/703,574, filed on Nov. 1, 2001, and claims priority to U.S. Provisional Application Ser. No. 60/277,770 filed on Mar. 21, 2001.

BACKGROUND

1. Technical Field

The present application relates generally to systems and method for providing conversational networking and, more particularly, to conversational protocols for implementing DSR (distributed speech recognition) applications over a computer network.

2. Description of Related Art

The computing world is evolving towards an era where billions of interconnected pervasive clients communicate with powerful information servers. Indeed, this millennium will be characterized by the availability of multiple information devices that make ubiquitous information access an accepted fact of life. The evolution of the computer world towards billions of pervasive devices interconnected via the Internet, wireless networks or spontaneous networks (such as Bluetooth and Jini) will revolutionize the principles underlying man-machine interaction. In the near future, personal information devices will offer ubiquitous access, bringing with them the ability to create, manipulate and exchange any information anywhere and anytime using interaction modalities (e.g., speech and/or GUI) most suited to the user's current needs and abilities. Such devices will include familiar access devices such as conventional telephones, cell phones, smart phones, pocket organizers, PDAs and PCs, which vary widely in the interface peripherals they use to communicate with the user.

The information being manipulated via such devices may reside on the local device or be accessed from a remote server via a communications network using open, interoperable protocols and standards. The implementation of such open standards also leads to a seamless integration across multiple networks and multiple information sources such as an individual's personal information, corporate information available on private networks, and public information accessible via the global Internet. The availability of a unified information source will define productivity applications and tools of the future. Indeed, users will increasingly interact with electronic information, as opposed to interacting with platform-specific software applications as is currently done in the world of the desktop PC.

With the pervasiveness of computing causing information appliances to merge into the users environment, the user's mental model of these devices is likely to undergo a dramatic shift. Today, users regard computing as an activity that is performed at a single device like the PC. As information appliances abound, user interaction with these multiple devices will be grounded on a different set of abstractions. The most intuitive and effective user model for such interaction will be based on what users are already familiar with in today's world of human-intermediated information interchange, where information transactions are modeled as a conversation amongst the various participants in the conversation.

Indeed, it is expected that information-centric computing carried out over a plethora of multi-modal information devices will be essentially conversational in nature and will foster an explosion of conversational devices and applications. It is to be noted that the term "conversational" is used to mean more than speech interaction—it encompasses all forms of information interchange, where such interchange is typically embodied by one participant posing a request that is fulfilled by one or more participants in the conversational interaction. The core principle behind the conversational interaction is that any interaction between the user and the machine be handled as a dialog similar to human-human dialog. Accordingly, the increasing availability of information available over a communications network, along with the rise in the computational power available to each user to manipulate this information, brings with it a concomitant need to increase the bandwidth of man-machine communication so that the increased human-machine interaction that will result from the pervasive use of such information devices will be as natural and simple as if the user was having a conversation with another individual.

With the increased deployment of conversational systems, however, new technical challenges and limitations must be addressed. For instance, currently available pervasive clients typically do not have the required memory and/or processing power to support complex conversational tasks such as recognition and presentation. Indeed, even with the rapid evolution of the embedded processor capabilities (low power or regular processors), one can not expect that all the processing power or memory is available for executing complex conversational tasks such as, for example, speech recognition (especially when the vocabulary size is large or specialized or when domain-specific/application-specific language models or grammars are needed), NLU (natural language understanding), NLG (natural language generation), TTS(text-to-speech synthesis), audio capture and compression/decompression, playback, dialog generation, dialog management, speaker recognition, topic recognition, and audio/multimedia indexing and searching, etc.

Moreover, even if a networked device is "powerful" enough (in terms of CPU and memory) to execute all these conversational tasks, the device may not have access to the appropriate domain-specific and application-specific data files or appropriate algorithms (e.g., engines) to adequately execute such tasks. Indeed, vendors and service providers typically do not allow for open exchange of the algorithms (conversational engines) for executing conversational tasks and/or the data files (conversational arguments) utilized by such algorithms (e.g., grammars, language models, vocabulary files, parsing, tags, voiceprints, TTS rules, etc.) to execute such tasks, which they consider intellectual, business logic and technology crown jewels. Indeed, some conversational functions may be too specific to a given service, thereby requiring back end information that is only available from other devices or machines on the network.

Furthermore, the network infrastructure may not provide adequate bandwidth for rapidly exchanging data files needed by conversational engines for executing conversational tasks. For example, NLU and NLG services on a client device typically require server-side assistance since the complete set of conversational arguments or functions needed to generate the dialog (e.g., parser, tagger, translator, etc.) may be too extensive (in terms of communication bandwidth) for transmission from the server to the client over the network connection. In addition, even if such data files can be transmitted over the network, such transmission may introduce long delays before the client device is able to commence an application or process an input, thereby preventing or delaying real-time interactions. Examples of this are cases where a speech recognition engine must load some dialog specific grammars (i.e. function of the state of the dialog) after receiving and recognizing/processing an input from the user.

These problems may be solved through implementation of distributed architectures, assuming that such architectures are implemented in appropriately managed networks to guarantee quality of service for each active dialog and data exchange. Indeed, the problems associated with a distributed architecture and distributed processing between client and servers require new methods for conversational networking. Such methods comprise management of traffic and resources distributed across the network to guarantee appropriate dialog flow of for each user engaged in a conversational interaction across the network.

Security and privacy concerns and proprietary considerations can also justify the need to distribute the speech processing. For example, it is inappropriate for a bank to send to a client-side speech recognition engine a grammar of the names of its customers. Speech grammars and other data files can also sometimes be considered as intellectual property or trade secrets that should not be distributed across networks. These indeed are often the key elements that make the difference between successful and failed speech applications.

Accordingly, systems and methods that provide conversational networking through implementation of, e.g., distributed speech recognition (DSR), distributed conversational architectures and conversational protocols for transport, coding and control, are highly desirable. Indeed, it would be advantageous to allow network devices with limited resources to perform complex conversational tasks (preferably in real-time) using networked resources in a manner which is automatic and transparent to the users of such devices.

Examples of applications that could rely on a DSR framework include, for example, communication assistance (Name dialling, Service Portal, Directory assistance), information retrieval (e.g., obtaining stock-quotes, checking local weather reports, flight schedules, movie/concert show times and locations), M-Commerce and other transactions (e.g., buying movie/concert tickets, stock trades, banking transactions), personal information manager (PIM) functions (e.g., making/checking appointments, managing contacts list, address book, etc.), messaging (IM, unified messaging, etc), information capture (e.g. dictation of short memos), multi-modal applications with a GUI user agent on the terminal synchronized with a DSR automated voice service, and telephony or VoIP IVR implemented by deploying a DSR framework between the gateway (IVR telephony card or VoIP gateway) and the speech engines.

SUMMARY OF THE INVENTION

The present invention is directed to conversational protocols for implementing distributed conversational networking architectures and/or distributed conversational applications, as well as real-time conversational computing between network-connected pervasive computing devices and/or servers over a computer network. The implementation of distributed conversational systems/applications according to the present invention is based, in part, on a suitably defined conversational coding, transport and control protocols. The control protocols include session control protocols, protocols for exchanging of speech meta-information, and speech engine remote control protocols.

In one aspect of the present invention, a DSR (distributed speech recognition) communication stack comprises a session control layer for managing a communication session, negotiating an upstream and downstream codec at initiation of the session, dynamically switching the upstream or downstream codec during the session, managing an uplink data transmission comprising DSR encoded data, and for managing a downlink transmission comprising results of server-side speech processing; and a transport control layer comprising RTP (real-time protocol), or extensions thereof, for transmitting DSR encoded data and RTCP (real time control protocol), or extensions thereof, for controlling transmission of the DSR encoded data.

In another aspect, the communication stack comprises speech engine remote control protocols for supporting remote control of distributed engines and extensible protocols for supporting the exchange of speech meta-information to facilitate conversational capabilities.

In yet another aspect, the session control layer supports SDP (session description protocol) over SIP (session initiation protocol), or extensions thereof, or SOAP (simple object access protocol) over SIP, or extensions thereof.

In another aspect, the speech meta-information is exchanged in band using RTP as a separate RTP stream or as interleaved payload that is sent via dynamic switches between DSR payload, or out of band on top of the session control layer using SIP and SDP over SOAP.

In another aspect, a speech engine control layer exchanges meta information to determine engine capabilities and to reserve engines. In one embodiment, the engine control layer supports RTSP (real time streaming protocol) or an extension thereof. In another embodiment, the engine control layer supports WSDL (web services description language) or an extension thereof.

These and other aspects, features and advantages of the present invention will be described and become apparent from the following detailed description of preferred embodiments, which is to be read in connection with the accompanying drawings.

BRIEF DESCRIPTION OF THE DRAWINGS

FIG. 4 is a diagram illustrating a format of a file header of the encoded audio file of FIG. 3, according to one aspect of the present invention.

FIG. 5 is a diagram further illustrating a format of the file header of FIG. 4 according to one aspect of the present invention.

FIG. 6 is a diagram further illustrating a format of the file header of FIG. 4 according to one aspect of the present invention.

FIGS. 29a, b and c are diagrams illustrating methods for formatting encoded speech data which may be implemented in a DSR system according to the invention.

DETAILED DESCRIPTION OF PREFERRED EMBODIMENTS

Figure 1:
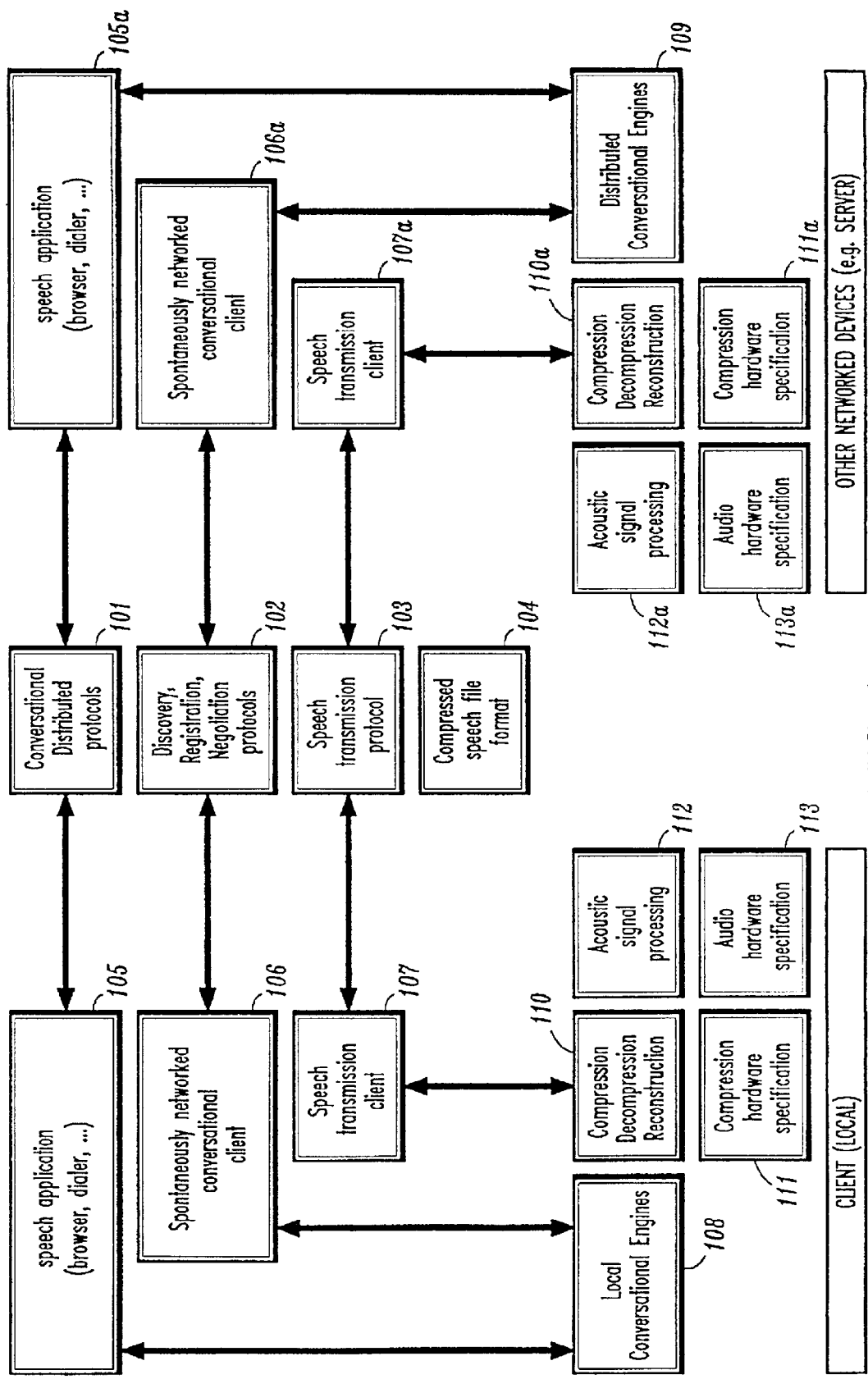
FIG. 1 is a diagram illustrating conversational protocols that may be utilized to support conversational computing according to one aspect of the present invention.

The present invention may be implemented in various forms of hardware, software, firmware, special purpose processors, or a combination thereof. Preferably, the invention is implemented in software as an application comprising program instructions that are tangibly embodied on one or more program storage devices (e.g., magnetic floppy disk, RAM, CD ROM, ROM and Flash memory) and executable by any device, machine or platform comprising suitable architecture. Since the invention is preferably implemented in software, the system architectures and method steps may differ depending upon the manner in which the invention is programmed. Given the teachings herein, one of ordinary skill in the related art will be able to contemplate these and similar implementations or configurations.

I. Overview

The present invention is directed to conversational protocols for implementing distributed conversational networking architectures and/or distributed conversational applications, as well as real-time conversational computing between network-connected pervasive computing devices and/or servers over a computer network. More specifically, the implementation of distributed conversational systems/applications according to the present invention is based in part on a suitably defined conversational coding, transport and control protocols.

In accordance with the present invention, "conversational protocols" are provided to support DSR session control, exchange of speech meta-information, and remote control of speech engines in a distributed networking environment. Conversational protocols enable audio and audio events to be exchanged as voice when the network supports voice and data, or to be exchanged as data (when voice is conversationally coded).

More specifically, conversational protocols comprise (i) "conversational transport protocols" and (ii) "conversational control protocols". The conversational transport protocols include communication protocols that enable coding and transport (streamed or not) of speech I/O in a manner that is compatible with different "conversational engines". The term "conversational engine" or speech engine denotes any engine and middleware that is used to support spoken dialogs (speech only or speech and other modalities), with no particular assumption in terms of the level of "conversational capability", and includes input technology (e.g., speech recognition that it be grammar-based, LM-based LVCSR, NLU, speaker recognition, etc.), output technology (e.g., TTS (text to speech synthesis), prompt concatenation/splicing, NLG, etc.) and possibly dialog management technology. The term CDP refers to an embodiment wherein conversational transport protocols implement a DSR encoding scheme (optimized or not) to transmit voice uplink towards the server. As discussed in detail below, a DSR framework according to the invention provides a mechanism for negotiating the uplink codec (DSR optimized or non DSR optimized) and downlink codec, and mechanisms for transport, control, exchange of speech meta-information and exchange of engine control data (SERCP (speech engine remote control protocols)).

Furthermore, the "conversational control protocols" include protocols that enable e.g., synchronization of different renders in a multi-modal browser framework (as discussed below), wherein the protocols comprise transport and control of the presentation description as well as the synchronization information (issues associated with the synchronization interface and protocols are described below and in detail, for example, in U.S patent application Ser. No. 10/007,092, filed on Dec. 4, 2001, entitled "Systems and Methods for Implementing Modular DOM (document object model)-Based Multi-Modal Browsers", which is commonly assigned and incorporated herein by reference.

The conversational control protocols further comprise distributed speech recognition protocols for remotely controlling conversational engines. There are various embodiments described herein for implementing conversational protocols in accordance with the present invention and the format of such conversational protocols will vary based on the underlying transport layers and desired application. In a preferred embodiment, conversational protocols for providing distributed conversational networking are implemented on top of RTP (Real Time Protocol). For example, as described in detail below, a conversational coding protocol according to one aspect of the present invention is implemented by extending RTP to produce what is referred to herein as RTCCP (real time conversational coding protocol).

As is known in the art, the real time protocol is a method for providing real time transmission of data over a network. RTP does not have all the functions of a transport protocol and is typically used on top of a network level protocol such as TCP (transmission control protocol) or UDP (User Datagram Protocol). TCP is known as a transport level protocol which controls the transmission and the flow of data between two hosts on a network. The TCP protocol may not be ideal in real-time implementations due to its data flow control and reliability mechanisms which can halt/interrupt the flow of data transmission over a network. More specifically, TCP provides reliability through a mechanism that ensures that every single datagram (or packet) is delivered. This mechanism involves assigning each datagram a sequence number and sequentially transmitting each datagram to a receiver. For a given transmitted datagram, if the receiver successfully receives the datagram (i.e., receives an undamaged datagram), the receiver will transmit an acknowledgment message (ACK) to inform the source that it has successfully received the datagram and to send the next sequential datagram. If, after transmitting a given datagram, the source does not receive an ACK message for the datagram, the source will continue to transmit the datagram until an ACK message is returned. Consequently, the flow of datagrams may be temporarily interrupted during transmission as the receiver waits for an undamaged datagram.

UDP is alternative protocol to TCP for use with RTP. The UDP does not utilize the reliability and flow control mechanisms of TCP but rather transmits the datagrams to the receiver in a continuous stream. Consequently, UDP is a preferred protocol for use with RTP for real-time implementations since it delivers a constant stream of datagrams without any significant delay (other than connection bandwidth and network congestion). Despite its lack of a reliably delivery mechanism, the implementation of conversational protocols on top of RTP using UDP in accordance with the present invention preferably employs a reliable delivery mechanism (usually at a relatively low bit rate) similar to TCP/IP, but not as restrictive as TCP. Indeed, as described in detail below, in the absence of TCP/IP, reliable packet delivery is emulated by providing a packet delivery confirmation and re-sending mechanism. Advantageously, the implementation of conversational protocols on top of RTP and UDP (with a reliability mechanism) affords real-time interaction when needed (e.g., when immediate user recognition is expected by the dialog or when the input must directly impact the state of the dialog). The present invention will provide a detailed embodiment of implementing conversational protocols using real time protocols.

It is to be understood that the conversational protocols described herein may be implemented as extensions to other transport mechanisms. For instance, the conversational protocols may be implemented on top of TCP/IP. This presents the advantage to be the most common type of transport protocol that is employed—It is the Internet transport protocol. While TCP/IP is the simplest default mechanism to transport data and control from one device to another using, e.g., FTP (file transfer protocol), RMI (remote method invocation), RPC (remote procedure call), etc., as explained above, it does not guarantee real-time interaction. Indeed, missing or damages packets are systematically waited for or re-sent. This may not be an issue for, e.g., deferred recognition tasks. For example, a form filling process in VoiceXML (http://www.voicexml.com), may not expect immediate speech recognition for each field that is filled, but only recognition upon submission of the entire form to the server. In any event, it is to be understood that a preferred embodiment of implementing RTP-based conversational protocols may utilize TCP/IP if the given application calls for guaranteed, but non-real time, transmission of the associated data packets.

In another aspect of the present invention, the conversational protocols may be implemented on top of HTTP (hypertext transfer protocol) (or WAP (wireless application protocol). HTTP is the main protocol used on the Internet for hypertext transfer (Web programming model), i.e., transferring data on the World Wide Web. The implementation of conversational protocols on top of HTTP allows direct integration of the engine distribution within browser solutions (e.g. http://www.voiceXML.com) with no major change required in the infrastructure. WAP is an equivalent lightweight transport protocol to use on wireless networks (devices with limited wireless bandwidth connections and limited GUI capabilities). Since HTTP is implemented on TCP/IP and has a significant amount of overhead associated therewith (e.g., most of the remote commands result in multiple exchanges various headers) and because WAP provides a reliable delivery mechanism, the implementation of RTP-based conversational protocols on top of HTTP and WAP is preferable for non-real time applications.

It is to be appreciated that the RTP mechanism is preferred when real-time interactions are required. Regardless of the implementation choice, however, the following design principles (definitions) are preferably considered herein for implementing a distributed network using conversational protocols according to the present invention. Conversational protocols according to one aspect of the present invention are preferably defined based on the following criteria:

A suitable audio coding/decoding (Codec) protocol that provides, e.g., minimal distortion of acoustic front-end features and allows reconstruction of intelligible waveforms from compressed feature vectors of speech;

Definition of a file format associated with the encoded audio data;

Definition of a mechanism to select a coding scheme when multiple coding variations are available;

Definition of a streaming mechanism for transmitting the encoded data over a network;

Definition of a mechanism to switch the coding scheme during a stream transmission;

Definition or specification of packet delivery mechanisms and a mechanism for reliable delivery of packets and recovering lost packets and/or disregarding damaged packets; and/or Definition of a mechanism for sending control data between network connected devices, machines and/or servers. This mechanism allows, for example, remote control of conversational engines.

As indicated above, conversational protocols are preferably implemented on top of RTP so as to minimize the dialog delays introduced by distributed processing. A preferred embodiment for implementing conversational protocols on top of RTP based on the above criteria will be explained in detail below. First, an overview of a preferred embodiment utilizing RTP-based conversational protocols in accordance with such criteria will now be given.

With respect to audio encoding and decoding mechanism and a file format for encoded audio data, the present invention preferably employs a well-defined conversational coding protocol comprising (1) a CODEC for encoding/decoding speech/audio data, which minimizes the distortion of the acoustic front-end features and allows reconstruction of intelligible waveforms and (2) a file format associated with the encoded speech/audio data (which is transmitted between network-connected devices/servers using a conversational transport mechanism discussed below). In a preferred embodiment, a conversational CODEC preferably compresses a cepstral feature stream while minimizing the distortion of the reconstructed features. In particular, any CODEC employing a compression scheme that minimizes the error rates of associated conversational engines and which allows for reconstruction/playback of the waveform in an intelligible manner (preferably in a perceptually acceptable manner) may be employed. For instance, any CODEC that compresses MEL cepstra feature vectors and adds pitch information is preferably employed.

A preferred CODEC is the Recognition-Compatible VoCoder (RECOVC) which is discussed in greater detail below with reference to FIG. 2. Briefly, the preferred RECOVC system provides compression of the speech feature vectors such that, e.g., server-side speech recognition is not impaired, as well as reconstruction of a good quality, intelligible speech from the compressed speech feature vectors.

Advantageously, when an audio subsystem of a client device employs an audio CODEC having the specific, well defined characteristics (as described above) for capturing and processing speech prior to transmission to a remote server for server-side processing, the main factors that affect the audio characteristics are related to the source and its acoustic environment. This minimizes the degradation of server-side audio processing, thereby providing increased accuracy of complex conversational tasks such as speech recognition and speaker recognition.

In addition, any file format for the encoded audio data that comprises a header which defines information such as the compression algorithm, the size of the file, the audio parameters (feature type and dimension, sampling frequency, compression scheme), as well as other meta-information, if needed, such as language type and ancillary transformation information may be employed herein. In a preferred embodiment described in detail below with reference to FIG. 3-6, a preferred file format comprises a plurality of Blocks, each comprising compressed feature vectors of, e.g., several successive 10 msec audio frames, in such a way that each Block can be independently decompressed, thereby allowing a receiver to commence decompression from the middle of the file and/or skip damaged or missing data. Several Blocks are packed in a Segment with a Segment Header indicating the content type. Furthermore, as discussed in detail below, the preferred file format defines Speech, Silence, Ancillary Data and an End-of-Stream Segments.

Furthermore, with respect to a streaming mechanism for minimizing the dialog delays introduced by remote processing, the present invention preferably employs RTP by extending the RTP header to enclose the CODEC file format. The resulting stream is referred to herein as RTCCP (Real Time Conversational Coding Protocol). This streaming mechanism is discussed in greater detail below with reference to, e.g., FIGS. 7, 8, 9 and 10. It is to be understood that the coded speech may also be encrypted to guarantee confidentiality (wherein encryption may be indicated in the header).

Next, with respect to a mechanism for selecting the coding schemes, the present invention preferably utilizes the H.245 control standard by extending H.245 to include any supported conversational protocols. It is to be understood, however, that other protocols similar to H.323 (e.g., SIP) may be utilized (as described below).

Moreover, with respect to a control mechanism, a preferred embodiment comprises extending RTCP (Real Time Control Protocol) to produce what is referred to herein as RTCCtP (Real Time Conversational Control Protocol). In particular, RTCCtP extends the functions of RTCP to provide a mechanism for selecting/switching the coding scheme in the middle of a stream transmission and for notification and confirmation. A preferred embodiment of RTCCtP is discussed below with reference to FIG. 12. With respect to packet delivery, the present invention preferably utilizes the reliability mechanisms of UDP and/or TCP or, in the absence of UDP or TCP, emulates functions similar to such protocols to recover lost packets and/or disregard packets. It is to be understood that any messaging to confirm delivery of packets can be used when reliable UDP or TCP is not available. This affects only the control layer. For instance, in case of lost packets, when reliability is needed, the unconfirmed packet can be requested and retransmitted.

Furthermore, with respect to a mechanism for sending control data between the client and the speech server, the present invention preferably employs an extension of RTCP (i.e. an extension of RTCCtP) to add the extra information, to produce a control stream that is referred to herein as RTCDP (Real Time Conversational Distributed Protocol). Preferably, the control stream comprises any one or combination of the following: information about the data file (e.g., what data file to use and where to get it from); a description of the type of processing to apply (e.g., algorithm string—sequence of actions to perform on the input or output by the conversational engines); the expected type and format of the results; an address where to return the results; exception handling mechanisms; I/O event notifications (e.g. for a distributed multi-modal browser); and/or modality specific view updates (e.g. ML (markup language) pushes to the modality specific viewing browsers in the multi-modal browser case).

It is to be understood that in a Voice over IP environment comprising RSVP (Resource Reservation Protocol), the RSVP can be employed to allow pre-reservation of specific bandwidth and quality of service between two locations on the network so as to provide extra capability of traffic management.

Referring to FIG. 1, a block diagram illustrates conversational protocols that may be implemented using the mechanisms/protocols described herein to support conversational computing and distributed architectures. The implementation of conversational protocols to provide distributed conversational computing, as well as the concepts and architecture to support uniform, coordinated conversational computing across a plurality of network connected pervasive computing devices and servers via universal and coordinated conversational user interfaces (as provided via a conversational virtual machine (CVM)), are described in detail, for example, in International Appl. No. PCT/US99/22927, filed on Oct. 1, 1999, entitled: "Conversational Computing Via Conversational Virtual Machine," which is commonly assigned, and fully incorporated herein by reference (which claims priority from U.S. Provisional Patent Application Serial Nos. 60/102,957, filed Oct. 2, 1998, and 60/117,595, filed Jan. 27, 1999, which are commonly assigned and the disclosures of which are also expressly incorporated herein by reference). A CVM platform may be employed herein to present consistent conversational services and behavior to the user and the application developer who can directly use these services and the platform interfaces to build conversational applications.

Furthermore, the implementation of such conversational protocols in a distributed environment to provide automatic and coordinated sharing of conversational functions and resources between local and remote applications/devices/servers (without implementing a CVM platform) is described in detail, for example, in International Application No. PCT/US99/22925, filed on Oct. 1, 1999, entitled "System and Method For Providing Network Coordinated Conversational Services," which is commonly assigned and incorporated herein by reference.

Briefly, referring to FIG. 1, conversational protocols for implementing a distributed network architecture preferably comprise conversational distributed protocols 101, discovery, registration, and negotiation protocols 102 and a speech transmission (or conversational coding) protocol 103. In a preferred embodiment, the present invention addresses the real-time implementation of the conversational coding protocol 103 and conversational distributed protocols 101 (as well as other extensions using other Internet transport mechanisms for non real-time implementations). The implementation of real-time transmission of discovery, registration and negotiation protocols is not necessary in all instances, but nevertheless may be implemented on top of RTP in accordance with the teachings herein. Real-time negotiation can occur during the network connection and, consequently, the negotiation protocols can implemented on top of RTDCP (an other real-time control data stream structures described below).

The conversational distributed protocols 101 allow networked (distributed) conversational applications 105, 105a and network-connected devices (local client and other networked devices such as a server) to, e.g., register their current conversational state, arguments (data files) and context, share local and distributed conversational engines 108, 109 between network connected devices (e.g., client/server), and otherwise exchange information to coordinate a "conversation" involving multiple devices or applications including master/salve conversational network, peer conversational network, and silent partners.

The information that may be exchanged between networked devices using the conversational distributed protocols 101 comprises pointers to data files (arguments), transfer (if needed) of data files and other conversational arguments, notification for input, output events and recognition results, conversational engine API calls and results, notification of state and context changes and other system events, registration updates: handshake for registration, negotiation updates: handshake for negotiation, and discovery updates when a requested resource is lost.

Preferably, the conversational distributed protocols 101 also comprise dialog management (DM) protocols that provide a mechanism for exchanging information between dialog managers (DMs) of networked devices. For example, in a distributed environment, dialog management protocols are used for exchanging information to determine which dialog manager will execute a given function. Typically, different devices, CVMs or different applications will have their own dialog manager and context stack. Through the exchange of information via DM protocols, the different dialog managers involved in a dialog session will negotiate a topology with a master dialog manager and slave or peer dialog managers, wherein the active master dialog manager will be responsible for managing the flow of I/O to the different managers to decide the active dialog and appropriately execute a query and update the context and/or history. For instance, the following information can be exchanged: (1) DM architecture registration (e.g., each DM can be a collection of locals DMs); (2) pointers to associated meta-information (user, device capabilities, application needs, etc.); (3) negotiation of DM network topology (e.g., master/slave, peer-to-peer); (4) data files (conversational arguments) if applicable (e.g., if engines are used that are controlled by a master DM); (5) notification of I/O events such as user input, outputs to users for transfer to engines and/or addition to contexts; (6) notification of recognition events; (7) transfer of processed input from engines to a master DM; (8) transfer of responsibility of master DM to registered DMs; (9) DM processing result events; (10) DM exceptions; (11) transfer of confidence and ambiguity results, proposed feedback and output, proposed expectation state, proposed action, proposed context changes, proposed new dialog state; (12) decision notification, context update, action update, state update, etc.; (13) notification of completed, failed or interrupted action; (14) notification of context changes; and/or (15) data files, context and state updates due to action.

In a preferred embodiment of the present invention, the distributed conversational protocols 101 are implemented via extensions of RTP/RTCP (as described below). In another aspect, the distributed conversational protocols may be implemented on top of TCP via RMI (remote method invocation) or RPC (remote procedure call) system calls to implement the calls between the applications and the different conversational engines over the network. As is known in the art, RPC is a protocol that allows one application to request a service from another application across the network. Similarly, RMI is a method by which objects can interact in a distributed network. RMI allows one or more objects to be passed along with the request.

Although the distributed conversational protocols may be implemented via RMI/RPC (as well as DCOM/ActiveX, Cobra, etc.), RTP is preferred because, e.g., RTP (i) takes advantage of the existing/emerging framework of Voice over IP (land and wireless), (ii) provides an open standard approach, (iii) does not make any assumptions on the OS/platform of the different entities, (iv) does not make any assumptions on the engines or APIs used by the different entities, and (v) can take advantage of the functions and services offered in the Voice Over IP framework and (vi) allows (when not encrypted) a third party and intermediary to appropriately modify and/or prepare the RTP stream to increase or improve the user experience.

The speech transmission protocol 103 (or conversational coding protocol) are used by speech transmission clients 107, 107a to transmit compressed speech (compressed speech file format 104 discussed below) to other networked devices, systems or applications for processing. The speech transmission clients 107, 107a operate in conjunction with compression, decompression and reconstruction engines 110, 110a (preferably using the CODEC techniques described below) and suitable compression hardware 111, 111a for processing the speech (e.g., speech file 104) transmitted over the network. As described below, the speech coders 110, 110a provide perceptually acceptable or intelligible reconstruction of the compressed speech and optimized conversational performance (e.g., word error rate). The speech is captured (and transformed into features) on the respective networked devices using acoustic signal processing engines (audio subsystems) 112, 112a and suitable audio hardware 113, 113a.

In addition, a compressed speech file format 104 can be transmitted/streamed between devices for distributed speech processing using one of the real-time streaming methods described herein in accordance with the present invention. More specifically, the speech transmission protocol 104 allow the devices to transmit compressed speech or local processing results to other devices and applications on the network. In a preferred embodiment, after the handshake process between a source device and a receiver device, a data stream (packet based) is sent to the receiver. The packet headers preferably specify the coding scheme and coding arguments (i.e. sampling frequency, feature characteristics, vector dimensions, feature transformation/family, etc. In addition, error correcting information can also be introduced (e.g. last feature vector of the previous packet to correct the differential decoders if the previous packet is lost or delayed), or appropriate messaging to recover (re-send) lost packets.

The conversational protocols further comprise conversational discovery (detection), registration, and negotiation protocols (or methods) 102. The registration protocols allow networked devices or applications to exchange and register information regarding their conversational capabilities, state/context and arguments, so as to limit data transfer between the devices to relevant information and negotiate the master/slave or peer networking. By way of example, the registration protocols allow the following information to be exchanged: (1) capabilities and load messages including definition and update events; (2) engine resources (whether a given device includes NLU, DM, NLG, TTS, speaker recognition, speech recognition compression, coding, storage, etc.); (3) I/O capabilities (e.g., GUI, Voice, HTML, etc.); (4) CPU, memory, and load capabilities; (5) data file types (domain specific, dictionary, language models, languages, etc.); (6) network addresses and features; (7) information about a user (definition and update events); (8) user preferences for the device, application or dialog; (9) customization; (10) user experience; (11) help; (12) capability requirements per application (and application state) (definition and update events); (13) meta-information for CUI services and behaviors (help files, categories, conversational priorities, etc.) (definition and update events, typically via pointer to table); (14) protocol handshakes; and/or (15) topology negotiation.

Registration may be performed using a traditional communication protocol such as TCP/IP, TCP/IP 29, JINI, T-Space, X-10 or CEBus, and socket communication between devices. The devices use a distributed conversational architecture to exchange information such as their conversational arguments (e.g., active vocabulary, grammars and language models, parsing and translation/tagging models, voice prints, synthesis rules, baseforms (pronunciation rules) and voice fonts). This information is either passed as files or streams to, e.g., a CVM controller and the conversational engines, or as URLs. In one embodiment for implementing the registration protocols, upon connection, the devices can exchange information about their conversational capabilities with a prearranged protocol (e.g., TTS English, any text, Speech recognition, 500 words and FSG grammar, no speaker recognition, etc.) by exchanging a set of flags or a device property object. Likewise, applications can exchange engine requirement lists. With a master/slave network configuration, the master dialog manager can compile all the lists and match the functions and needs with conversational capabilities. In addition, context information may be transmitted by indicating passing or pointing to the context stack/history of the device or application that the controller can access and add to its context stack. Devices can also pass information about their multi-modal I/O and UI capabilities (screen/no screen, audio in and out capabilities, keyboard, etc.) The conversational arguments allow a dialog engine to estimate the relevance of a new query by the NLU engine, based on the current state and context.

The conversational discovery protocols 102 are utilized by spontaneously networked conversational clients 106, 106a of the devices to automatically discover local or network conversationally aware systems and dynamically and spontaneously network-connect such conversationally aware systems. The information that is exchanged via the discovery protocols comprises the following: (1) broadcast requests for handshake or listening for requests; (2) exchange of device identifiers; (3) exchange of handles/pointer for first registration; and (4) exchange of handles for first negotiation. Discovery may also be implemented by accessing a central repository that comprises a description of the registered devices (via, e.g., LDAP (lightweight directory access protocol) or a home page/server that lists the registered devices).

Furthermore, the negotiation protocols 102 allow the negotiation between master/slave or peer networking so as to provide the appropriate coordination between, e.g., multiple CVM systems in dynamic master-slave and peer-to-peer interactions. More specifically, multiple CVM devices when registering will add to the conversational registration capability, information pertaining to, e.g., their controlling capability, the conversational engines that they have access to, and applications and devices that have registered with them and that they control. Based on their UI, I/O capabilities and active I/O, one CVM controller becomes the master and the other CVM controllers act as slaves, which is equivalent relatively to the master as being registered applications until a new negotiation occurs. The role of master and slave can be dynamically switched based on the active I/O modality or device or based on the active application.

II. Conversational Codec

As indicated above, one component of conversational protocols for implementing for distributed conversational networking comprises a suitable audio coding/decoding (Codec) protocol. FIG. 2 is an example of DSR "optimized" codec, i.e., a codec that is designed to minimize the impact of the encoding scheme and network errors on speech processing (in particular speech recognition). A DSR optimized codec is to be contrasted with non-DSR optimized codecs, such as perceptual/conventional codecs that are designed to minimize the perceptual distortions of the reconstructed waveforms as perceived by humans. It is to be understood that the DSR frameworks described herein are not limited to using a DSR optimized codec (as shown in FIG. 2), as a DSR framework could use other DSR optimized codecs such as ETSI ES 201 108 v1.1.2 (Distributed Speech Recognition: Front-end Feature Extraction Algorithm; Compression Algorithm", April 2000) or other DSR codecs that are currently developed under ETSI Aurora work items 8 (advance front-end) or work item 30 (DSR optimized codec with support for reconstruction and tonal languages. It is to be further understood that a DSR codec does not have to be DSR "optimized", but can be perceptuals and implemented in a DSR framework according to the invention.

Figure 2A:
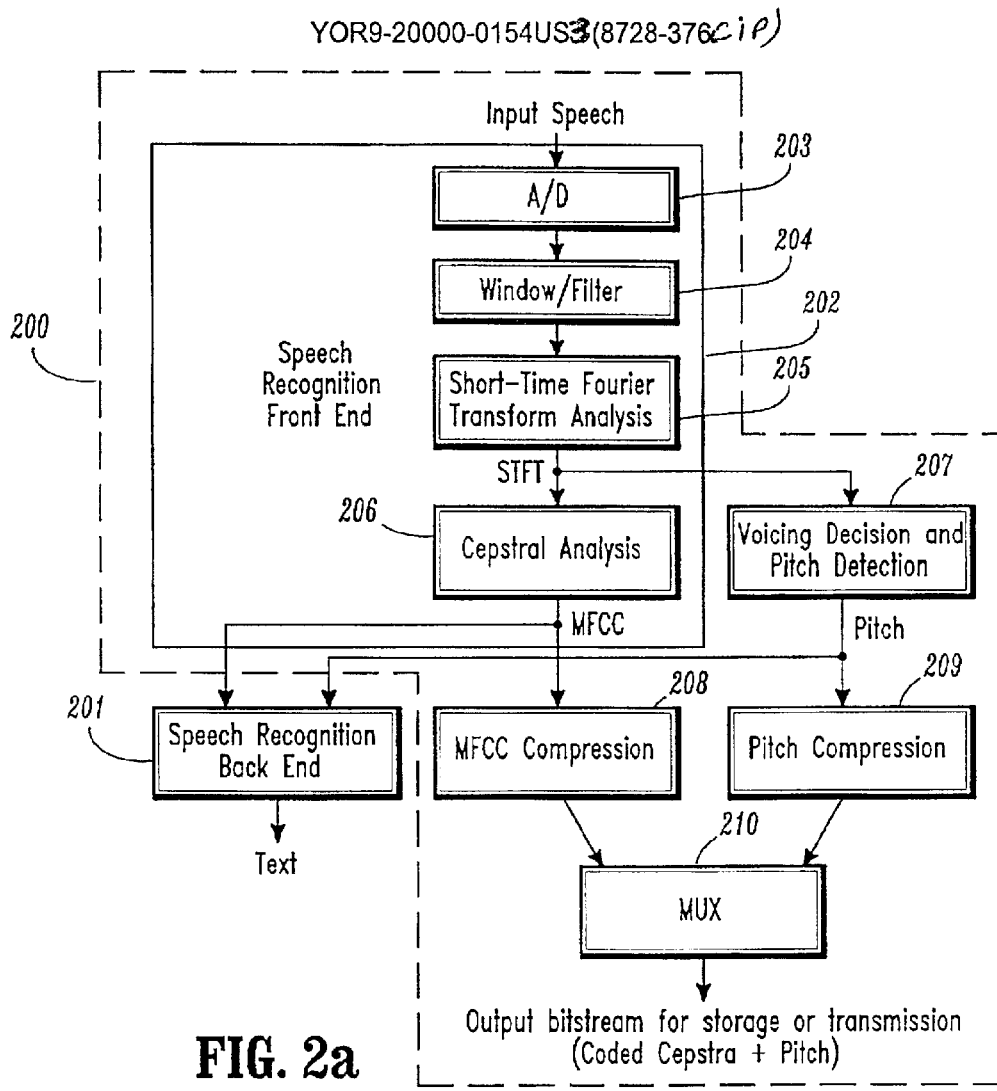
FIGS. 2a and 2b comprise a diagram of a system/method for encoding/decoding (CODEC) audio data according to an embodiment of the present invention.
Figure 2B:
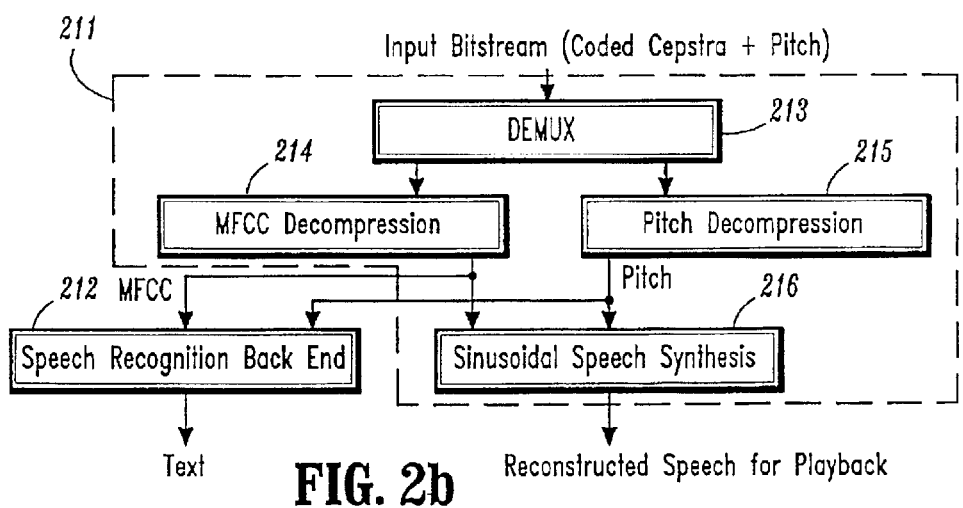

Referring now to FIGS. 2a and 2b, a block diagram illustrates an audio CODEC (coder/decoder) system which may be employed for use with the present invention for encoding/decoding speech data that is transmitted using the conversational protocols and methods described herein according to the present invention. More specifically, in a preferred embodiment, the CODEC depicted in FIG. 2 is a Speech-Recognition Compatible Voice Coder RECOVC™ (RECOVC is a registered trademark of International Business Machines Corporation). The RECOVC™ system developed by IBM Corporation addresses various issues including:

1. Compression of speech recognition feature vectors, such that recognition rates are not impaired; and
2. Reconstruction of a good quality, intelligible speech from the speech recognition feature vectors.

A detailed discussion of components of the RECOVC system depicted in FIG. 2 can be found in U.S. Pat. No. 6,009,387, issued on Dec. 28, 1999 to Ramaswamy, et al., entitled "System and Method Of Compression/Decompressing A Speech Signal By Using Split Vector Quantization And Scalar Quantization," and U.S. application Ser. No. 09/410,085, filed on Oct. 1, 1999, entitled "Method and System For Low Bit Rate Speech Coding Using Speech Recognition Features," which are commonly assigned and fully incorporated herein by reference. The RECOVC may be operated in two modes. A first mode comprises a full RECOVC implementation employing compression and speech reconstruction. A second mode of operation comprises feature vector compression and decompression only, without speech reconstruction. A brief summary of the RECOVC™ system according to one embodiment will now be provided.

FIG. 2a depicts a block diagram of an encoding portion 200 of a RECOVC codec according to one embodiment, optionally coupled with a speech recognition engine 201 (located on e.g., a client device) for converting input speech into text. An input speech signal is fed into an acoustic front-end 202) comprising an analog-to-digital (A/D) converter (203), a window/filter module (204), a short-time fourier transform analysis (STFT) module (205) and a cepstral analysis module (206). The analog input speech signal is digitized by the A/D converter 203 and partitioned into short duration frames (typically 10 ms) via the window/filter module (204). A feature vector is produced for each frame of digitized input speech. It is to be understood that any suitable feature extraction method may be implemented herein such as IBM's ViaVoice™ system, or any other voice recognition systems implementing a Short-Time Fourier Transform (STFT) analysis (205) and cepstral analysis (206) process for extracting the mel-frequency cepstral coefficient (MFCC) feature vector (which represents the spectral envelope of the speech). The MFCC feature vectors can then be used by the speech recognition "back-end" (201) for converting the input speech signal into text.

The MFCC feature vectors are preferably compressed via MFCC compression module (208) using any technique known to those skilled in the art that provides compression without effecting the performance of the speech recognition system. Preferably, the compression module 208 preferably implements the compression scheme disclosed in the above-incorporated U.S. Pat. No. 6,009,387 (although other suitable compression schemes may be utilized). The compression scheme disclosed in this patent utilizes a first order prediction, multistage split VQ technique. Preferably, the bit rates are in the range 4–6.4 kbps, depending on the size of the MFCC feature vector. It is to be appreciated that the preferred compression approach is flexible in terms of acoustic feature characteristics such as dimensions or sampling rates. It is to be further appreciated that when used in combination of robust front-ends, the features may be compressed prior to transformation. The transformations are transmitted separately as described in detail below. On the receiving end, the transformations are applied after decompression.

To provide speech reconstruction and playback using the MFCC feature vectors, an additional pitch frequency information (including voiced/unvoiced decisions) is extracted for every frame of speech data via a voice decision and pitch detection module (207) together with the respective MFCC feature vector. It is to be appreciated that the pitch data is efficiently calculated from the STFT module 205 using a spectral peak detection process. It is to be understood that for some speech recognition systems, especially for tonal languages (e.g. Mandarin Chinese), the pitch information that is used for recognition and pitch detection is already implemented as a part of the front-end process.

The pitch period values are compressed at bit rates of 300–500 bps via a pitch compression module 209. The streams of compressed MFCC feature vectors and the compressed pitch are multiplexed via MUX 210 to form an output bitstream (of coded cepstra and pitch) for storage and/or transmission.

Referring now to FIG. 2b, a block diagram illustrates a speech decoder 211 of a RECOVC™ CODEC according to one embodiment which generates a reconstructed speech signal (for playback) of the encoded bitstream generated by the encoder 200. The decoder 211 is optionally coupled with a speech recognition engine 212 for converting the decompressed speech to text. The encoded input bit stream is fed into a de-multiplexer (213) which separates the bit stream into a stream of compressed MFCC feature vectors and a stream of compressed pitch. The MFCC vectors are decompressed via decompression module (214) (using the techniques described in the above-incorporated U.S. Pat. No. 6,009,387). A pitch decompression module (215) decompresses the encoded pitch information if playback of the speech is required or if pitch is needed for the speech recognition process (212).

It is to be appreciated that the speech for playback is reconstructed from the decoded MFCC feature vectors and the decoded pitch values via a sinusoidal speech synthesis module 216, which preferably employs a novel, low complexity, frequency domain reconstruction method described in detail in the above-incorporated patent application U.S. Ser. No. 09/410,085. The reconstruction is performed using a sinusoidal speech model (such as described by R. Mc Aulay et al., Sinusoidal Coding, Speech Coding and Synthesis, Chapter 4, pages 121–170, Elsevier, 1995.) The values of the model parameters are determined such that the reconstructed speech has an MFCC feature vector similar to the decoded MFCC feature vector, and a pitch similar to the decoded pitch. This is sufficient to reconstruct natural sounding, good quality, intelligible speech with the voice of the original speaker.

It is to be appreciated that the RECOVC system described above using a cepstral feature compression scheme minimizes the level of degradation of the performances of a conversational task performed on the decompressed feature stream. The preferred compression scheme is a key basic element of conversational networking. It is to be understood, however, that any suitable coding scheme that compresses the cepstral feature stream while minimizing the distortion of the reconstructed features may be used herein. In addition, for practical purposes, a preferred coding scheme for use in conversational distributed environment is one that supports reconstruction of intelligible waveforms. Indeed, this reconstruction is useful for later playback from the server or playback from the client (if stored locally) or for subsequently proofreading the transcription, error correction, or human monitoring of the process. Accordingly, any conversational CODEC that minimizes the distortion of the acoustic front-end features and allows reconstruction of intelligible waveforms may be employed herein. For example, any conventional CODEC combined with an acoustic feature error correction/minimization scheme would fit the definition. Preferably, such coding schemes should provide data rates as low as between 4 kbits/s and 5 kbit/s with no degradation of the recognition performances. As a result, interactive exchanges can be performed in real time with the back-end (server) resources even over wireless modems or wireless data links.

It is to be understood that although a preferred CODEC system and method is described above, it is to be appreciated that the transmission of speech from the local client to a remote network-connected server (or vice versa) can be performed using other techniques depending on the circumstances and desired results. For instance, there can be direct transmission of the waveform as a file, a stream or a stream of packets. In addition, a compressed waveform may be transmitted using conventional methods such as ADPCM and APC. Furthermore, a stream of features can be transmitted in accordance with the method disclosed in "Compression Of Acoustic Features For Speech Recognition In Network Environments," by G. Ramaswamy et al., Vol. 2, pp. 977–980, Proc. ICASSP, 1998, which is incorporated herein by reference. This method allows recognition (speech recognition, speaker recognition or NLU) on the receiver side but no reconstruction of the signal.

III. Conversational Coding Protocols (A) File Format

Figure 3:
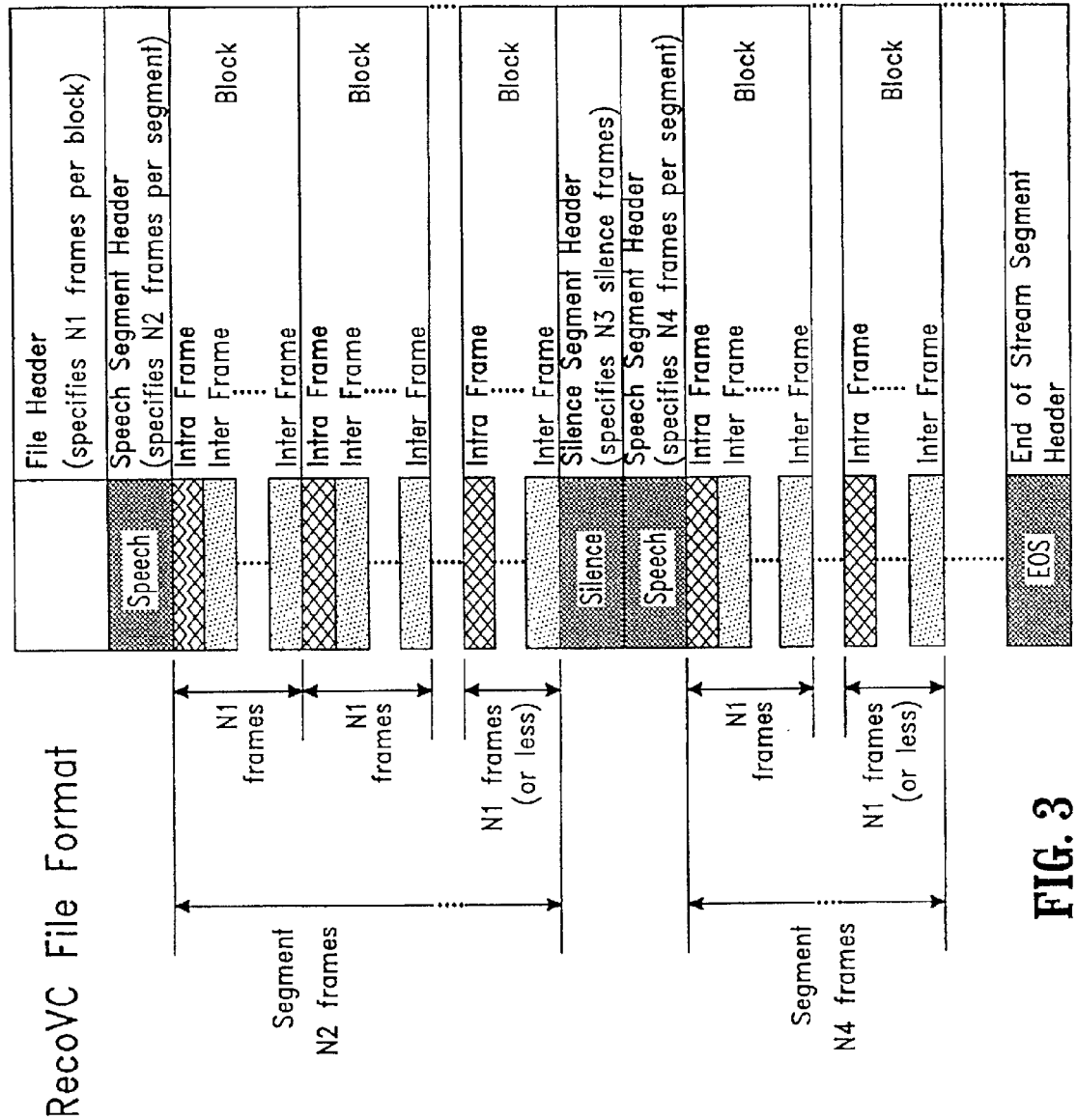
FIG. 3 is a diagram illustrating a file format for encoded audio data according to one aspect of the present invention.

As indicated above, one component for defining a conversational coding protocol comprises a definition of the file format that is associated with the encoded data. In a preferred embodiment, the CODEC system and method (and feature compression scheme) described above (i.e., RECOVC) is used for generating an internal file format that can be utilized for real-time distributed conversational interactions. Referring now to FIG. 3, a block diagram illustrates a RECOVC file format according to an embodiment of the present invention (which may be referred to herein as "RECOVC.xxx"). It is to be appreciated that a preferred RECOVC file format according to the present invention enables transmission of different segments of speech. As illustrated in FIG. 3, a preferred RECOVC.xxx file format comprises a File Header which, in general, defines information regarding, e.g., the compression scheme, the size of the file, the audio parameters (feature type and dimension), sampling frequency, and other meta-information such as language type, encryption information and ancillary transformation information regarding transformation of the speech signal, if needed, etc. It is to be understood that although the RECOVC.xxx file format is preferred, other file formats may be employed herein comprising a structure that provides the above-mentioned meta-information.

A preferred format of the RECOVC file comprises a plurality of Blocks, each comprising compressed feature vectors of several successive 10 msec audio frames, for example. More specifically, in a preferred embodiment, each Block comprises a single IntraFrame (comprising uncompressed or losslessly compressed) speech features and one or more InterFrames having speech data coded using RECOVC. More specifically, an IntraFrame is the first frame of a Block that is preferably non-encoded or, alternatively encoded by different schemes that guarantees that the IntraFrame can be recovered/reconstructed, even if previous blocks or frames have been corrupted. Moreover, an InterFrame is a frame between IntraFrames. The InterFrames may be coded differently than the IntraFrames, as it may be less critical to have them corrupted (since the stream will be recovered at the next IntraFrame. Robust encoding, including error correcting codes may be used for the InterFrames.

The (maximum) number of frames N1 for each Block is specified in the File Header. The feature vectors are stored in Blocks in such a way that each Block can be decompressed on its own. It is to be appreciated that this allows decompression to be performed at any portion (e.g., the middle) of the RECOVC File, as well as skipping damaged or missing data.

The RECOVC File further comprises one or more Segments, comprising, e.g., speech and silence segments, all of which are preceded by a corresponding Segment Header. For instance, each speech Segment comprises several Blocks and a Speech Segment Header indicating the type of content (e.g., speech). The Speech Segment Header specifies the number of frames (N2, N4) per speech Segment. The RECOVC file further comprises one or more of Silence Segments and EOS Segments (end-of-stream), as well as ancillary data segments that may be defined depending on the application.

Referring now to FIG. 4, a diagram illustrates information that is preferably included within a File Header of a RECOVC file according to the present invention. The File Header comprises a plurality of fields, some of which are mandatory and some of which are optional. For example, the Header Length comprises a 2 byte field that indicates the total number of bytes in the File Header. A Frame Duration field comprises a 1 byte field that comprises an index to a Frame Duration Table illustrated in FIG. 5. The Frame Duration Table comprises a plurality of Codes each specifying the duration (in msec) of each frame of speech. A Frames Per Block field comprise a 1 byte field having a value that specifies the maximum number of allowed frames per Block. Each Block (FIG. 3) may comprise only one Intra-Frame, or one Intra-Frame and one or more Inter-Frames. A Sampling Rate field comprises a 1 byte field that provides an index value to a Sampling Rate Table (FIG. 5). The Sampling Rate Table comprises a plurality of Codes each specifying the input sampling rate (Hz) of the speech data.

A Cepstra Dimension field (FIG. 4) comprises a 1 byte field having index value to a Cepstra Vector/Type Table (FIG. 5). The Cepstra Vector/Type Table comprises a plurality of codes each specifying a dimension of the cepstral feature vectors. A Language field comprises a 1 byte field having index value to a Language Table. The Language Table comprises one or more codes each specifying a language of the encoded speech data. A Profile field comprises a 1 byte field having an index value to a Profile Table (as illustrated in FIG. 6). The Profile Table comprises a plurality of codes each specifying, e.g., whether the speech data contains information that enables recognition only or recognition and reconstruction of the speech data.

Referring to FIG. 6, the Speech and Silence Segment Headers (shown in FIG. 3) preferably comprise a 5 byte field comprising a 1 byte Segment Type field and a 4 byte Number Of frames field. The Segment Type field comprises a index value in a Segment Type Table indicating the type of Segment (speech or silence). If speech is included is a given Segment, a Speech Segment Header will specify the number of frames for the given Segment. If speech is not included in a given silence Segment, the silence Segment does not need to be transmitted. If the given silence Segment is transmitted, is can be marked via a Silence Segment Header that specifies the number of silence frames for the given silence Segment (which can then be ignored by a recognition engine on the receiver of the data stream.

The Number of Frames field comprises a value that indicates the total number of frames of the corresponding Segment. As further illustrated in FIG. 6, EOS Headers and Data Segment Headers preferably comprise a 5 byte (minimum) field comprising a 1 byte Segment Type field and a 4 byte Segment Length field. The Segment Type field comprises an index value to a Segment Type table indicating the type of segment (EOS or Data). The Segment Length field includes a value that indicates the total number of bytes of the corresponding Segment. In addition, Ancillary Data with corresponding segment header, etc., may be defined and incorporated into the RECOVC file format accordingly.

The present invention is not limited to the embodiments described above with reference to FIGS. 4–6. Other cases could be considered. For example, consider the following definition. A DSR RTP payload datagram comprises a standard RTP header followed by a DSR payload. The DSR payload itself is formed by concatenating a series of DSR Fps (frame pairs). The size and format of the DSR FP may vary from one front-end type to another. Each DSR payload is octet-aligned at the end, i.e., if a DSR payload does not end on an octet boundary, it is padded at the end with zeros to the next octet boundary.

FIG. 29a is an exemplary diagram of a DSR RTP datagram carrying a DS payload containing three 92-bit-long Fps (that would be the case for ETSI ES 201 108 v1.1.2. In the example, there are 4 zeros padded at the end to make it octet-aligned. The number of FPs per payload packet should be determined by the latency and bandwidth requirements of the DSR application using this payload format. The number of FPs per DSR payload packet should be minimized, subject to meeting the application's requirements on network bandwidth efficiency. RTP header compression techniques, such as those defined in [RFC2508] and [RFC3095], can be used to improve network bandwidth efficiency. Depending on the type of the DSR front-end encoder to be used in the session, the size and format of the FP may be different. When establishing a DSR RTP session, the user terminal and speech engine need first to communicate and agree with each other the type of front-end encoder to use for the upcoming session. This communication can be done using, for example, SDP (session description protocol) with the front-end-type MIME parameter or other out-of-band means of signaling as discussed in this invention. In this example, we discuss only the FP formats that MUST be used when the ESTI ES 201 108 Front-end Codec is used. FP formats for future DSR optimized codecs can similarly defined.

The DSR RTP payloads may be used to support discontinuous transmission of speech: DSR FPs are sent only when speech has been detected by the audio subsystem (speech activity detection as for GSM for example). A DSR frame can be either a speech frame or a non-speech frame, depending on the nature of the section of the speech signal it represents. The end of a transmission determined at the audio input subsystem when the number of consecutive non-speech frames exceeds a preset threshold, called the hangover time. A typical value used for the hangover time varies between 0.5 and is 1.5 seconds depending on the application. After all FPs in a transmission segment are sent, the front-end indicates the end of the current transmission segment by sending one or more Null FPs.

The ETSI Standard ES 201 108 for DSR defines a signal processing front-end and compression scheme for speech input to a speech recognition system. Some relevant characteristics of this ETSI DSR front-end codec are summarized below.

The coding algorithm, a standard mel-cepstral technique common to many speech recognition systems, supports three raw sampling rates: 8 kHz, 11 kHz, and 16 kHz. The mel-cepstral calculation is a frame-based scheme that produces an output vector every 10 ms. After calculation of the mel-cepstral representation, the representation is first quantized via split-vector quantization to reduce the data rate of the encoded stream. Then, the quantized vectors from two consecutive frames are put into a FP.

For the ES 201 108 front-end codec, the mel-cepstral frame as shown in FIG. 29b is used. The different FPs are defined in ES 201 108. The length of a frame is 44 bits representing 10 ms of voice. Accordingly, pairs of the quantized 10 ms mel-cepstral frames are grouped together and protected with a 4-bit CRC, forming a 92-bit long FP as shown in FIG. 29c. Therefore, each FP represents 20 ms of original speech.

The 4-bit CRC MUST be calculated using the formula defined in ES 201 108. A Null FP for the ES 201 108 front-end codec is defined by setting the content of the first and second frame in the FP to null (i.e., filling the first 88 bits of the FP with 0's). The 4-bit CRC is calculated the same way as described in ES 201 108. The format of the RTP header is specified in [RFC1889]. This payload format uses the fields of the header in a manner consistent with that specification. The RTP timestamp corresponds to the sampling instant of the first sample encoded for the first FP in the packet. The timestamp clock frequency is the same as the sampling frequency, so the timestamp unit is in samples. When ES 201 108 front-end codec is used, the duration of one FP is 20 ms, corresponding to 160, 220, or 320 encoded samples with sampling rate of 8, 11, or 16 kHz being used at the front-end, respectively. Thus, the timestamp is increased by 160, 220, or 320 for each consecutive FP, respectively.

The payload is always made an integral number of octets long by padding with zero bits if necessary. If additional padding is required to bring the payload length to a larger multiple of octets or for some other purpose, then the P bit in the RTP in the header may be set and padding appended as specified in [RFC1889]. The RTP header marker bit (M) is not used in this payload and thus set to 0 in all packets by the sender and ignored by the receiver. The assignment of an RTP payload type for this new packet format is outside the scope of this document, and will not be specified here. It is expected that the RTP profile under which this payload format is being used will assign a payload type for this encoding or specify that the payload type is to be bound dynamically.

(B) Conversational Streaming and Control Mechanisms

As indicated above, a suitably defined streaming mechanism is implemented to transmit the RECOVC file for distributed conversational applications. Packetization of the RECOVC file format is preferably achieved by buffering the data stream block by block (and initially sending the header). Typically with 300 ms packets, the data rate can be as low as 4 kbit/s (4.5 kbit/s when reconstruction of the waveform is not required). This is sufficient for real-time low bit rate transmission even over wireless modem and real-time interaction. Packetization will be discussed in detail below.

In a preferred embodiment, packet transmission of a RECOVC data stream (as shown in FIG. 3) for wireless, UDP, TCP/IP, HTTP and Voice over IP networks is implemented using a conventional RTP (Real-time Transport Protocol) to wrap the resulting RECOVC data stream. The term RTCCP (Real-time Conversational Coding Protocol) is used herein to refer to a RECOVC data stream that is wrapped in a conventional RTP stream. As is known in the art, RTP is a standardized protocol that provides end-to-end network transport functions suitable for applications transmitting real-time data such as audio or video over a network (e.g., distributed applications). RTP does not provide a mechanism to ensure timely delivery of the data or provide other quality of service guarantees, but relies on lower-layer services for such services. As is further known in the art, the data transmission (via RTP) is augmented by RTCP (RTP control protocol) that allows monitoring of the data delivery and provides minimal control and identification functionality. In accordance with a preferred embodiment of the present invention, RTP is extended through modifications and/or additions to the headers as necessary for incorporating the RECOVC File format to provide real-time streaming of the RECOVC data.

Figure 7:
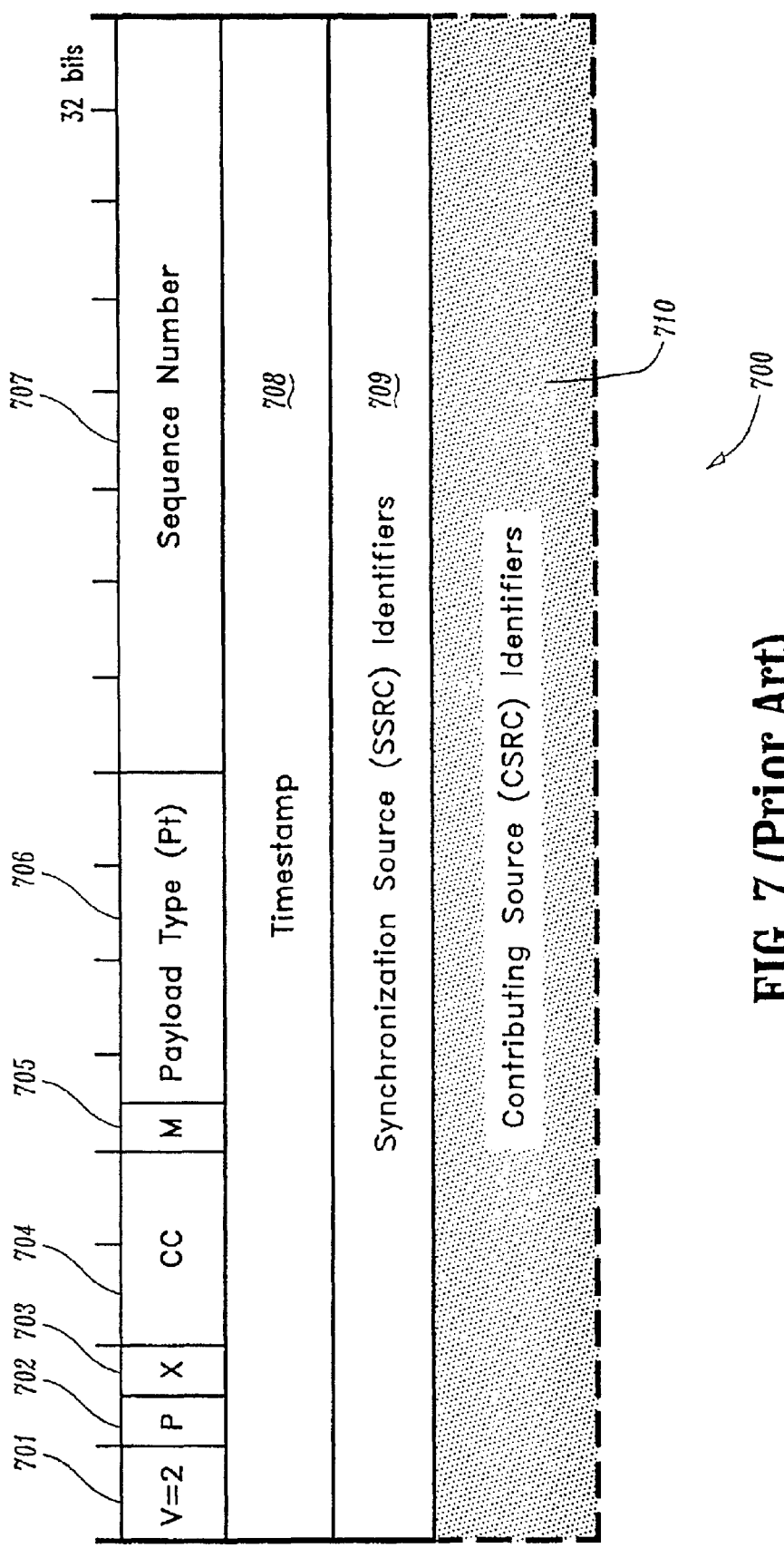
FIG. 7 is a diagram illustrating a conventional format for RTP (Real Time Protocol).

A brief discussion of a standard RTP protocol will now be provided with reference to the diagram of FIG. 7, which illustrates a format of an RTP Header 700 according to the prior art. The RTP header 700 is a conventional RTP header where an extension capability of the RTP header is utilized to add the RecoVC information. The first 12 bytes (96 bits) of the RTP header 700 (or fixed header) are included in every RTP packet, while a list of CSRC (contributing source) identifiers 710 may be included when inserted by a mixer (as is known in the art, a mixer is an intermediate system that receives RTP packets from one or more sources, processes the packets as necessary, and combines the packets in some manner and then forwards a new RTP packet).

The RTP header 700 comprises a version number field 701 (2 bits) which identifies the version of RTP. The most current version of RTP is version "2". A padding (P) field 702 comprises a 1 bit field, whereby if the padding bit is set, this indicates that the packet contains one or more additional padding bytes at the end which are not part of the payload. The last byte of the padding contains a count of the number of padding bytes that should be ignored. This padding (bytes of value 0) is added to the end of the payload of an RTP packet so as to maintain the 32-bit fields aligned at offsets divisible by four.

An extension (X) field 703 is a one bit field that is set to indicate that a variable-length header extension is appended to the RTP header, following the CSRC list 710 (if present).

A CSRC count (CC) field is a 4 bit field that indicates the number of CSRC identifiers that follow the fixed header (i.e., the first 12 bytes). A marker (M) field 705 is a 1 bit field that carries profile-specific information. A profile specifies a default static mapping of payload type codes to payload formations. The marker is intended to allow significant events such as frame boundaries to be marked in the packet stream. A profile may define additional maker bits or specify that there is no marker bit by changing the number of bits in the payload type field 706.

The payload type field 706 is a 7 bit field that identifies the format of the RTP payload and determines its interpretation by the application. The RTP payload is the data transported by RTP in a packet. As indicated above, a profile specifies a default static mapping of payload type codes to payload formats.

A sequence number field 707 is a 16 bit field that comprises a sequence number of the RTP packet. The sequence numbers allows the receiver to reconstruct the sender's packet sequence. The sequence numbers may also be used to determine the proper location of a packet, for example in audio decoding, without necessarily decoding packets in sequence. The sequence number increments by one for each RTP data packet that is sent, and may be used by the receiver to detect packet loss and to restore packet sequence.

A time stamp field 708 is a 32 bit field that indicates the time of sampling of the first byte in the RTP data packet. The time stamp may be derived via NTP (network time protocol) or other clocking methods known to those skilled in the art for providing synchronization depending on the application.

A synchronization source (SSRC) identifiers field 709 is a 32 bit field that indicates the synchronization source of a stream of RTP packets. This identifier is chosen randomly and is identified by a 32-bit numeric SSRC identifier carried in the RTP header so as not to be dependent upon the network address.

The CSRC identifiers 710 field is a 32 bit field that identifies the contributing sources, if any, for the payload contained in the packet. A source of stream of RTP packets that has contributed to the combined stream produced by an RTP mixer. The mixer inserts a list of the SSRC identifiers of the sources that contributed to the generation of the particular packet into the RTP header of that packet. An example application is audio conferencing where a mixer indicates all the persons who speech was combined to produce the outgoing packet so that the receiver can determine the current talker, even though all the audio packets contain the same SSRC identifier (i.e., the SSRC identifier of the mixer).

In accordance with a preferred embodiment of the present invention, the RTP format described above with reference to FIG. 7 is extended to encompass the RECOVC data stream discussed above with respect to, e.g., FIG. 3. More specifically, profile-specific modifications may be made to the RTP header 700 of FIG. 7 based on the profile of the RECOVC format to generate what is referred to herein as RTCCP.

Figure 8:
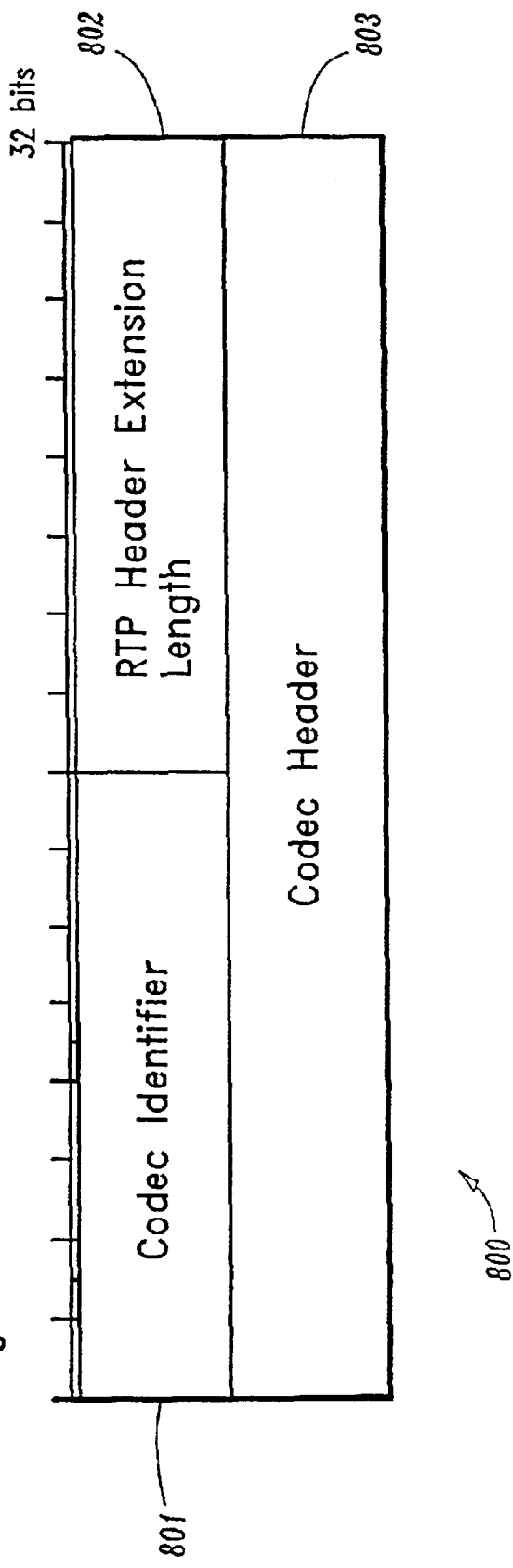
FIG. 8 is a diagram illustrating a method for extending the header of RTP to produce RTCCP (Real Time Conversational Coding Protocol) according to one aspect of the present invention.

FIG. 8 is a diagram illustrating the extension of RTP to produce RTCCP according to one aspect of the present invention. In the embodiment of FIG. 8, the additional information for the RECOVC payload is carried in the payload section of the RTP packet. As indicated above, an RTP packet comprises the fixed RTP header, a possible empty list of contribution sources, and the payload data. In accordance with one aspect of the present invention, a profile-specific extension to the RTP header comprises a 16 bit Codec Identifier field 801, an RTP Header Extension Length field 802, followed by a Codec Header field 803. In the preferred embodiment using RECOVC, the codec identifier 801 comprises a value for xxx in RECOVC.xxx that indicates parameters of the different RECOVC codecs, wherein the RECOVC.xxx codec nomenclature is as follows:

RECOVC.{Sampling Rate Code}{Cepstra Vector Dimension Code}{Profile Code}

Preferably, a default RECOVC codec, RECOVC.101, comprises the following default settings: {11 kHz sampling frequency code}=1, {13 dimensional cepstra code}=0 and {+pitch compressed at 4.5 kbit/s}=1 (before packetization), as indicated in the respective tables of FIGS. 5 and 6.

The RTP header extension length field 802 is a 16 bit field that counts the number of 32-bit words in the extension, excluding the 4-bytes comprising fields 801 and 802 of the RTP header extension. Moreover, in a preferred embodiment, the codec header field 803 comprises the RECOVC header (FIGS. 3 and 4) and payload data (i.e., the RECOVC header is included as RTP header extension. Furthermore, in an RTP packet comprising a RECOVC extension, the X bit is set to one, indicating that a variable length header extension is appended to the RTP header. The resulting stream of extended RTP packets constitutes a preferred RTCCP stream (Real-Time Conversational Coding protocol) according to the present invention (this embodiment is to be contrasted with the option described herein where when X=0, any additionally required information is sent differently in control messages (either in side bands (SIP/SDP/SOAP over SIP; or RTCP) or as payload dynamically interleaved with the DSR payload.)

Figure 9:
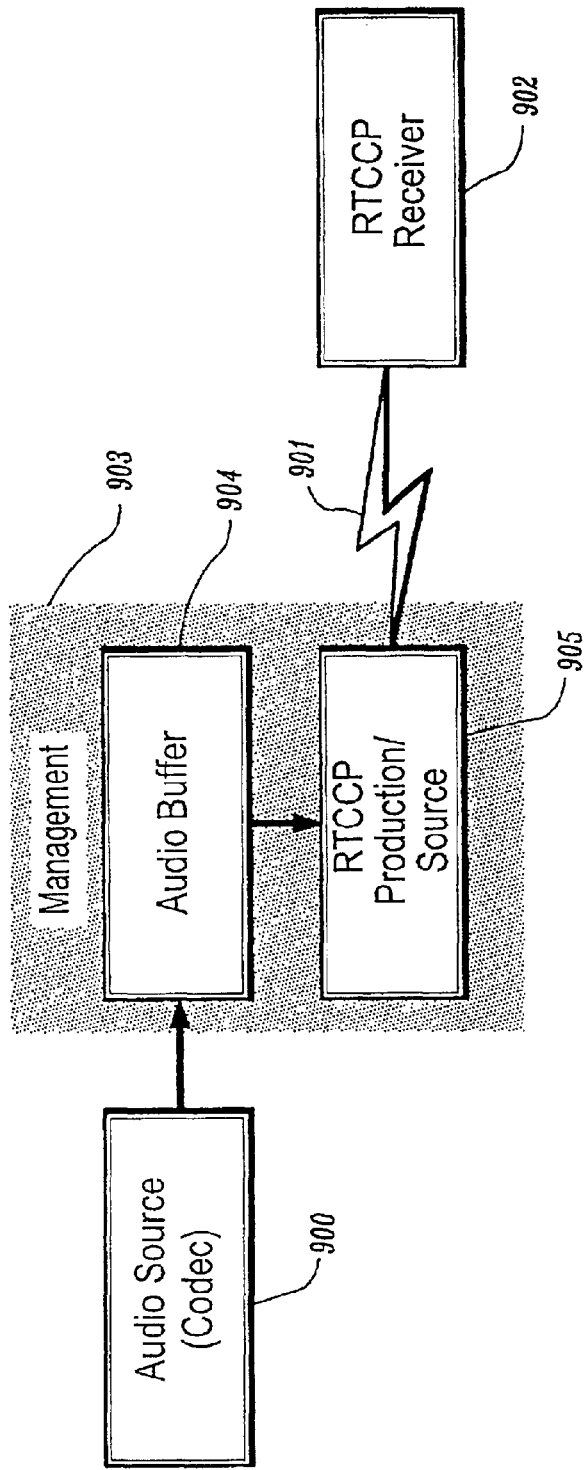
FIG. 9 is a diagram of a system/method for generating an RTCCP data stream according to an embodiment of the present invention.
Figure 10:
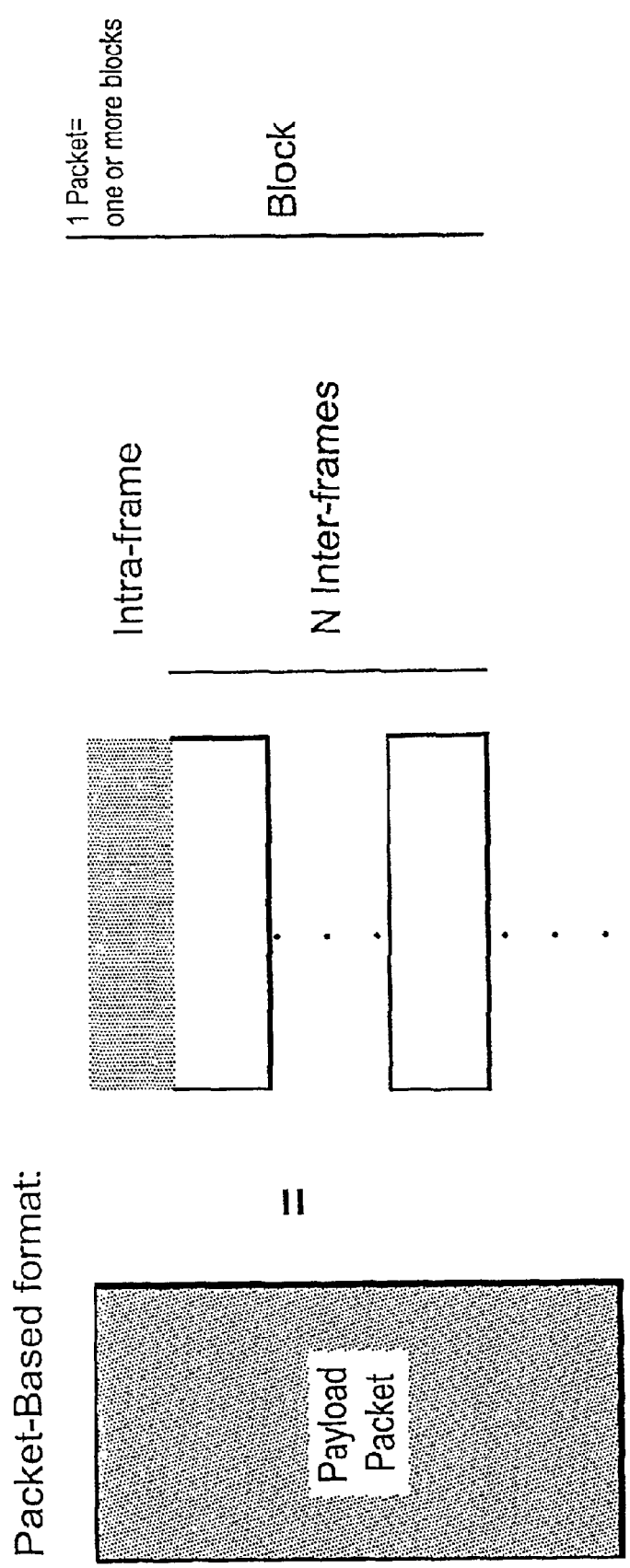
FIG. 10 is a diagram of a method for generating an RTCCP data stream according to one aspect of the present invention.

Referring now to FIG. 9, a block diagram illustrates a system/method for streaming/packetizing RTCCP data. An audio source (codec) 900 generates audio/speech data to be transmitted over a network 901 to a receiver 902. The transmitter comprises a system manager 903 which manages a an audio buffer and RTCCP generator 905. The audio source 900 preferably comprises the RECOVC encoder 200 (FIG. 2a) and the receiver preferably comprises the RECOVC decoder 211 of FIG. 2b. The packetization of the RECOVC file format received from the audio source 900 is preferably achieved by buffering (via the audio buffer 904) the data stream block by block (and initially sending the header). More specifically, as illustrated in FIG. 10, each RTCCP packet output from the RTCCP generator 905 comprises one or more Blocks (FIG. 3). If silence Segments are dropped (not transmitted, corresponding time stamps can be transmitted to indicate the delay that can be introduce therebetween. If desired, silence information can be communicated by sending the information according to the RECOVC file format (FIG. 3). For real-time dialogs, with human or machines, the buffer size is preferably 300 ms maximum. Typically with 300 ms packets, the data rate can be as low as 4 kbit/s (4.5 kbit/s when reconstruction of the waveform is not required). This is sufficient for real-time low bit rate transmission even over wireless modem and real-time interaction. For deferred interaction, however, it is to be understood that the packet size can be a large as desired.

If desired, error correction can be performed on a block by block basis. Preferably, a data Segment, defined by the RECOVC file formation, can be included which contains the error recovery information. More specifically, as shown in FIG. 6, error correction presence and type may be defined by the first bytes of an Ancillary Data field (Data Segment Header) by including (1) the size of the ECC information (where value of "0" indicates no ECC) and (2) and ECC identifier.

Figure 11:
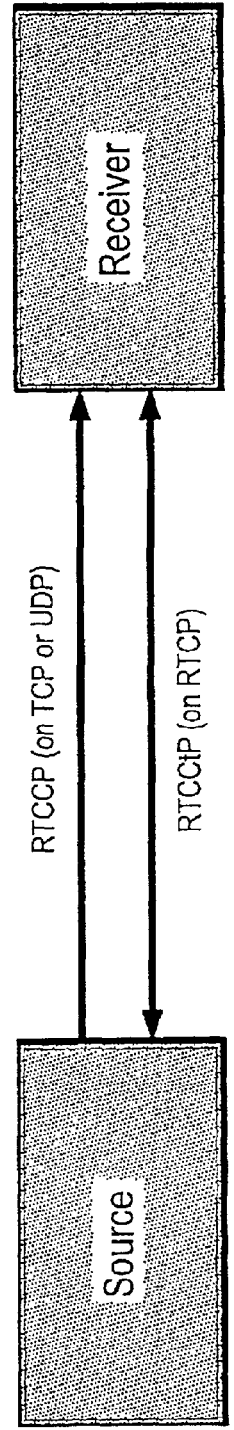
FIG. 11 is a diagram illustrating conversational protocols according to one aspect of the present invention that are implemented for network communication between a source and a receiver.

It is to be appreciated that, as discussed in detail above, the RTCCP can run on top of an unreliable protocol such as UDP for real-time applications. When real-time is not an issue, RTCCP can be implemented on top of a reliable transport layer that will guarantee appropriate packet ordering and delivery such as TCP (transmission control protocol). This is illustrated in FIG. 11.

As indicated above, because multiple conversational codecs can be utilized (e.g. RECOVC with different settings), a protocol/mechanism should be defined to select a coding scheme. For instance, the endpoints, e.g., source and receiver, must negotiate to determine compatible settings before the audio data and/or data communication links can be established. The present invention preferably utilizes the control functions defined by the H.245 standard (which is known to those skilled in the art), which specifies messages for opening and closing channels for media streams, and other commands, requests and indications to provide such control functions. More specifically, an initial connection between a source and receiver starts with a preliminary handshake, similar to H.245, except that it incorporates all the different conversational codecs (e.g., RECOVC) that are employed in the given application. The extension of the H.245 control and handshake protocol is referred to herein as H.245.RTCCP.

More specifically, the default for transmission is set to RECOVC. 101 (rather than G.711 (audio codec, 3.1 Khz at 48, 56, and 64 Kbps (normal telephony) or G.723 (Audio codec, for 5.3 and 6.3 Kbps modes as currently prescribed by H.245) which is supported by all end points in the network. Aurora DSR or other schemes may also be supported. In real-time mode, RECOVC.101 is a preferred default codec that is initially enabled/selected upon system connect unless an agreement is reached to select another coding scheme before completion of the handshake, in which case the agreed upon coding scheme will be implemented.

As further indicated above, a control protocol/mechanism should be defined for switch a coding scheme in the middle of a RTCCP stream transmission. In accordance with a preferred embodiment, notification and confirmation messages are transmitted as control extensions to the RTCP (Real Time Control protocol), resulting in what is referred to herein as RTCCtP (Real time Conversational Control Protocol). This architecture is illustrated in FIG. 11.

As is known in the art, RTCP is based on a periodic transmission of control packets to all participants in a session, using the same distribution mechanism as the RTP packets. The underlying transport protocol must provide multiplexing of the data and control packets, for example, using separate port numbers with UDP. As is further known in the art, the RTCP specification defines several RTCP packet types to carry a variety of control information, where each RTCP packet type is allocated a unique identification code. For instance, the RTCP packet types include sender reports (SR) (code 200) for transmission and reception statistics from participants that are active senders, as well as receiver reports (RR) (code 201) for reception statistics from participants that are not active senders. RTP receivers provide reception quality feedback using RTCP report packets which may be SR or RR reports, depending on whether or not the receiver is also a sender. The only difference between the sender report (SR) and the receiver report (RR) forms, besides the packet type code, is that the SR includes a 20-byte sender information section for use by active senders. The SR is issued if a site has sent any data packets during the interval since issuing the last report or the previous one, otherwise the RR is issued. Other packet types include source description (SDES) (code 202) packets comprising source description items such as CNAME (canocial endpoint identifier), BYE packets (code 203) to indicate end of participation, and APP packets (code 204) for application specific functions.

As is known in the art, each RTCP packet begins with a fixed header similar to that of RTP data packets, followed by structure elements that may be of variable length according to the packet type, but which always end on a 32-bit boundary (so as to allow RTCP packets to be "stackable" or concatenated to form a compound RTCP packet that is sent in a single packet of the lower layer protocol, e.g., UDP).

In accordance with a preferred embodiment of the present invention, in addition to the conventional RTCP functions, RTCP is extended to RTCCtP to include application specific functions for conversational distributed functions. More specifically, in addition to the conventional RTCP functions, RTCP sender and receiver reports, for example, can be extended with suitable profile-specific extensions to support coding scheme notifications (signal/agree on changes of coding schemes). Other application specific extensions for conversational distributed functions include, e.g., RTCCtP identifiers, header extension length, code bits for RTCCtP functions, packet receipt request and acknowledgments, and codec change notification/request for confirmation, etc. These messages are propagated through the RTCP layer associated with the RTP stream.

By way of example, for purposes of error correction, RTCCtP messages can require packet repetition and provide the packet sequence number of the packets to be repeated. In one embodiment, the RECOVC header of the RTCCP packet is repeated based on the receivers report (RR) in the RTCCtP stream. In a default case, the RECOVC header is repeated until confirmation is obtained from the receiver. The receiver must confirm to the sender the receipt of an X=1 packet and provide the packet ID/sequence number.

Figure 13:
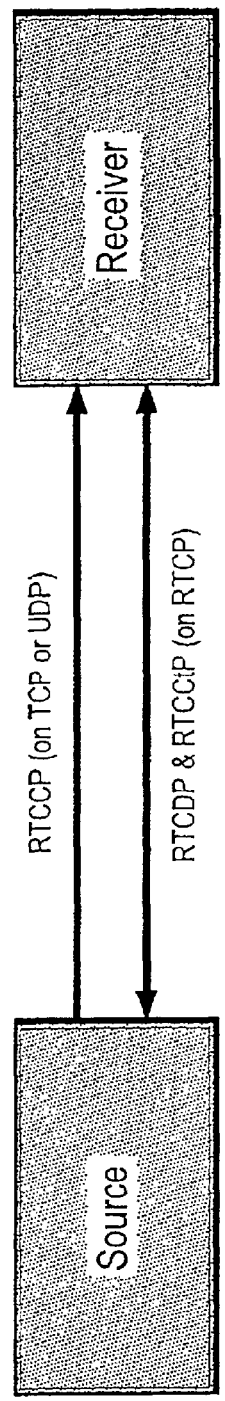
FIG. 13 is a diagram illustrating conversational protocols according to another aspect of the present invention that are implemented for network communication between a source and a receiver.

It is to be understood that in the absence of RTP/RTCP, to provide control, the source may transmit the RECOVC header until confirmation is received by the source for all registered receivers. Moreover, in the absence of RTP support by the transport layer, similar functions must be emulated between clients and servers. Furthermore, in the absence of RTCP support by the transport layer, similar functions must be emulated between the clients and servers. It is to be appreciated that in accordance with another aspect of the present invention, RTCCtP may be further extended to transmit other application-specific control data between, e.g., a client (source) and a speech server (receiver) for providing conversational distributed functions. In a preferred embodiment, when additional RTCP packets are needed for immediate information transfer, the APP RTCP packet type (code 204) noted above is preferably utilized to provide an application-specific extension for implementing the conversational distributed functions. A preferred complete control protocol is referred to herein as RTCDP (Real-Time Conversational Distributed Protocols). This is illustrated in FIG. 13, where, preferably, RTCCP is implemented on top of UDP (real-time) or TCP (non real-time) and a reliable layer carries RTCP, RTCCtP and RTCDP. It should be noted that control data may also be conveyed via other conventional connections such as sockets, RPC, RMI and HTTP.

Figure 12:
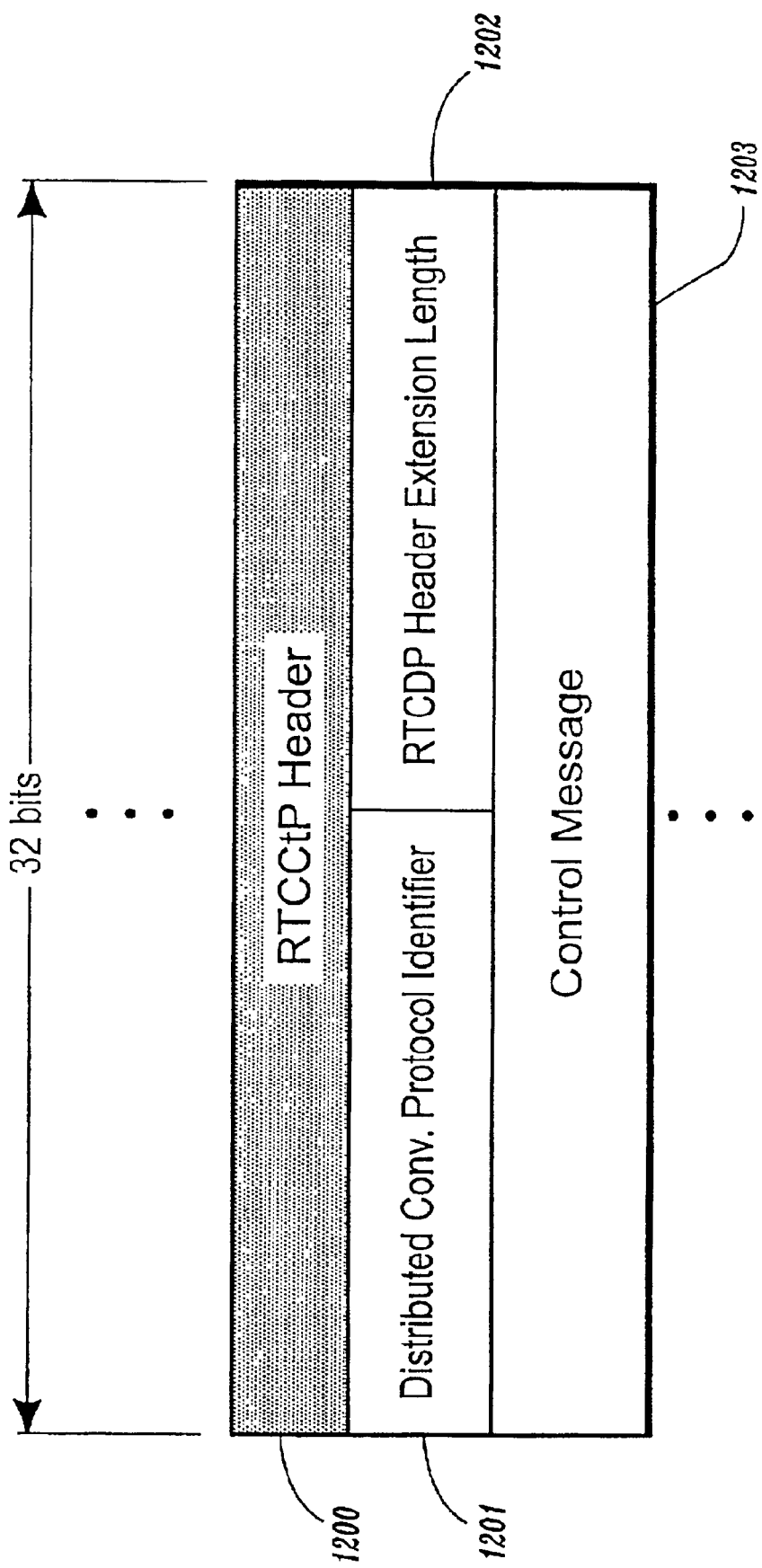
FIG. 12 is a diagram illustrating a method for implementing RTCDP (real time conversational distributed protocol) on top of RTCP according to one aspect of the present invention.

Referring to FIG. 12, a diagram illustrates an extension of RTCP/RTCCtP to implement the preferred RTCDP. FIG. 12 illustrates a preferred method for implementing RTCDP by adding (to the RTCCtP header) another header to carry the control data. An RTCCtP header 1200 (which comprises and extension of the RTCP header) is preferably extended by adding a 16 bit identifier field 1201 indicating the type of conversational distributed protocol (e.g., remote control of an engine, or a synchronization or negotiation protocol, etc.), when such nomenclature is implemented (if none exists, the field 1201 may be used for padding). Further, a 16-bit header extension length field 1202 describes the length of the header. A data field 1203 carries a message of the streamed protocol in successive 32 bit fields.

It is to be appreciated that depending on the application, any suitable application-specific control data can be transmitted between, e.g., a source and a receiver using RTCCtP for providing conversational distributed functions. For example, the protocols and APIs described above in connection with the above-incorporated International Appl. Nos. PCT/US99/22927, filed on Oct. 1, 1999, entitled: "Conversational Computing Via Conversational Virtual Machine," and International Application No. PCT/US99/22925, filed on Oct. 1, 1999, entitled "System and Method For Providing Network Coordinated Conversational Services," may be implemented to transmit control parameters and messages to support remote control of a speech engine (e.g., start/stop recognition), determine type of recognition to perform (e.g., speech, TTS, speaker recognition, NL parsing, NL tagging, Dialog Management, etc.), what data files to use (e.g., grammar files, acoustic models, language models, tagger data files, parser data file, dialog information, etc.), where and how results of, e.g., a recognition, should be sent, as well as messages that are needed to register, negotiate, and synchronize different engines.

Furthermore, with Voice Browsers and Multi-Modal Browsers (as described below) and other applications, the control messages of RTCCtP may be transmitted as XML data (e.g., URLs pointing to particular algorithms, data files, and engines to be implemented) or byte code representation of XML tags (preferably, XML name space convention according to CML) and values associated with necessary control information. Such control information comprises: field identifiers and/or browser event identifiers (when also sent to Multi-modal shell (described below); argument data file(s) for the engines; format of the result/output to be specified (e.g., audio format (e.g., RTP stream) or text (ASCII, XML, attribute value pairs) or function call), with extra tag information and address of browser to push data; address and method/protocol to send results (back to browser or content server); identifier for the results, and commands to execute. Furthermore, when the stream is sent to a speech server, the XML tags associated with the active input are sent: field information for a directed dialog, active forms (or URLs of forms) for mixed initiative NL, etc. It is to be noted that the packets of streamed XML and protocols may be implemented using SOAP (simple object access protocol). In summary, RTCCtP may be used to transmit all types of control messages depending on the implementation.

Figure 14A:
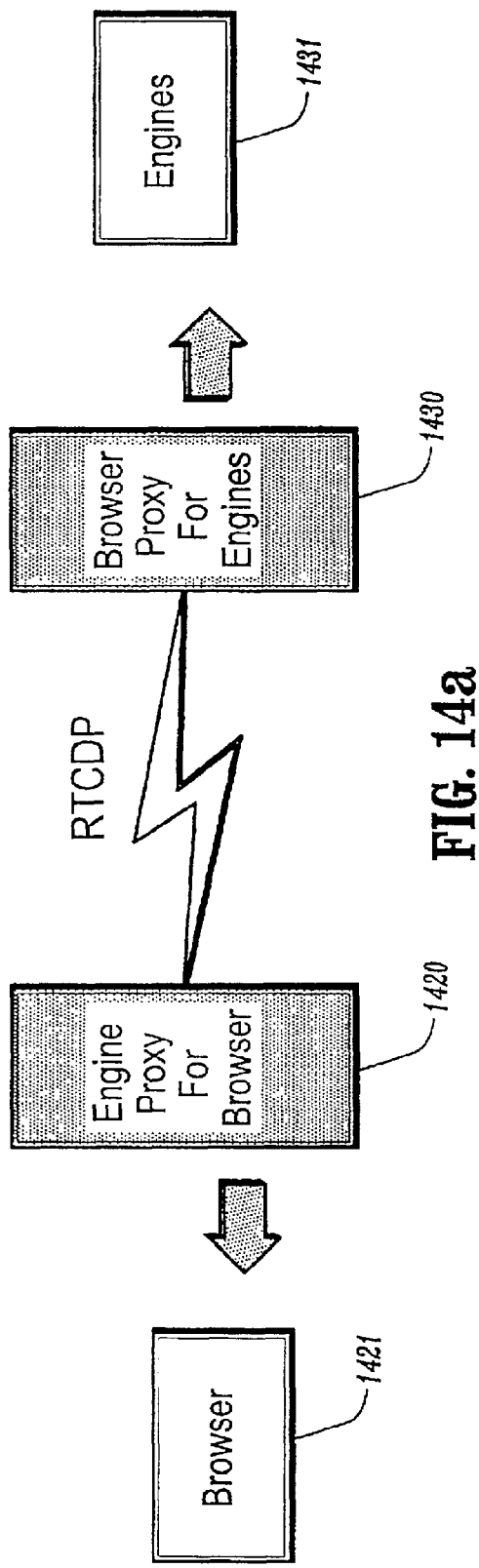
FIG. 14a is a diagram illustrating a system/method for implementing a distributed conversational framework using proxy servers according to one aspect of the present invention.

Referring now to FIG. 14*a*, a diagram illustrates a system/method for implementing a distributed conversational framework using proxy servers according to one aspect of the present invention. The exemplary system of FIG. 14*a* comprises an engine proxy 1420, which operates on behalf of a browser application 1421, and a browser proxy 1430, which operates on behalf of conversational engines 1431. More specifically, for this application, RTCDP is preferably utilized by the proxies 1420, 1430 for exchanging control data to enable the engine proxy 1420 to effectively operate as a local speech engine for the browser, and to enable the browser proxy 1430 to effectively operate as a local browser for the engines 1431. The engines 1431 will directly communicate with the browser proxy 1430 using suitable speech engine APIs and the browser 1421 will communicate with the engine proxy 1420 using the same engine APIs.

Advantageously, this framework allows the engines 1431 and browser application 1421 to disregard the fact that the other component is local, remote, or distributed. Between the proxies, the RTCDP protocols assure real-time exchange of the control parameters. Again, the RTCDP control stream exchanged between the proxies 1420, 1430 may comprise information such as argument data file(s) for the server engines, additional feature transformations, addresses where to send the results (back to browser or to content server), format of result (text, XML or Audio RTP stream), extra tag information and address of browser or server where to push data, identifier for the results, commands to execute, data file: what data file to use and whereto get it from; description of the type of processing to apply, e.g. algorithm string—sequence of actions to perform on the input; expected type and format of the results; address where to return the results; exception handling mechanisms; I/O event notifications (e.g. for a distributed multi-modal browser like DOM (document object model) level 2 events); modality specific view updates (e.g. ML pushes to the modality specific viewing browsers in the multi-modal browser case), etc.

Figure 14B:
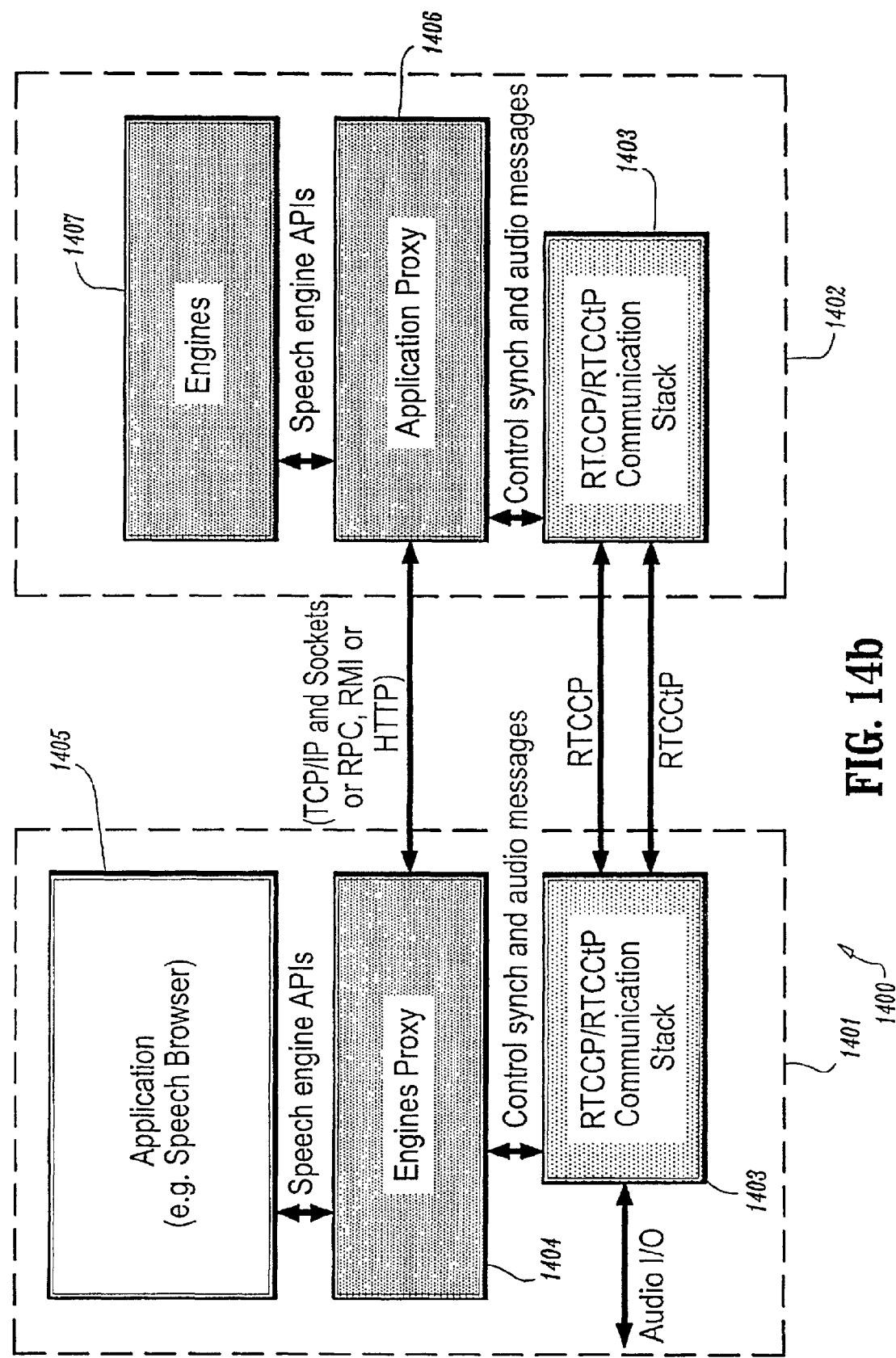
FIG. 14b is a diagram illustrating a system/method for implementing a distributed conversational framework using proxy servers according to another aspect of the present invention.

FIG. 14*b* a diagram illustrates a system/method for implementing a distributed conversational framework using proxy servers according to another aspect of the present invention. The exemplary system 1400 comprises a client 1401 and a server 1402, each comprising an RTCCP/RTCCtP communication stack 1403 according to the teachings herein for real-time exchange and control of audio data. The client 1401 comprises an engine proxy 1404 and a conversational application 1405 such as a speech browser. The server 1402 comprises an application proxy 1406 and conversational engines 1407.

For this application, the proxies operate as described above with reference to FIG. 14*a*, but instead of implementing RTCDP to exchange control data, the proxies utilize conventional protocols such as TCP/IP and sockets or RMI, RPC or HTTP, for example, for control and exchange of the conversational application API/messages/control, wherein the RTCCP and RTCCtP protocols are used for real-time exchange of the audio via the communication stacks 1403.

Indeed, in alternate embodiments of the invention, RTCDP control of, e.g., remote conversational engines can be implemented via remote APIs (e.g., RMI (preferably JSAPI (java speech API with extensions) or RPC) to the engines which precedes argument audio streams, although higher level control is still preferably performed via RTCCtP. The remote calls preferably use TCP (over IP) or any other transport mechanism that reliably guarantees message delivery.

FIGS. 14*a* and *b* are methods for implementing a DSR framework by hiding the fact that engines or audio sub-systems are remotely located (via the proxies). In practice, DSR frameworks can be also achieved by explicitly designing the audio-sub-systems and applications to use remote control protocols (e.g., SERCP as discussed herein (see FIG. 26)) instead of local proxy interfaces. The proxy approach is one option to minimally affect existing code.

Figure 15:
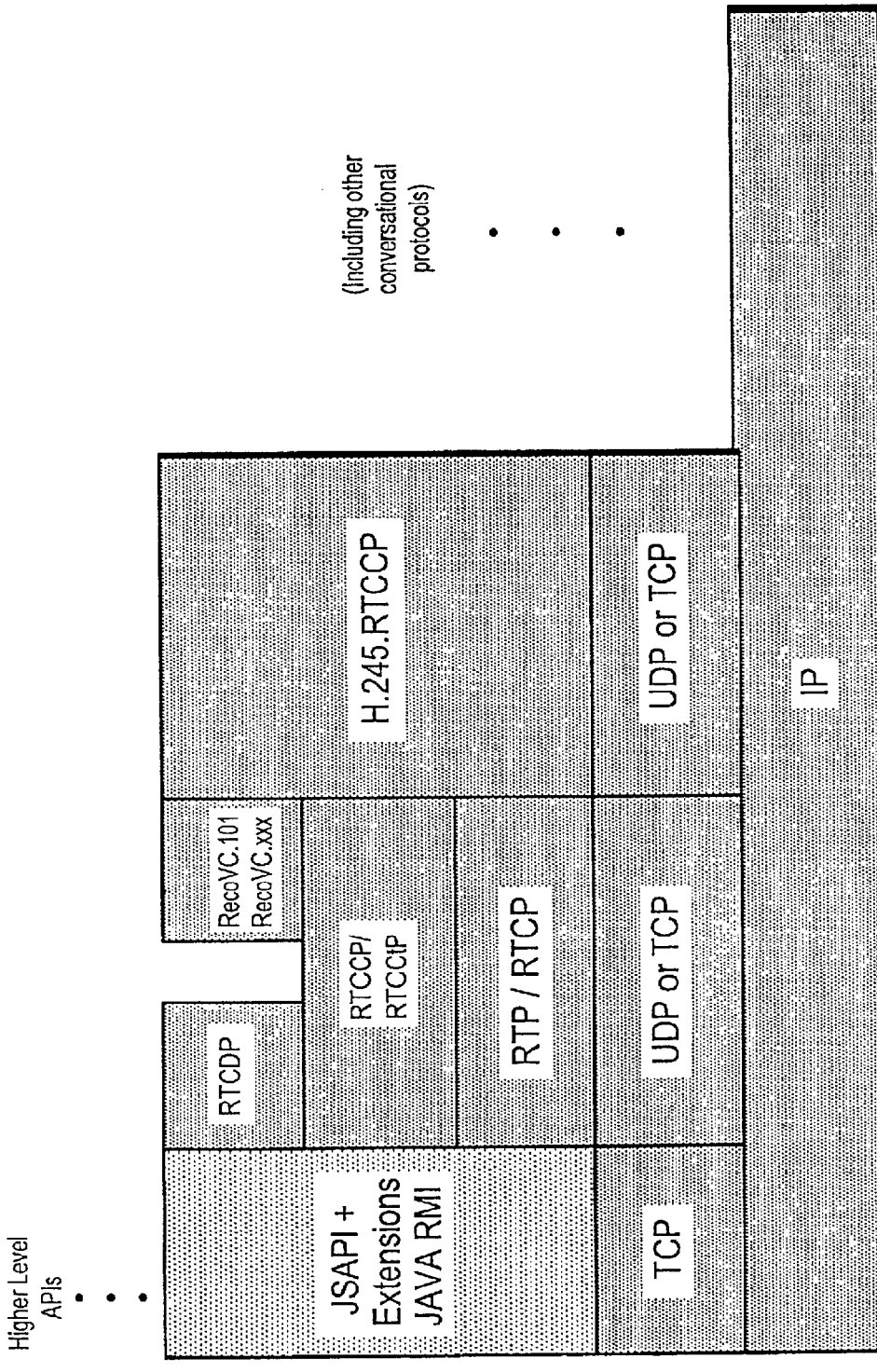
FIG. 15 is a diagram illustrating a conversational protocol stack according to one aspect of the present invention

The overall conversational protocol architecture (or umbrella stack) according to a preferred embodiment of the present invention is illustrated by the diagram of FIG. 15. As illustrated, an extension of H.245 control protocol, i.e., H.245.RTCCP, is implemented on top of UDP/IP or TCP/IP.

In addition, the control protocol RTCDP, which is an extension of RTCCtP/RTCP, is implemented on top of UDP/IP or TCP/IP. Likewise, a preferred streaming protocol, RTCCP, which is generated by wrapping a preferred CODEC file format, RECOVC.xxx, in RTP, is implemented on top of UDP/IP or TCP/IP. Moreover, remote APIs such as JSAPI are preferably implemented on top of TCP/IP. It is to be understood that over IP, an explicit switch from UDP transport to TCP transport is preferably supported by the conversational protocol stack.

Advantageously, the use of RTP-based conversational protocols as described herein guarantees that the conversational protocols are compatible with, and can be extended to, any network (existing or future) that supports streamed data and Voice over IP or packet voice communications. For example, as discussed below, well-known protocols such as H.323 and SIP (session initiation protocol), which rely on RTP/RTCP can be readily extended to implement the conversational protocols described herein. Moreover, other types of wireless networks can use similar designs adapted to the peculiarity of the underlying communication protocol layers.

Further, as indicated above, it is to be understood that the above-described functions could be directly supported on top of TCP, HTTP or other transport protocols, depending on the important of real-time versus guaranteed packet delivery, using the same conversational protocols and header extensions.

Figure 16:
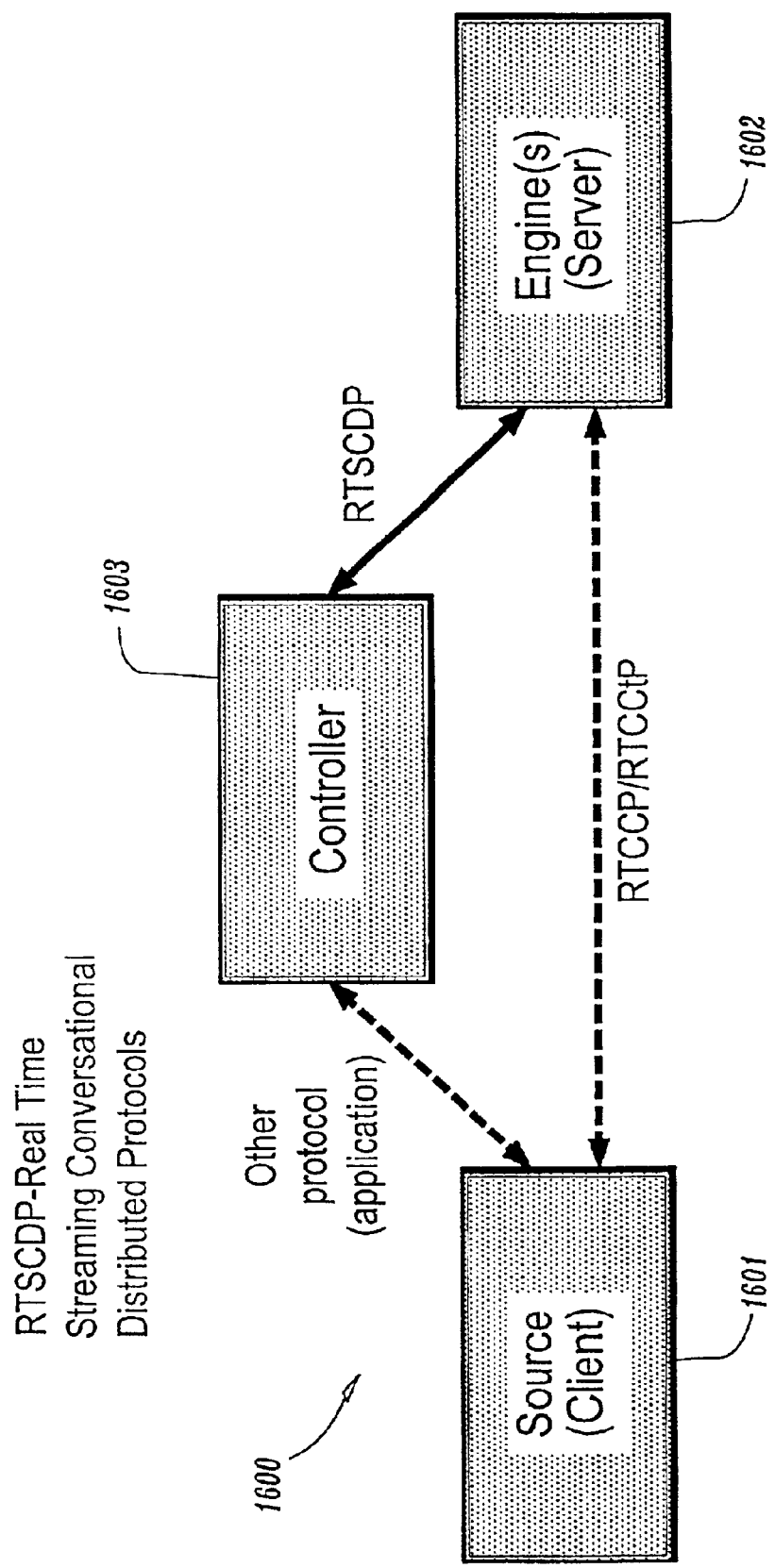
FIG. 16 is a diagram illustrating a system/method for implementing a real-time distributed protocol using RTSP (real time streaming protocol) according to another present invention.

Referring now to FIG. 16, a diagram illustrates a system/method for implementing RTSP (real time streaming protocol) with conversational protocols according to an embodiment of the present invention. In this embodiment, RTCDP messages are preferably wrapped in RTSP (real time streaming protocol) instead of RTCP, to produce what is referred to herein as RTSCDP (real time streaming conversational distributed protocol). This streaming mechanism is preferred when control of conversational engines is performed (via, e.g., SERCP) by another entity other than the source(s) of the audio stream.

More specifically, in FIG. 16, a system 1600 comprises a source 1601 (e.g., a client hand held device which provides speech I/O to a user), a controller 1603 (e.g., an application such as a speech browser) and a server 1602 comprising one or more conversational engines that process the speech I/O, all of which are remotely connected over a network. The source 1601 and server 1602 communicate via RTCCP/RTCCtP. The source 1601 and controller 1603 communicate via any suitable application protocol. The controller 1603 and server 1602 communicate via RTSCDP.

Preferably, the RTSCDP protocol is used when control of the conversational engines 1602 is performed by the controller 1603 and not the source 1601. In such a case, it is preferable to ship the audio from the source 1601 directly to the server 1602 engines, instead of shipping audio from the source 1601 to the controller 1603 (browser), and then having the controller 1603 ship the audio and control data to the server engines 1602.

If the audio is not shipped from the controller 1603, it does not utilize the RTCCtP layer. But in a Voice over IP environment, for example, the RTSP protocol has been explicitly developed to act as a remote control of an appliance/service (i.e., controller 1602) acting on a RTP stream with appropriate synchronization features with the RTP stream when needed. Therefore, given the current VoIP framework, it is advantageous to extend RTSP to add the conversational control messages (transmitted between the controller 1603 and server 1602) on top of RTSP to control the conversational engines that act on the RTCCP/RTCCtP stream received by the source 1601.

IV. Distributed Conversational Networking Examples

Figure 17:
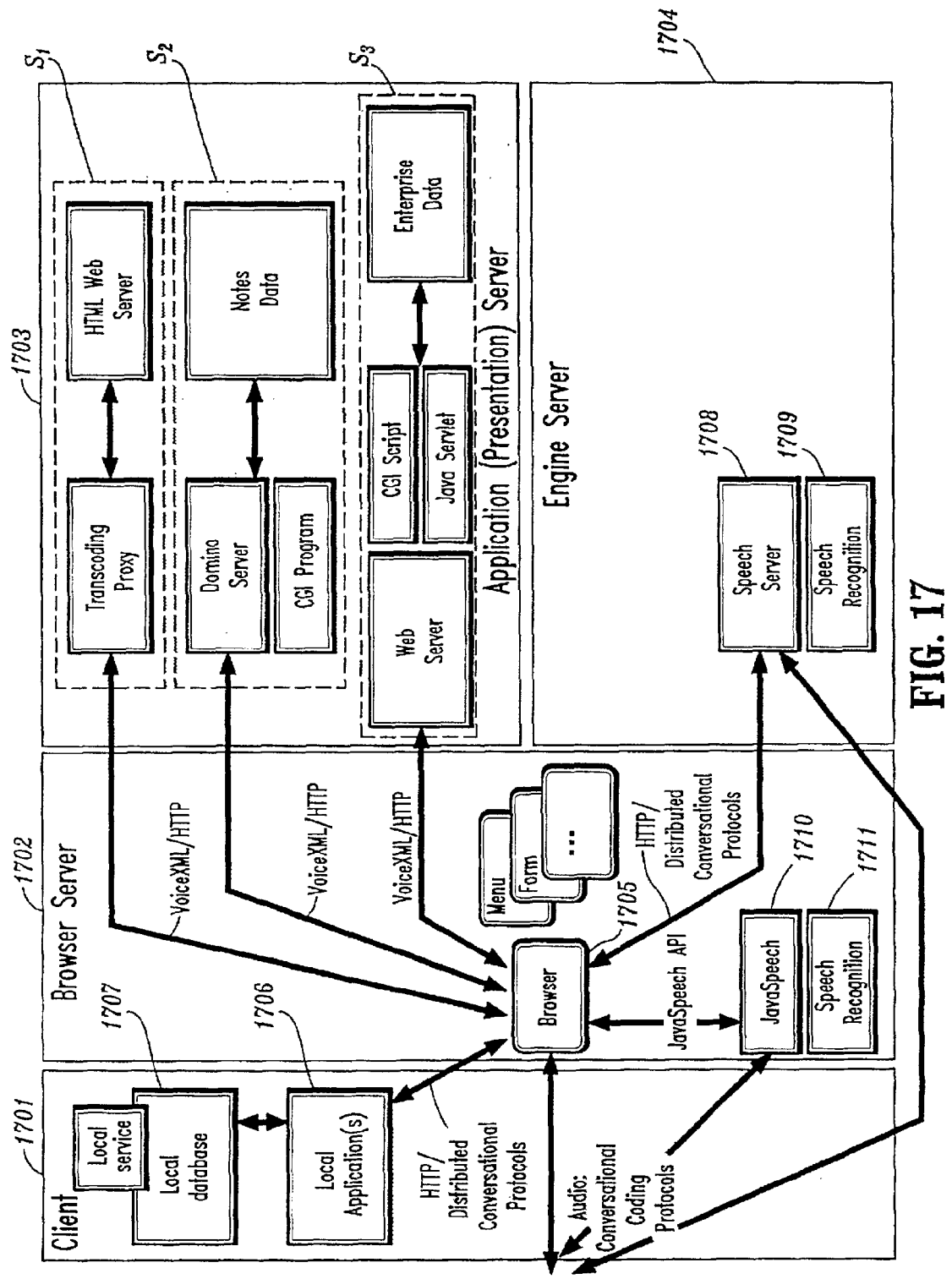
FIG. 17 is a diagram illustrating an exemplary distributed conversational network architecture that may be implemented using conversational protocols according to the present invention.

Referring now to FIG. 17, a diagram illustrates an exemplary distributed conversational network that may be implemented using the conversational protocols described herein. In particular, a system 1700 of FIG. 17 illustrates a distributed architecture comprising a conversational (speech) browser. A detailed discussion of the architecture and operation of the speech browser is disclosed, for example, in International Appl. No. PCT/US99/23008, filed on Oct. 1, 1999, entitled "Conversational Browser and Conversational Systems", which is commonly assigned, and fully incorporated herein by reference (which also claims priority from the above-incorporated U.S. Patent Application Ser. Nos. 60/102,957 and 60/117,595). The conversational (speech) browser operates to parse the declarative framework (including the imperative specification) of a VoiceXML page (or any other form of SpeechML (speech markup language)) and render the conversational UI of the target content or transaction to a user. VoiceXML is a speechML that has been recently designed and proposed as a standard for declaratively describing the conversational UI for, e.g., speech browsers and IVR platforms. Example implementations and details of VoiceXML can be found at the VoiceXML home page (www.voicexml.org). The VoiceXML standard is an embodiment of the speech markup language described in the above-incorporated application International Appl. No. PCT/US99/23008.

Conventional implementations of speech browsers assume local processing of speech. This is true for browsers that are local on pervasive clients or remote on servers (e.g. telephony servers). It is to be appreciated, however, that the speech recognition engine (and other conversational engines) can be remotely located from the client device, machine, or platform that captures the speech. Indeed, within the Voice XML 0.9 specifications, this can be artificially implemented through a grammar specification.

By way of example, as illustrated in FIG. 17, the distributed conversational system 1700 comprises a local client 1701, a browser server 1702, an application server 1703 and an engine server 1701, all of which are distributed over a network and communicate using the conversational protocols described herein. A speech browser 1705 is located on the browser server 1704 which is accessed by the client 1701. As explained below, the browser server 1702 can act as an intermediary between the client 1701 and the presentation server 1702 and/or engine server 1704. The browser 1705 receives pages of VoiceXML from the application (presentation) server 1703 and processes such pages to render the conversational UI of the pages or transactions.

The client device 1701 may be, for example, a desktop PC (personal computer), a PDA (personal digital assistant), an automobile computer, a smart phone or a conventional telephone. The client 1701 may also comprise one or more speech-enabled local applications 1706 (and a database 1707) running on the client 1701. The client utilizes using conversational protocols described herein to communicate with the speech browser 1705. For example, the local application may be a car navigation application in which a "Speech Navigation Application" interacts with computer mapping software and a GPS (Global Positioning System) device to provide conversational driving directions. In addition, the local application may be a local speech browser, wherein the functions between the local speech browser and speech browser 1705 are distributed. In addition, functions between a local speech engine and remote speech engine may be distributed.

The browser server 1702 can access any one of a plurality of server systems S1, S2, and S3 over network (e.g., the Internet) using a standard network protocol (e.g., HTTP, TCP/IP) to access VoiceXML pages on behalf of the client device 1701/local application 1706 and parse and process the page/transaction via the speech browser 1705. For example, the speech browser 1705 can connect to server S1 to access existing HTML information via a transcoding proxy that transcodes, e.g., legacy HTML documents to VoiceXML documents. In addition, the speech browser 1705 can connect to a specialized web server application (S2) such as Lotus Domino server to access Notes data (e.g., Notes e-mail) via a CGI application. In particular, the Domino server can be configured to generate VoiceXML pages and transmit pages using HTTP. In another example, the speech browser 1705 can connect to a web server application (S3), using a CGI application or Java Servlet to access an legacy database of an enterprise, wherein the web application generates and transmits the information in VoiceXML.

In the exemplary distributed system of FIG. 17, it is to be appreciated that the conversational protocols described herein may be implemented for communication between the client 1701 and the browser server 1702 and/or the client 1701 and the engine server 1704 and/or the browser server 1702 and the engine server 1004. For instance, the real-time conversational coding protocols described herein (e.g., RTCCP) may be used to ship captured audio from the client 1701 directly to the (1) speech browser 1705 of the browser server 1702 (which can the determine where to ship the speech for processing), (2) the speech server 1708 of the engine server 1704 for processing by the remote speech recognition engine 1709, and/or (3) the speech recognition engine 1711 (via, e.g., Java Speech API 1710). It is to be understood that the transmission of the speech may be performed via conventional analog transmission of telephony speech or analog or digital transmission of speech coded with a conventional CODEC (e.g. GSM, G.711, etc).

It is to be appreciated that the system of FIG. 17 enables a hybrid client/server architecture, wherein encoded speech data (e.g., RTCCP stream) is transmitted from the audio subsystem of the client 1701 to the speech browser 1702 and the speech browser 1705 determines whether to perform local or server-side processing. More specifically, based on the application logic loaded in the speech browser 1705, or based on meta-information within a VoiceXML page/application downloaded from the application server 1703 specifying where to ship the speech (received from the client 1701) for processing, the encoded speech data may be processed locally (via, e.g., the local speech recognition engine 1711 of the browser server 1702 or the remote speech recognition engine 1709 of the engine server 1704). In this manner, the application developer specifies this through the XML pages that declaratively describes the application. For example, assuming a VoiceXML page requires processing of the speech by the engine server 1704, the speech browser 1705 can communicate with the speech server 1708 using the conversational distributed protocols described herein (or via HTTP or sockets or RMI) to ship the audio to the speech server and send the appropriate data file instructions and engine calls.

Indeed, rather than redirecting the RTCCP sent from the client 1701, it is advantageous to send the RTCCP stream to the browser 1705 which redirects or multi-casts the RTCCP stream appropriately (this is different from the method described above with reference to FIG. 14, wherein the source transmits the RTCCP stream to the engine server instead of the controller (browser), and RTSCDP is used for communication between the browser and engines). As noted above, the shift between local speech processing (via the browser server 1702) and server-side speech processing (via the engine server 1704) can be determined by the VoiceXML page from the application server 400. Furthermore, this determination can be coded by the content provider or the adaptation to the device, e.g., the browser server 1702 may determine that its local resources are insufficient for processing the speech and then ships the speech for remote processing via a known or designated server.

Alternatively, the conversational protocols described herein (e.g., RTCCtP/RTCDP) provide a mechanism whereby the speech browser 1705 can communicate with the client 1701 to advise the client 1701 where to direct the RTCCP stream for remote processing. For instance, as shown in FIG. 17, the audio can be shipped from the client 1701 directly to the engines of the browser server 1702 or the engines of the engine server 1704.

Figure 18:
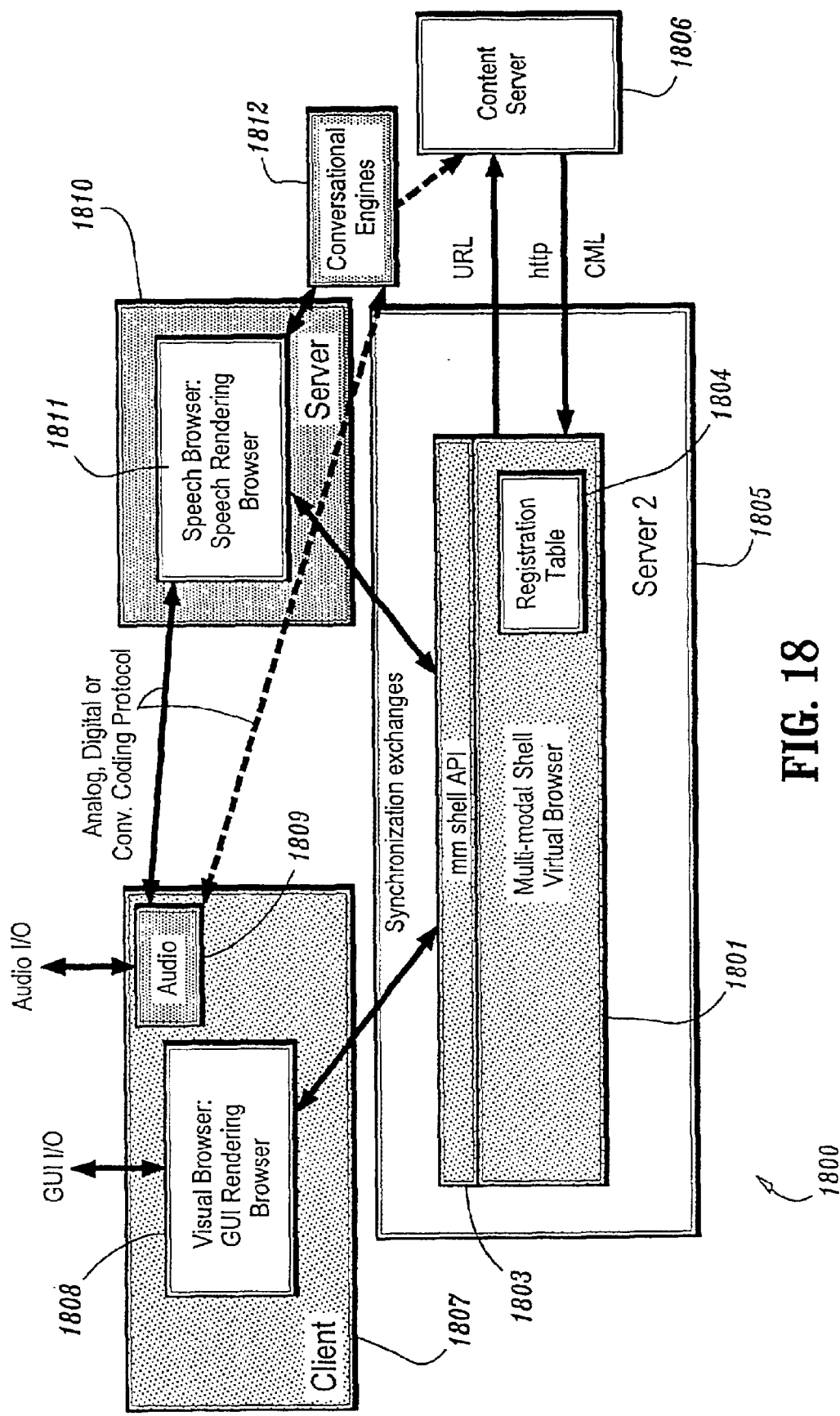
FIG. 18 is a diagram illustrating another exemplary distributed conversational networking architecture that may be implemented using conversational protocols according to the present invention.

FIG. 18 is a diagram that illustrates another exemplary distributed architecture that may be implemented using the conversational protocols described herein. In particular, the conversational system 1800 of FIG. 18 illustrates a distributed architecture comprising a conversational (multi-modal) browser and CML (conversational markup language). A detailed discussion of the architecture and operation of the multi-modal browser, as well as various CML formats, are disclosed, for example, in U.S. Ser. No. 09/507,526, filed on Feb. 18, 2000, entitled "Systems and Methods for Synchronizing Multi-Modal Interactions" and U.S. Ser. No. 09/544,823, filed on Apr. 6, 2000, entitled "Methods and Systems For Multi-Modal Browsing and Implementation of A Conversational Markup Language," both of which are commonly assigned and fully incorporated herein by reference.

In general, as described in the above-incorporated applications, a multi-modal browser comprises a multi-modal shell that parses and interprets CML (multi-modal) documents and mediates among, and coordinates synchronized information exchange between, multiple modality specific browser components (e.g., a visual browser and a speech browser). In one embodiment, content pages and applications are implemented in a gesture-based single authoring CML format, wherein conversational gestures are elementary dialog components that characterize the dialog interaction with the user and provide abstract representation of the dialog independently of the characteristics and UI offered by the device or application rendering the presentation material. The multi-modal browser processes a gesture-based CML document using specific predefined rules to automatically transcode the gesture-based CML document to any supported presentation modality or modalities of the particular browser or device (e.g., transcoded to the appropriate declarative language such as HTML, XHTML, or XML (for automated business-to-business exchanges), WML for wireless portals and VoiceXML for speech applications and IVR systems, etc.), as well as provide tight synchronization between the different views supported by the multi-modal browser.

In another embodiment, CML may be implemented by incorporating a plurality of visual and aural markup languages (i.e., a CML document that comprises sub-documents from different interaction modalities). For example, a CML document may be implemented by embedding markup elements from each of a plurality of represented/supported modalities (e.g., VoiceXML and HTML tags) in the same file using synchronizing tags to synchronize the different ML content (i.e., to synchronize an action of a given command in one modality with corresponding actions in the other supported modalities) on an element-by-element basis using, for example, the techniques described in the above-incorporated application International Appl. No. PCT/US99/23008, as well as U.S. Ser. No. 09/507,526.

In FIG. 18, the exemplary distributed system 1800 comprises server 1805 comprising a multi-modal browser (which comprises a multi-modal shell 1801, a registration table 1804 and multi-modal shell API 1803), a client device 1807 (which comprises a visual browser 1808 and an audio subsystem 1809), a server 1810 comprising a speech browser 1811, a plurality of remote conversational engines 1812 and a content server 1806 having content that is authored in CML. In the exemplary system 1800, the mono-mode browsers 1808, 1811 execute devices/servers that are remotely located from the server 1805 comprising the multi-modal browser. The multi-modal shell 1801 functions as a virtual main browser which processes CML documents retrieved over the network from content server 1806. The multi-modal shell 1801 coordinates information exchange via API 1803 calls that allow each mono-mode browser application 1808, 1811 to register its active commands and corresponding actions (both inter and intra mode processes as well as actions on other processes). Such registration may include any relevant arguments to perform the appropriate task(s) associated with such commands. The registration table 43 of the multi-modal shell 42 is a registry that is implemented as an "n-way" command/event-to-action registration table, wherein each registered command or event in the table indicates a particular action that results in each of the "n" modalities that are synchronized and shared for the active application. The multi-modal shell 1801 parses a retrieved CML document to build the synchronization via the registration table 1804 and send the relevant modality specific information (e.g., markup language) comprising the CML document to each browser for rendering based on its interaction modality.

As shown in FIG. 18, the client 1808 (which comprises the GUI rendering browser 1808), the multi-modal browser 1801, the speech rendering browser 1811, the conversational engines 1812 and the content/application servers are distributed over a network. Using the conversational protocols described herein, speech data that is captured and encoded at the client 1807 via the audio subsystem 1809 can be shipped (via RTCCP) directly to the speech browser 1811 of server 1810 or the conversational engines 1812 for remote processing, or sent to the multi-modal shell 1801 which then redirects the stream. Moreover, the I/O events of the visual browser 1808 and speech browser 811 and synchronization exchanges can be shipped between the mono-modal browsers 1808, 1811 and the multi-modal shell 1801 using RTCDP, for example. Indeed, the non-streamed events (e.g., GUI events) and information to control the stream are preferably sent via the reliable layer (i.e. RTCDP). The control information (via RTCDP) describes how to process the I/O event (e.g., what data files to use, what processing to perform, whereto send the results, what format of the results, etc.). For instance, using the conversational control protocols described herein, the appropriate conversational engine can process the data according to the specified algorithm (e.g., speech recognition using grammar xxxx, followed by natural language understanding using engine yyy and data files zzzz) and ship the results (as specified by RTCDP) to the address (as specified by RTCDP). If the results are audio (e.g., synthesizes speech from a TTS (text-to-speech) engine, etc.), the results are shipped via RTCCP, for example. It is to be appreciated that all the control information may be encoded by the application developer (and completed via default settings by the browser and other components of the architecture such as the audio capture component).

It is to be appreciated that conversational protocols described herein (e.g., RTCCP, RTCCtP/RTCDP) may be used to implement low-bandwidth Voice over IP. For instance, using RECOVC described herein, the H.323 protocol stack (which is a standard is known in the art for a set of protocols providing voice, video and data conferencing over packet-based networks) can be readily extended to encompass RECOVC (i.e., H.323.RTCCP) and add conversational networking as a basic Voice over IP feature. Indeed, all other Voice over IP protocols such as H.323 that implement RTP can be extended using the conversational protocols described herein to allow direct two way voice communications between a regular device (e.g., telephone) and a device connected on a low bandwidth network, while also preserving capabilities to offer conversational functions.

Figure 19:
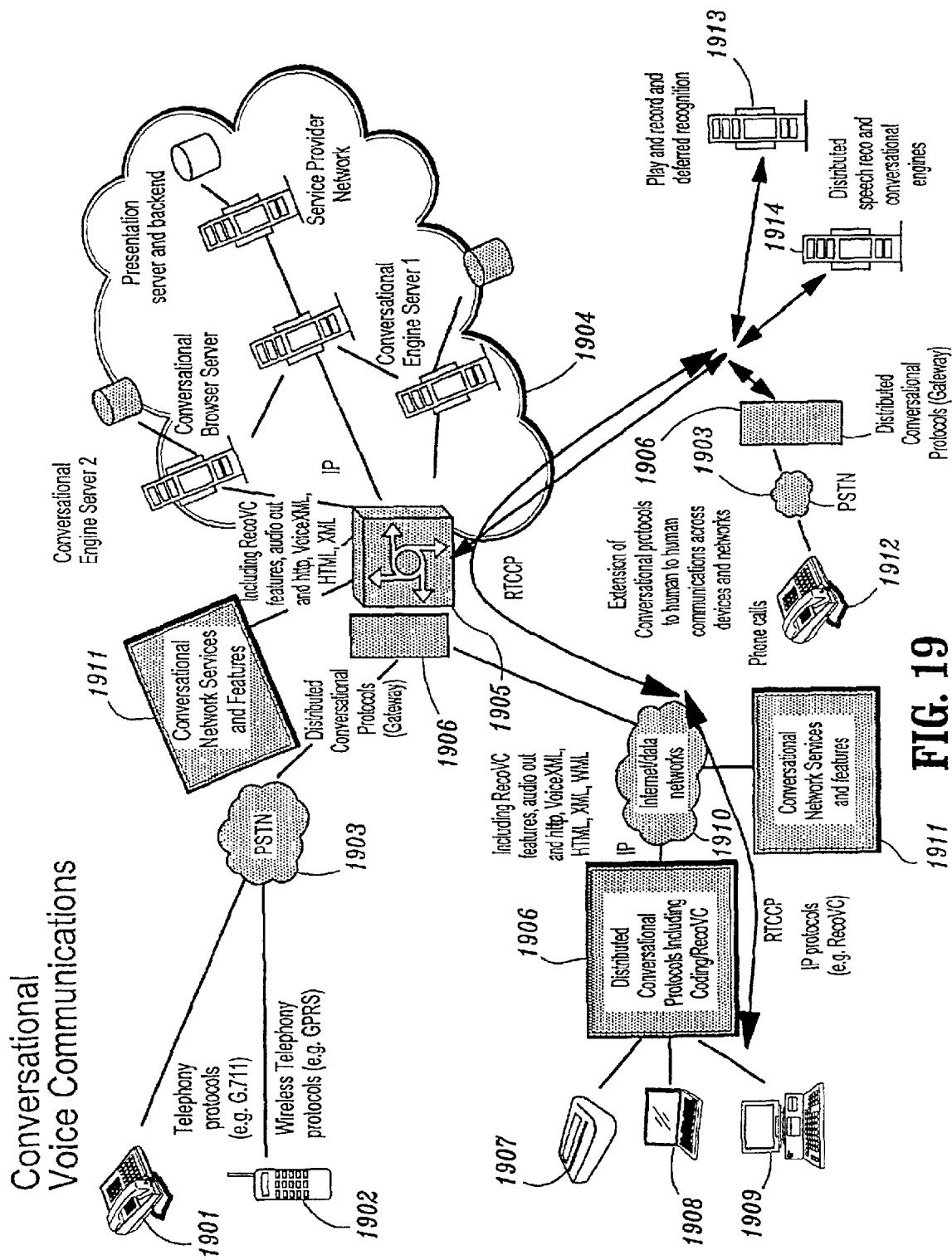
FIG. 19 is a diagram illustrating another exemplary distributed conversational networking architecture that may be implemented using conversational protocols according to the present invention.

By way of example, FIG. 19 illustrates a conversational distributed system 1904 which is accessible via a telephone (land line or wireless) or through a computer network 1910 (e.g., Internet), wherein the distributed conversational system 1904 comprises conversational browser servers, speech engine servers, and content and data files that are distributed over the network 1904. More specifically, as shown in FIG. 19, client devices such as a conventional telephone 1901 and wireless phone 1902 can access desired information from a distributed conversational system 1904 by connecting via a PSTN 1903 and router 1004. In addition, client devices such as a PDA 1907, laptop computer 1908 and personal computer 1909 can access the distributed conversational system 1904 via network 1910. The distributed system 1904 and network 1910 provide conversational network service extensions and features 1911 including distributed conversational protocols 1906 (discussed above), audio coding via RECOVC, applications and meta-information (distributed application protocol), discovery, registration, negotiation protocols, server load management to maintain dialog flow, traffic balancing and routing to maintain dialog flow, engine server selection based on task features and capability requirements and conversational argument availability (data files), conversational arguments (distribution: storage), traffic/routing and caching.

AS further illustrated in FIG. 19, RTCCP and RTCCtP/RTCDP can be used for a low bit rate two way human to human communication using the RECOVC codec. In particular, Voice over IP may employ the conversational protocols described herein to implement human to human communication between devices 1907, 1908, or 1909 and telephone 1912, where digital/analog speech data is transmitted over PSTN 1903 from the telephone 1903 converted to RTCCP and otherwise processed via servers 1913 and 1914.

It is to be understood that when conversational application are widely distributed across a network, mechanism should be employed to mitigate traffic and delay and some quality of service must be guaranteed and accordingly the network must be managed to provide this quality of service. This is implemented with conventional methods, however new consideration must be added to the cost functions to optimize. Indeed, the conversational distributed systems described herein require:

1. Data files (usually large) to be shipped to the appropriate conversational engines;
2. System management of the conversational engines to minimize processing delay;
3. Multiple transfer (e.g. between audio capture and browser and engine, between engine and browser, between browser and content server etc.)
4. Other synchronized data (multi-modal synchronization data, registration information, I/O events etc.).

This impacts the management (network and server systems) and renders even more acute the problem of intelligent network caching (not only of the content/business logic but also of the data files), storage, traffic routing, etc. Again all this is done using conventional method the novelty of the invention is that the optimization criteria has changed.

V. Extensions for DSR and Multi-Modal Protocol Stacks

In traditional systems, a speech recognition system resides on a server appliance and the speech recognition system is forced to use incoming speech in whatever condition it arrives in after the network decodes the encoded speech. As noted above, in accordance with the present invention, a solution that combats this problem is a scheme called "distributed speech recognition" (DSR)

In general, a DSR framework according to an embodiment of the present invention distributes the audio subsystem and speech services by streaming encoded speech between a client and server. In one embodiment of DSR, a client device acts as a thin client in communication with a speech recognition server. The client device processes the speech, compresses, and error protects the bitstream in a manner optimal for speech recognition. The speech engine then uses this representation directly, minimizing the signal processing necessary and benefiting from enhanced error concealment. The use of appropriate DSR optimized codec (s) improves the performance of the speech system. However, As explained earlier, the use of a DSR optimized codec is not mandatory and conventional codecs, e.g., AMR or G7.11, etc, may be used in the DSR framework.

It is to be understood that DSR based approaches that do not rely on DSR optimized codecs can be employed when a voice channel is available simultaneously to a data channel (voice and data—e.g. GPRS or W-CDMA), and enough bandwidth is available, wherein the voice channel can be used to transport voice to the conversational engines. Such an approach, however, has some challenges in that suitable voice and data channels are not yet widely available over wireless networks (or even over modem connections) and it will take time before this capability will have worldwide coverage. Further, conventional voice channels may significantly degrade the voice signal transmitted to distributed conversational engines, resulting in sub optimal accuracy degradations. This emphasizes the value of DSR optimized schemes such as those described herein.

Indeed, a fundamental value proposition of DSR optimized encoding according to the invention is that it relies on a compression scheme that has been optimized to minimize the distortion of the acoustic features. This can be contrasted with other compression schemes designed with other cost functions to minimize, for a given bit rate, some perceptual impact of distortions of the waveform or the spectrum, with no regard for the impact of the compression on some acoustic features (e.g. AMR, G711, G723, etc.)

There are a variety of factors that support the use of DSR in a distributed environment. For instance, with respect to server-side applications with conventional speech exchanges, performance degradations can be encountered for, e.g., telephony or wireless speech recognition if voice is transmitted over a conventional voice channel. Further, with respect to client-side applications with speech functions performed on the client device, there may be limited client resources (e.g., CPU, memory) with respect to conversational engine requirements. There may be too low bandwidth to send data files from the server to a local client conversational engine. There can be a delay in sending data files (grammars, acoustic models, etc.) from the server to a local conversational engine and such data file may even be proprietary and not accessible for download. Further, security protocols (e.g., speaker identification, etc) are preferred for server-side processing, wherein client side authentication is considered a weak security solution. There can be problems with network and system load management. Further, client applications may require specialized conversational engines using specialized algorithms and functions (which are remotely located on a network), which are not provided by generic local engines and which are not typically supported by client engines.

However, there are challenges to conventional DSR schemes. Different coding schemes have been proposed to guarantee that speech compression and transport does not introduce any degradation of the conversational engine performances. For example, the ETSI Aurora Front-end working group (ES 201 108) has established different work items to specify such font-ends. The latest work item is directed to specify robust front-ends.

The standardization of a front-end for speech recognition is extremely challenging. Each speech vendor has a different acoustic front-end optimized for its recognition algorithm. Typically, these front-ends change as a function of the task. Further, various vendors use different acoustic front-ends for other conversational engines such as speaker recognizers, while other vendors use the same front-ends with possibly different transformations. As a result, given the history of conversational technologies, it seems premature to impose a frozen acoustic front-end specification and seems especially important to enable selection/negotiation of the encoding scheme.

Notwithstanding the issues surrounding the acoustic front-end, it is also very difficult to test acoustic feature compression schemes. Indeed, even for the same front-end, the distortions introduced by a given compression scheme may be acceptable on various test tasks (e.g., low perplexity and complexity grammar based recognitions), but unacceptable for complex tasks (e.g. LVCSR). Until now, these considerations have severely limited the endorsement of DSR by speech vendors despite its undeniable advantages.

In addition, the bit rate associated with existing DSR schemes like Aurora WI-7, WI-8 may be too high compared to other existing codecs such as GSM AMR 4.75. Therefore, for specific network connections or applications, it is important to provide a compromise between bit rate and minimization of the acoustic feature distortions.

In accordance with the present invention, a DSR framework streams encoded speech in a client/server environment, wherein the encoded speech for the uplink may be encoded using a DSR optimized codec (e.g., Revoc) or other codecs for the uplink. As described herein, a protocol stack enables negotiation of the DSR encoding scheme rather than a priori selection of a particular encoding scheme.

Since speech dialogs as well as multi-modal interactions impose similar real time constraints as human-to-human conversations, a DSR framework according to the present invention comprises a real-time application that is preferably designed with criteria similar to Voice over IP. A DSR framework comprises a communication protocol stack that provides preferably real-time streaming of DSR data (upstream) and perceptually coded data (downstream). The uplink encoding scheme may include a DSR optimized codec or a non DSR optimized codec. As discussed below, DSR can be used for the downlink, but other conventional methods can be used. Further, a DSR framework comprises a handshake mechanism (e.g., SIP negotiation via SIP initiation with SDP) for selecting the upstream and downstream codecs both at the beginning of the exchange and dynamically during the interaction.

Figure 20:
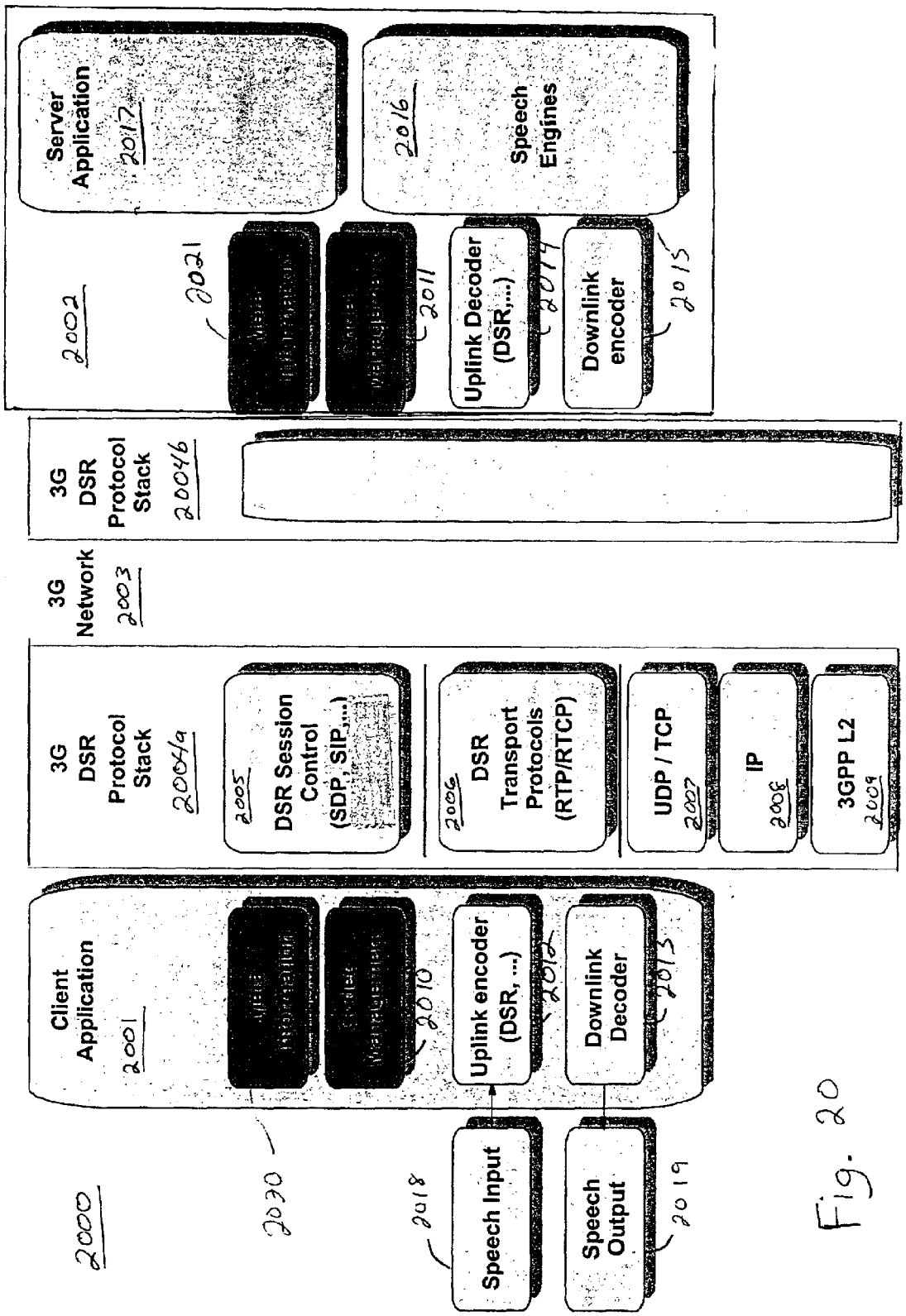
FIG. 20 is a diagram illustrating a DSR system according to an embodiment of the present invention.

FIG. 20 is a diagram illustrating a DSR system according to an embodiment of the present invention. The DSR system of FIG. 20 and associated stack of protocols are implemented to distribute speech engines and applications between a terminal audio subsystem and a server. The system of FIG. 20 is a 3G profile of the framework built on IMS (Internet multimedia streaming)/SIP/SDP and RTP. To that effect, it is to be contrasted with the stack of FIG. 15, which is more H.323 oriented (which is another framework for DSR aimed more at VoIP deployment over wired networks).

The system 2002 comprises a client 2001 and server 2002 that communicate over a network 2003 (e.g. a 3G wireless network) via compatible DSR protocol stacks 2004a, 2004b according to the present invention. A DSR protocol stack according to an embodiment of the present invention comprises a DSR session control layer 2005, a DSR transport protocol/payload layer 2006, a transport layer 2007 (e.g., UDP or TCP), a network layer 2008 (e.g., IP) and a data link/physical layer 2009 (e.g., based on 3GPP (Third-generation Partnership Protocol) L2 layer). As is known in the art, 3GPP (Third Generation Partnership Project) is a collaboration agreement which brings together standards bodies for developing the standards for WCDMA as well as GSM/EDGE technologies. Other wireless or wired infrastructure can be equivalently considered.

The DSR session control layer 2005 initiates and controls DSR uplink and downlink sessions and further provides codec negotiation at the beginning of a session and dynamic codec switching during the session. As explained below, in another embodiment, the DSR session control layer 2005 preferably supports the initiation of additional payload devoted to the exchange of speech meta-information (for example as XML, SOAP etc . . . ). Alternatively, the DSR session control layer 2005 preferably supports the transport of the speech meta-information (e.g., as SOAP messages on SIP). The DSR session control layer 2005 negotiates the appropriate codecs according to various parameters based on, e.g., requirements of various networks using different data bit rates, delays and/or quality options.

Figure 23:
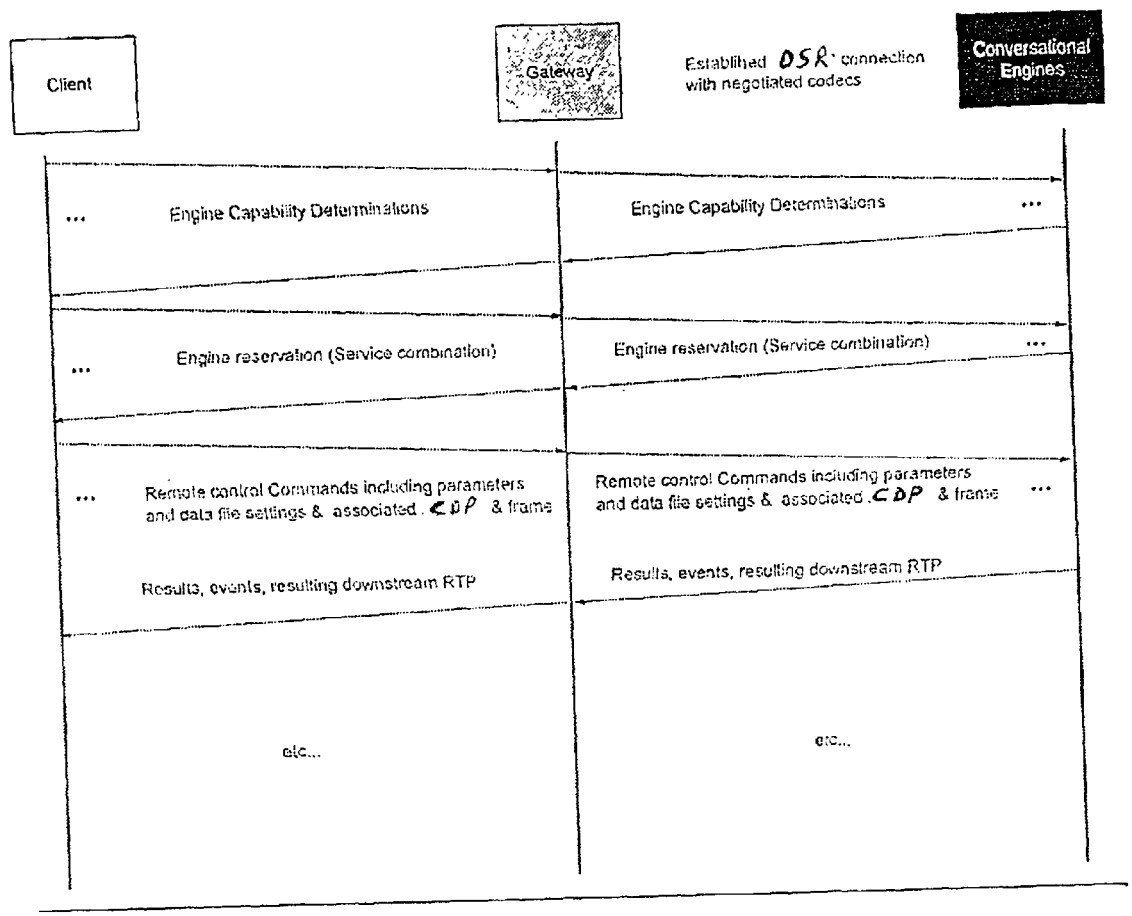
FIG. 23 is a diagram illustrating client/server communication of SERCP (speech engine remote control protocol) data exchanges according to an embodiment of the present invention.

The DSR framework according to the present invention is preferably compatible with Voice over IP protocol or wireless infrastructure (e.g. 3GPP or 3GPP2) with minimum modifications/extensions or more preferably, and more preferably with no modifications. As such, in preferred embodiments, a DSR stack is based on the H.323 protocol standard and is compatible with H.323. In the embodiments of FIGS. 20 and 23, the DSR framework is compatible with 3GPP, IETF, etc., and the SIP (session initiation protocol) standard, SIP gateways and terminals (which may require appropriate registration of the headers and payload with appropriate standard bodies (IETF; 3GPP)). The DSR session control layer 2005 is based, respectively, on the H.323, SIP, and/or SDP (session description protocol) standards (or extensions thereof). In the case of FIGS. 20 and 23, DSR session control is based on SIP and SDP.

H.323 is a standard approved by the ITU (international telecommunication union) to promote compatibility in multimedia communications over IP networks. An H.323 stack is an integrated set of software programs that perform the functions needed to establish and maintain real time multimedia sessions over IP data networks and provides a high level API for the data streams and client application 2001. An H.323 stack comprises a conference manager to manage all conference setup activity, an H.225 layer that handles packetization and synchronization of all media streams during a session and a H.245 layer to control communications between endpoints in the network. The H.245 enables codec selection and capability negotiation within H.323, wherein bit rate, frame rate, picture format, and algorithm choices are elements that are negotiated via H.245.

While H.323 is a recognized standard for VoIP terminals, the IETF (Internet Engineering Task Force) has also produced specifications for other types of multimedia applications. These other specifications include: (i) Session Description Protocol (SDP), RFC 2327; (ii) Session Announcement Protocol (SAP); (iii) Session Initiation Protocol (SIP); and (iv) Real Time Streaming Protocol (RTSP), RFC 2326. The latter three specifications are alternative signaling standards that allow for the transmission of a session description to an interested party (but others exist). SAP is used by multicast session managers to distribute a multicast session description to a large group of recipients, SIP is used to invite an individual user to take part in a point-to-point or unicast session, RTSP is used to interface a server that provides real time data. In all three cases, the session description is described according to SDP. When audio is transmitted, it is transmitted via RTP.

SIP is an IETF standard protocol for initiating an interactive multimedia user session. SIP is a request-response protocol, dealing with requests from clients and responses from servers. Participants are identified by SIP URIs (e. SIP invitations, which are used to create sessions, carry session descriptions which allow participants to agree on a set of compatible media types. SIP supports user mobility by proxying and redirecting requests to the user's current location. Users can register their current location. SIP is not tied to any particular conference control protocol. SIP is designed to be independent of the lower-layer transport protocol and can be extended with additional capabilities. SIP can also be used in conjunction with other call setup and signaling protocols. In that mode, an end system uses SIP exchanges to determine the appropriate end system address and protocol from a given address that is protocol-independent. For example, SIP could be used to determine that the party can be reached via H.323, obtain the H.245 gateway and user address and then use H.225.0 to establish the call. The Session Initiation Protocol is specified in IETF Request for Comments [RFC] 2543, which is incorporated herein by reference.

The Session Description Protocol (SDP) is an ASCII text based protocol for describing multimedia sessions and their related scheduling information. The purpose of SDP is to convey information about media streams in multimedia sessions to allow the recipients of a session description to participate in the session. SDP can be used in conjunction with a connection handling/device control protocol such as SIP to communicate the information needed to set up network connections, including for example, voice connections, voiceband data connections, video connections and baseband data connections (such as fax relay, modem relay, etc.). Standard SDP syntax such as defined in RFC 2327, which is incorporated herein by reference, can be used to describe the network connections, addresses and other parameters.

The DSR transport protocol layer 2006 preferably implements RTP and RTCP to packet the encoded speech data and control data for transmission and control of the encoded speech data over the network. In other embodiments as described below, SIP with SDP and possibly SOAP, WSDL or RTSP can be used to perform the session control and exchange speech meta-information and SERCP (speech engine remote control protocol) instructions as well as multi-modal synchronization (e.g., the synchronization protocols as described, for example, in the above-incorporated U.S. patent application Ser. No. 10/007,092). As further explained below, speech meta-information can be exchanged as RTP payload possibly dynamically switched when interleaved with DSR/speech payload.

As is known, the H.225 protocol of H.323 uses the packet format specified by RTP and RTCP for packaging audio (and video) data for transport, sequence numbering of the data packets and error detection. After a call is initiated, one or more RTP or RTCP connections are established to synchronize the received packets in proper order.

Furthermore, SIP supports RTP and RTCP for transporting real-time data and providing QoS feedback.

When a DSR framework is implemented on wireless networks where packet losses can be a significant problem, it is preferable that the DSR framework be based on SIP over UDP rather than H.323 or SIP over TCP. Indeed, VoIP over TCP is more affected by packet losses than with RTP over UDP. However, in other preferred embodiments, the DSR framework can be designed to be as compatible as possible with the H.323 protocol, wherein various key principles of H.323 (especially H.245) (and extensions thereof) are used to implement specific behaviors of DSR.

Referring again to FIG. 20, the client 2001 comprises a codec manager 2010 for managing a plurality of uplink speech encoders 2012 that encode speech input 2018 (and other audio input) and for managing a plurality of downlink decoders 2013 that decode results generated by engines 2016 and returned to the client 2001. The server 2002 comprises a codec manager 2011 for managing a plurality of uplink speech decoders 2014 that decode the encoded speech (or audio) received from client 2001 for server-side processing via engines 2016. The codec manager 2011 also manages a plurality of downlink encoders 2015 that encode the speech (audio) processing results returned from engines 2016 for transmission to the client 2001. The codec managers 2010 and 2011 select appropriate codecs that are negotiated at the initiation of a session and dynamically switched during a session.

Preferably, in accordance with the present invention, a unique nomenclature is defined to support one more key default DSR optimized codec schemes (including front-end processing and compression) such as RecoVC (as described above) and/or a codec based on the ETSI Standard ES 201 108 front-end. Within the "Aurora" DSR working group of the European Telecommunications Standards Institute (ETSI), a payload is defined as a standard (February 2000 [ES201108] to provide interoperability with different client devices and speech engines, which standard can be selected as the default DSR optimized codec to be supported by all DSR participants. A conventional non DSR optimized codec could also be selected.

In further embodiments of the invention, other codecs are supported to provide Advanced FE, tonal support, reconstruction support, support of tonal languages other sampling frequencies, AMR and other conventional codecs, and proprietary DSR optimized codecs. Preferably the nomenclature is compatible with H.245 tables of H.323 or SIP codecs (conventional/perceptual coders) (SDP syntax). An example of nomenclature can be for SIP/SDP: nNaming codecs with a namespace convention. A proposed syntax that fits current SDP practices is:
{vendor or standard body identifier}/codec name/sampling frequency (in Hz)/(R|N), where R is for reconstruction support and N is for no reconstruction. By default, the default is N as reconstruction is still work in progress at the level of ETSI STQ: WI-30.

Example of the codec naming are: (i) Aurora/DSR/8000 or the equivalent notation Aurora/DSR/8000/N for the ETSI Standard ES 201 108 for DSR (it could also be designated as ETSI/ES201108/8000/N); and (ii) com.ibm/RecoVC/16000/R for IBM RecoVC.

For default downlink codecs, any suitable codec scheme such as GSM (FR, HR, EFR or AMR xx) and/or G.723.1, may be implemented by a DSR framework. Currently, GSM FR is available on mobile phones and, consequently, would be a natural choice. But mobile phones are not the only devices that can support a DSR framework. Preferably, a default DSR scheme and a default codec are support by default (using the H.323 approach, for example, or preferably the SIP/SDP session initiation). This aims at minimizing incompatible connections and also address the concerns of handset and other embedded clients that can only support one DSR compression scheme.

Preferably, a mechanism is employed to immediately identify if an end-point supports the default codec and scheme or not. Further, a mechanism is preferably employed to describe arbitrary (i.e. non default and non-parameterized) DSR schemes (e.g. XPath namespace conventions) (see the proposed naming convention above).

Preferably, a variety of different codecs (other than the default DSR codec) are preferably supported for the uplink and the default downlink codecs. This guarantees that the DSR protocol framework is generic enough to be compatible with DSR clients (e. g. 3G clients), VoIP gateways and IVRs. In addition, this enables the use of codecs specialized for particular algorithms (e. g. speaker recognition, robust features (Aurora WI-8), with or without reconstruction capabilities and tonal language support (Aurora WI-30)) or particular tasks.

In one embodiment, codec identification comprises the following format: DSR/{vendor or standard body identifier}/codec name/sampling frequency (in Hz)/(R|N) wherein, R denoted reconstruction support and N denotes no reconstruction support.

In addition, a DSR framework according to the present invention preferably supports dynamic switching between available codecs. There are various situations in which codecs may be switched during a session. For example, a DSR codec may be switched to a codec that supports dual-tone multi-frequency (DTMF) digits (see RFC 2833), other line and trunk signals and multi-frequency tones (using the RTP payload format described in RFC 2833) for DTMF recognition on server; gateway to server. In addition, codec switches may occur for: (i) silence detection features to DSR features; (ii) Codec specific speaker recognition or other tasks to be applied sequentially or simultaneously; (iii) conventional codec to DSR (when speech is detected); (iv) a default DSR codec to another DSR codec; (v) reconstruction to non-reconstruction (and vice-versa); and (vi) utterance encryption.

In preferred embodiments, the encoded speech data is wrapped/transmitted in RTP streams along with its RTCP control layer. The data in the RTP stream (e.g., DSR stream) preferably comprises ECC (Error Correction Code) mechanisms to reduce the effect of packet losses (as described above). A compression scheme in the nomenclature may include particular ECC mechanisms.

Referring again to FIG. 20, the speech meta-information 2020 and 2021 represents meta-information that can be exchanged between client 2001 and server 2002. The speech meta-information comprises speech detection (speech, no speech) and barge-in detection/attention meta-information. The speech meta-information for detecting speech/no speech, comprises various markers for specifying: (i) beginning of speech notification; (ii) end of speech notification; (iii) silence detection; and (iv) end-point estimate (Speech reco definition). The speech/no speech meta-information comprising "beginning of speech notification" is transmitted from the client to the server. The "end of speech notification" information is transmitted from client to server and from server to client. The "silence detection" information is transmitted from client to server. The "end-point estimate" information is transmitted from client to server and from server to client (based on completion of utterance).

The speech meta-information 2020, 2021 further comprises "barge-in detection/attention" information. The speech meta-information that provides "barge-in" functionality comprises various markers for specifying: (i) end of played prompt; and (ii) barge-in events. The "end of played prompt" marker is transmitted from the client to server to enable the server to prepare to detect speech. The "barge-in events" meta-information comprises markers of Barge-in events: (i) from client to server: detected input stop playing; (ii) from server to client: detected input stop playing whatever comes from server; and (iii) from client to server: prompt that was played (e. g. URI of prompt or annotated text, with volume settings).

In other embodiments, the meta-information 2020, 2021 further comprises display/GUI information (e.g., logo display on a screen after a request is made to the server) providing multi-modal capability (speech or GUI). The meta-information sent from the server to client comprises presentation and update information. The meta-information sent from client to server comprises (i) client settings/delivery context; (ii) client events; and (iii) other application specific messages.

In other embodiments, the meta-information 2020, 2021 further comprises meta-information for DTMF (dual tone multi-frequency) and keypad exchanges. The DTMF and keypad exchanges are to provide for IVR/Voice portal capabilities. The meta-information comprises: (i) decoded DTMF(digits, strings, durations); and (ii) DTMF detection events. To provide DTMF support, the client and server exchange information such as decoded DTMF strings, duration or time-stamp of edges, and DTMF detection events (even if not decoded). The meta-information for Tones (audio) is transmitted (in band) from server to client. The DTMF/keypad strings are exchanges as speech meta-information between the client and speech server and between a MSC (mobile switching center) the speech server and client. Dynamic codec switching is supported by DSR Session Control 2005 to switch between different codecs when switching from speech to DTMF, for example.

In other embodiments, the meta-information comprises "front-end and noise compensation" parameters. These parameters comprise, for example "tuning" parameters for silence detection and speech detection via settings to control (which are exchanged between server and client), "front-end" parameters that are sent from client to server (e.g., current settings: e. g. transformation parameters) and from server to client (setting changes), and "background noise level" parameters.

The meta-information further comprises client messages that comprise "client settings" parameters such as volume control, client type, user preferences and echo spoken text, echo recognized text, and don't echo recognized text parameters. The client messages also include client events (e.g., settings changes (new volume), plugged in new microphone (hands-free microphone), push to talk information, client event barge-in (e.g., client to server: stop playing)) and dictation mode vs. command and control parameters. The client messages further comprise externally acquired parameters (e.g., speed of a car, local noise level, noise level changes), ID of selected input microphone (in microphone array/multiple microphone systems) and speaker identity (local recognition) parameters.

In other embodiments, the meta-information 2020, 2021 comprises encryption notice/exchanges. In addition, the meta-information comprises annotations including: (i) local recognition estimates (Nbest lists, partial decoded scripts, context, hot words), (ii) data files updates (e.g., expected grammar file (e. g. C& C), URI of data files)); (iii) application specific parameters (e.g., reference to last prompt played); and (iv) speech frame markers (e.g., exact frame position of a codec switch). The meta-information further comprises "Echo" parameters including: (i) echo spoken text; (ii) echo recognized text; and (iii) don't echo recognized text.

In still further embodiments, the meta-information 2020, 2021 comprises: (i) "degree of interactivity" parameters (sent from client to server) that specify, e.g., maximum latency for recognition or response (dialog application versus query or dictation); (ii) guaranteed transmission exchanges (e.g., packet confirmation request, re-transmission requests, confirmation exchanges); (iii) application specific exchanges (e.g., engine asynchronous commands, data file pointers, result exchanges); (iv) other call control instructions (e.g., where to forward results, where to forward DSR stream, where to forward annotated DSR stream, call control instructions); (v) information on data interleaved with audio in RTP stream (e.g., noise samples, prompt samples); and (vi) information on other audio streams (e.g., audio stream for speaker recognition). It is to be appreciated that any form of meta-information can be exchanged depending on the application and that that present invention is not limited in any manner in that regard.

Transport of Meta-Information

In accordance with the present invention, various embodiments transmitting the speech meta-information may be implemented (e.g., in band, out of band). More specifically, the speech meta-information can be exchanged "in band", such as RTP packets interleaved with the DSR RTP payload. This process may be used for particular specific speech meta-information by allowing the meta-information to be part of the codec format (e.g. speech, no speech etc.). Further, transmission of the speech meta-information may be achieved through a process called dynamic payload switches that does require initiation of the payloads at the session initiation (SIP/SDP) to assign a dynamic payload identifier that can then be used to switch dynamically by changing the payload identifier (without establishing a new session through SIP/SDP). In other embodiments, it is possible that RTP is used to exchange the information in another RTP stream dedicated to exchanging speech meta-information (e.g. as payload application/XML in SOAP), instead of interleaving with DSR RTP payload.

The speech meta-information may be transmitted "out-of-band, such as extensions to the RTCP layer, as part of the DSR session control layer already used for SIP/SDP session initiation and control, and as part of any other suitable extensible mechanism (e.g., SOAP (or XML or pre-established messages) over SIP or HTTP (as discussed below), HTTP, as a separate point-to-point connection (sockets), or as meta-information media over a separate RTP stream as noted above. It is to be understood that speech meta-information typically requires the highest possible quality of service (e.g., Conversational QoS in 3GPP). Whatever infrastructure or mechanism is employed to assign this QoS (by default based on registered payload type, based on RSVP, etc.), a DSR framework preferably includes such mechanism for the speech met-information. Of course, when engaged in dialogs, the DSR RTP stream is preferably provided the conversational QoS.

The factors that should be considered in selecting appropriated transmission protocols is based on the application or the network/infrastructure where the DSR framework profile is expected to be deployed (e.g., a 3GPP framework is different from a wired LAN VoIP framework). The RTCP layer is known to be unpredictable with its exchanges and there are risks in perturbing the RTCP mechanism by adding or overloading the RTCP headers. Additional sockets/TCP are not preferred because additional sockets and point-to-point connections are expensive for large scale deployment (which is especially true for IVR and VoIP gateways) and because tunneling through firewalls and wireless gateways may not always be guaranteed (while it would be for SIP/HTTP and SOAP).

In any event, a given transport protocol for the meta-information is preferably functional in that it provides an extensible mechanism to send speech meta-information between client/server (both directions), follows a challenge/response model, be able to tunnel through firewalls and pass through gateways, and that such protocol provide optional support (e.g., capability description). Other factors that are considered in selecting an appropriate transport protocol is implementation (e.g., CPU/memory impact on terminal, acceptable bandwidth traffic, alternatives when not available) and that it be interoperable with IVR and other VoIP networks.

In one preferred embodiment, a mechanism for exchanging meta-information is based on the following framework: (1) An in-band option (with RTP Payload) for speech/no-speech markers (speech/no speech markers are well suited for in-band transmission); (2) DSR control channel (out-of-band—unless if this is transported also in-band) for all other speech meta-information (and optionally speech/no-speech marker—possibly for redundancy); (3) an extensible mechanism for optional support; and (4) a mechanism for supporting minimum speech syntax for alternative/non-extensible systems and for providing capability description.

In one embodiment, meta-information can be transmitted by piggyback on the SIP session management layer, which affords the advantages of (i) using the same ports and piggy back on a supported protocol that will be able to pass end-to-end across the infrastructure (gateways and firewalls), (ii) providing guarantee of delivery, and (iii) no reliance on mixing payload and control parameters. The RTP layer is also guaranteed to pass end-to-end across the infrastructure, but RTP is not necessarily guaranteed delivery. Further, it can be problematic to introduce too much data in the RTP channel. In general, it is not preferably to mix payload and control information.

Other transmission solutions include HTTP, which is becoming increasingly supported by WAP (wireless application protocol) (application layer) and by MExE (mobile execution environment), and which will tunnel through firewalls and gateways.

Meta-information is preferably transmitted out of band (e.g., not as part of an RTP DSR payload, format) to provide robust data exchanges. However, as discussed above, the meta-information can be interleaved via dynamic payload switches or in a separate RTP stream, especially if such RTP stream can be rendered reliable by the underlying protocols, acknowledgments or errors correction codes. For example, data exchange of front-end and noise compensation parameters, client messages (e.g., engine data exchange, setting and engine inputs), security, annotations, echo (e.g., engine settings), application specific exchanges, and degree of interactivity (e.g., engine settings) are preferably robust exchanges because of the criticality of the data exchanged. Further transport control should be provided for guaranteed transmission exchanges, other call control exchanges, information on data interleaved with audio in RTP stream, and information on other audio streams.

Moreover, with respect to barge-in detection/attention, out-of-band is preferred for the barge-in events associated with engine control (e.g., client to server: detected input stop playing, server to client: detected input stop playing whatever comes from server, and client to server: prompt that was played (e.g., URI of prompt or annotated text, with volume settings—XML/Text info exchange.

Furthermore, DTMF speech meta-information could be exchanged with the following mechanisms: (1) in band as RTP packets interleaved with the DSR RTP payload (as a RFC 2833 format); (2) out-of-band as extensions to the RTCP layer, as part of the DSR session control layer already used for SIP/SDP session initiation and control; or (3) with an extensible mechanism (e.g., SOAP over SIP, or over in-Band RTP), sockets). Preferably, a DTMF data exchange is performed via Session Control/Extensible to exchange decoded strings and durations and events. Examples of format for such telephony events are provided by RFC 2833.

It is to be appreciated that the system 2000 in FIG. 20 can be implemented in server-side applications, wherein the audio I/O is captured via the client and the server comprises a server application and speech engines for processing the captured speech. The server-side (voice recognition) applications include, for example, voice services (e.g., name dialing, directory assistance), information applications (e.g., voice portals (flight, weather, news, movies), location-specific information, voice navigation of maps), transaction-based applications (e.g., banking, m-commerce, form filling), information capture (e.g., dictation) and messaging. In addition the server-side applications include thin client multi-modal applications (such as a DOM-based Multi-modal browser as described below and described in detail in U.S patent application Ser. No. 10/007,092, filed on Dec. 4, 2001, entitled "Systems and Methods for Implementing Modular DOM (document object model)-Based Multi-Modal Browsers", which is commonly assigned and incorporated herein by reference.)

Further, the system 2000 may be implemented for client-side applications wherein the client executes a client application which ships audio I/O to the server for processing via remote engines. In other words, in this embodiment, server-side speech engines provide web services such as remote dictation with the client application. Another example of client-side applications include fat client configurations of multi-modal applications (DOM-based Multi-Modal browsers) with remote speech engines. It is to be further appreciated that the system 2000 can be implemented in a hybrid embodiment, wherein the applications are executed on both the client and server.

Figure 21:
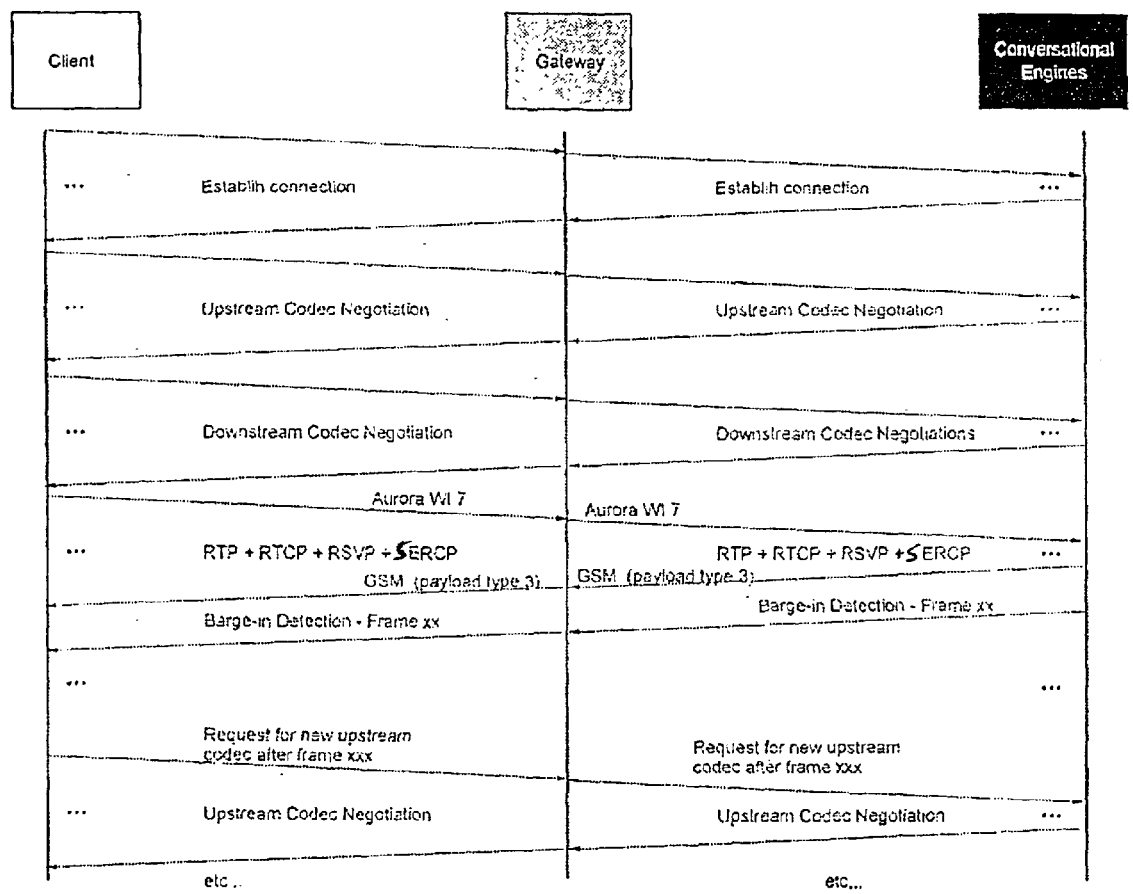
FIG. 21 is a diagram illustrating client/server communication using a DSR protocol stack according to an embodiment of the present invention.

FIG. 21 is a diagram illustrating client/server communication using a DSR framework protocol stack according to an embodiment of the present invention. A client application requesting server-side processing of speech data (via conversational engines on a remote server) communicates with the server by initially establishing a connection. As noted above, call settings and control messaging is preferably implemented using a DSR session control protocol based on the H.323 stack (on VOIP infrastructures) or SIP messages (which is a preferred approach, in particular, for IETF and 3G (3GPP) infrastructures). SIP or H.323 could be arbitrarily selected depending on a particular design, or preferably with the option of being able to convert (gateway) between SIP and H.323. In a preferred embodiment, SIP/SDP is employed to capture the evolution of IMS standards. This is the leading edge approach. Preferably, session control is implemented based on SIP (for SDR session control) and SDP (for DSR session description) over UDP to provide maximum robustness to packet losses. Other protocols may be implemented (e.g., SOAP) as discussed herein.

Once the connection is established between client and server, codec negotiation is performed. Preferably, codec negotiation is supported by a socket connection active throughout the communication (TCP or UDP with a confirmation mechanism). The H.245 protocol exchanges tables of supported codecs and DSR schemes and is a possible mechanism for codec negotiation. SIP initiation with SDP proposing the preferred codecs is a preferred approach. As discussed herein, speech meta-information exchanges can be used to reduce the amount of codecs to propose by pre-negotiating through SOAP exchanges, for example. This enables a terminal to select codecs on the basis of the terminal capabilities. Further, a corresponding SIP codec negotiation can be specified and implemented. Preferably, the upstream and downstream coders are separately negotiated.

The codec tables (or SIP negotiation) should enable pointing to an object code (e.g. applet to download to implement a particular DSR scheme, etc . . . ). A mechanism is further included to negotiate the type of object code (i.e. applet, vs. OS specific binaries etc . . . ). In addition, security issues associated with codec negotiation are considered. Preferably, the protocol supports the capability to specific codec object code. At the same time, a terminal or server may decide not to support this capability and not accept it during codec negotiation or to accept it only after appropriate authentication of the provider of the object. As shown by way of example in FIG. 21, an Aurora WI 7 protocol is used for the upstream codec and a GSM (Global System for Mobile communication) protocol is used for the downstream codec.

Preferably, the H.245 connection (H.323) or SIP with SDP (and possible speech meta-information pre-negotiation) connection provides a mechanism for dynamically changing the codec/DSR schemes as needed throughout the evolution of the application. Indeed, as shown by way of example in FIG. 21, a barge-in detection in frame XX can require a change in, e.g., the upstream codec (e.g., to ship different acoustic features for a particular utterance). The DSR framework stack preferably permits acoustic front-end parameters to change during a session via a different RTP stream (different ports), by switching the codec starting after a given packet number or by dynamic payload switch if the different codec were pre-negotiated through SDP at the SIP initiation of the session. Similarly, new RTP connections can be opened when extra DSR streams must be provided (e.g. to provide simultaneous speech and speaker recognition (using different acoustic features), which would require establishing another SIP session when using SIP/SDP.

In other embodiments of the present invention, additional mechanisms (not currently provided by conventional Voice over IP stacks (but not necessarily incompatible)) provide the capability for the source to specify that an utterance should be transmitted with guaranteed delivery (e.g. TCP or UDP+confirmation instead of RTP), the capability for the recipient to request repetition of a particular utterance segment specified by its end points (within a given time frame after initial transmission), the capability for the sender to request confirmation that the recipient has received a particular utterance segment, and provide guaranteed delivery (utterance segments and other protocols). This can be done with a simple acknowledgment mechanism. The protocols for providing guaranteed delivery should account for possible losses of connections. For example, threads that wait for confirmations that will never arrive because of a loss of connection should appropriate unblock or terminate with events that the client application (or server application) can handle. Guaranteed delivery mechanisms should fail and return an error after a parameterized time (or amount of re-transmission).

Further, QsoS messages and criteria should be implemented for DSR. Preferably, a mechanism provides the capability to dynamically change the required QoS during a session. The mechanism should have minimum impact on existing QoS protocols such as RSVP. This can also be done by assigning given QoS to particular registered payload (e.g., this is the 3GPP approach). Mechanisms depend on infrastructure, but such mechanisms are preferably available and provided by the profile of the framework under consideration. As explained above, speech meta-information as well as multi-modal synchronization and SERCP exchanges are preferably performed with the highest available QoS or at least a "conversational quality". DSR RTP is preferably accorded a quality equivalent to voice communications.

Further, as noted above, a DSR system according to the present invention preferably supports barge-in. For example, when barge-in can be detected by the local DSR encoder or via Voice Activity Detection, it could block the downstream audio play. The remote engines are notified that the output play has been interrupted and indicate at what packet number. When barge-in is not detected by the local DSR encoder or when it is better processed on a remote engine, a control signal could be sent that will interrupt output playback on the client. Clearly network latencies make this approach challenging (hence the need for high QoS).

There are various mechanisms for implementing barge-in. For instance, an existing available connection can be reused, e.g., a RTCP layer with extension to send elementary control messages, or H.245 or codec SIP/SDP negotiation connection to send elementary control messages. Alternatively, an additional dedicated connection can be opened for these kind of control messages. Preferably, such alternatives should be compatible with Voice over IP and wireless gateways.

A DSR framework according to the present invention can be implemented via compiling a list of classes for DSR framework connections. Such classes are preferably developed based on function of the client capabilities and based on a function of the network characteristics and available bandwidth. In term of default codecs, a preferred scheme can be based per classes of DSR connections. In particular, clients would be expected to support at least one DSR default encoding scheme and the server may have to support several possible default encoding schemes.

SERCP (Speech Engine Remote Control Protocols)

Figure 26:
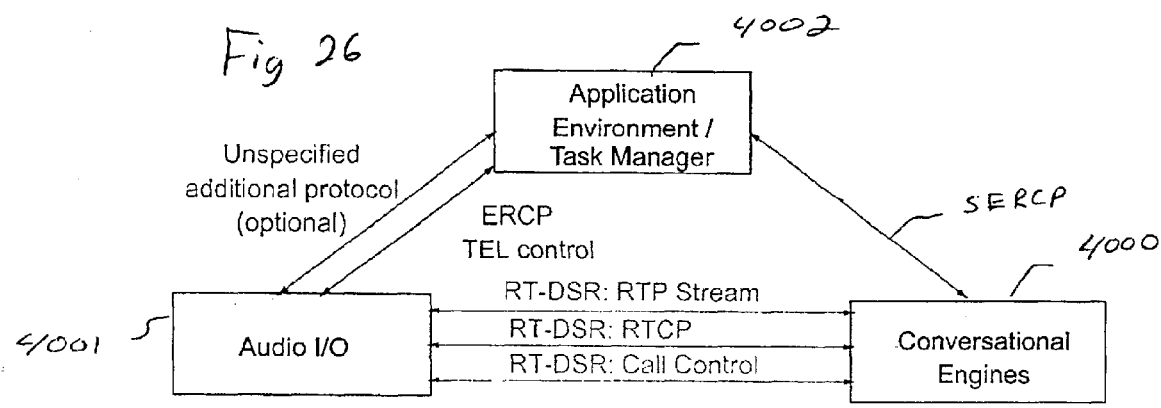
FIG. 26 is a diagram illustrating a method for implementing a speech engine remote control protocol for remote control of speech engines.

In another embodiment of the present invention, an DSR system preferably implements Speech Engine Remote Control Protocols (SERCP) that provide a mechanism to distribute the conversational engines and enable network and system load management. SERCP is preferably implemented for multi-modal applications and other applications that require remote control of speech engines. For example, as shown in FIG. 26, SERCP is preferably implemented whenever the engines 4000 are controlled by the source of the audio 4001 (i.e. the client) or by an application 4002 separated from the audio source 4001 (client) and server engines 4000. A typical scenario is voice enabled cell phones applications using server side speech recognition. In addition, SERCP is preferably implemented whenever the engines are controlled by a third party controller (i.e. application). A typical scenario is a server side application that relies on speech recognition performed elsewhere in the network.

SERCP addresses the problems associated with: (i) limited client resources with respect to the conversational engine requirements because the application can reside on the client side and drive conversational engines as if they were local; (ii) too low bandwidth to send data files from the server to a local conversational engine since remote engines can be driven remotely, data files do not need to be sent to the client, data files may remain on different remote engines without having to be sent to a particular server side engine, server-side bandwidth requirements are also reduced; (iii) delay in sending data files from the server to a local conversational engine since remote engines can be driven remotely, data files do not need to be sent to the client, data files may remain on different remote engines without having to be sent to a particular server side engine, server-side bandwidth requirements are also reduced, different remote engines can be used instead of using a particular engine, an engine that is close or that has already loaded the data file for a particular processing can be used; (iv) proprietary aspect of such data files (grammars, acoustic models etc . . . ) since remote engines can be driven remotely, data files do not need to be sent to the client, data files may remain on different remote engines without having to be sent to a particular server side engine, server-side bandwidth requirements are also reduced, the owner of the data file can offer a recognition engine with data files as a web service; (v) security (client side authentication is a weak security solution) since authentication can now be performed with the secure intranet; (vi) network & system load management since any available engine can now be used; and (vii) specialized conversational engines using specialized algorithms and function not provided by generic engines and typically not client engines, since the appropriate engine can be used, independently of where it is located.

There are some challenges associated with SERCP. For example, past speech recognition APIs (and other conversational APIs) have received marginal engine vendor support due to a poor level of functionality, difficulty in manipulating results and intermediate results (usually with proprietary formats). On the other hand, complex APIs for numerous engines and functions is a very complex task.

FIG. 23 is a diagram illustrating client/server communication of SERCP data exchanges according to an embodiment of the present invention. In FIG. 23, an DSR connection with negotiated codecs is assumed. Initially, the client and server exchange data to determine engine capabilities. Then, data is exchanges to for engine reservation. The client will then send remote control commands comprising parameters and data file settings and associated DSR streams. The server returns results and event downstream using, e.g., RTP.

In general, SERCP is preferably limited to speech engine remote control. The call control functions are preferably left to the application or to a system/load manager. In other words, SERCP does not provide re-direction decision mechanisms or mechanisms to re-direct a call. SERCP only specifies how to remotely control an engine (with the engine and the RTP stream (RT-DSR) well-identified). SERCP should not aim at specifying the format, commands or interface that an engine can or should support.

We recommend specifying a framework that provides: (1) a set of widely supported commands; (2) formalism to pass parameters, specify data files, communicate/treat events and return results (the result may include the RT-DSR downlink stream such as an RTP stream of a TTS engine); (3) a mechanism to advertise the supported commands (e.g., OPTIONS in RTSP); and (4) a mechanism to advertise the interface associated to a particular command and the function that it performs.

In accordance with the present invention, SERCP may be implemented in various manners. For example, SERCP may be implemented via RTSP (Real Time Streaming Protocol) or an extension thereof, which is already designed as a remote control protocol (see, e.g., RFC 2326, which is incorporated herein by reference). SERCP may be implemented via WSDL (web services description language), or an extension thereof, as a mechanism to describe the commands/interface supported by a given engine. Preferably, SERCP supports VoiceXML 1.0 and 2.0 (and its extensions) functionality, which requires some extensions to VoiceXML to specify: remote engines to use and data files to use. Preferably, the parameters and results are compatible with the W3C Voice specifications when appropriate. This should include support for arbitrary parameters and input (possibly based on Xschema). To implement remote control commands, SOAP over RTSP can be used.

It is to be understood that any suitable protocol can be used to implement SERCP as a remote speech API (TCP, Sockets, RMI, RPC, SOAP, on TCP, UDP, HTTP, SIP, RTP, RTSP etc . . . ). This requires a particular semantics and syntax for the implementation of the speech engine remote control. Preferably, any Speech API syntax can be implemented on top of RTSP (FIG. 16 above), SIP, HTTP, RTP or TCP or using SOAP/WSDL on top of the same set of protocols.

This following section proposes the use of a web service framework based on XML protocols to implement SERCP. Speech engines (speech recognition, speaker, recognition, speech synthesis, recorders and playback, NL parsers, and any other speech engines etc . . . ) as well as audio sub-systems (audio input and output sub-systems) can be considered as web services that can be described and asynchronously programmed via WSDL (on top of SOAP), combined in a flow described via WSFL (Web Services Flow Language), discovered via UDDI and asynchronously controlled via SOAP. This solution presents the advantage to provide flexibility, scalability and extensibility while reusing an existing framework that fits the evolution of the web: web services and XML protocols.

In accordance with the present invention, web services is preferably used as a framework for SERCP. The proposed framework enables enable speech applications to control remote speech engines using the standardized mechanism of web services. The control messages may be tuned to the controlled speech engines. The terminology SERCP is consistent with the terminology used in documents exchanged at ETSI, 3GPP and WAP Forum while distinguishing from the detailed specification proposed by MRCP. High level objectives of the proposed SERCP framework includes the capability to distribute the automatic processing of speech away from the audio sub-system and the associated controlling speech application. The need for SERCP has been identified in different forums.

In general, SERCP supports two classes of usage scenarios where speech processing is distributed away from the audio sub-systems and the speech engines are controlled by (i) by the source of the audio (a typical scenario is a voice enabled application running on a wireless terminal but using server side speech recognition; and/or (ii) a third party controller (i.e. application) (a typical scenario is a server side application (e.g. VoiceXML browser) that relies on speech recognition performed elsewhere in the network). Numerous voice portal or IVR (Interactive Voice Response) systems rely on such concepts of distribution of the speech processing resources.

In general, a DSR framework that implements SERCP enables the application developer or service provider to seamlessly use a remote engine. The location of the engine should not be important: the system behaves as if the engine was local to the application runtime. The performances of the speech engines should not be affected by distribution of the engines and the presence of the network. The functionality achievable by the speech engines is preferably at least equivalent to what can be achieved with local engines.

There are numerous challenges to the specification of an appropriate SERCP framework. Numerous proprietary or standardized fixed engine APIs have been proposed (e.g. SRAPI, SVAPI, SAPI, JSAPI, etc . . . ). None have been significantly adopted so far. Besides strong assumptions in terms of the underlying platform, such APIs typically provide too poor functions. Only very limited common denominator engine operations are defined. In particular, it is often difficult to manipulate results and intermediate results (usually exchanged with proprietary formats). On the other hand, it would have been more practical to add more capabilities to these APIs. Preferably, a SERCP framework according to the present invention is preferably not designed as a fixed speech engine API, but is designed as a rich, flexible and extensible framework that allows the use of numerous engines with numerous levels of capabilities.

The considerations made above raise fundamental issues in terms of standardization and interoperability. SERCP is preferably able (target-1) to replace a speech engine provided by one speech vendors by an engine provided by another and still be able to run immediately the same speech application without any other change. and (target-2) enables speech applications to control remote speech engines using a standardized mechanism but messages tuned to the controlled speech engines. Target-1 is very difficult to achieve. Today, speech engine settings are adapted to particular tasks. Speech data files (acoustic models, engine configurations and settings, front-end features, internal algorithms, grammars, etc . . . ) differ significantly from vendor to vendor. Even for a same vendor, the deployment of performing conversational applications require numerous engine settings and data file tuning from task to task. In addition, conversational applications and engines still constitute an emerging field, where numerous changes of behavior, interfaces and capabilities must be supported to enable rapid introduction of new conversational capabilities (e.g. support of free flow dialogs, NL parsing etc . . . ).

Eventually, in most common usage scenarios where SERCP would be used by a terminal to drive remote engines or by a voice portal to perform efficient and scalable load balancing, the application/controller knows exactly the engine that it needs to control and the value is to rely on a standardized way to implement this remote control. It may be possible to define a framework where a same application can directly drive engines from different vendors. Such usage scenarios are particular cases of the (target-2) framework. (target-1) would introduce unnecessary usage limitations.

Wireless deployments like 3GPP will require end-to-end specification of such a standard framework. At this stage, it is more valuable to start with an extensible framework (target-2) and when appropriate, provide a framework that addresses (target-1). Therefore, it is preferred that a SERCP framework focuses on (target-2), while providing mechanisms to achieve (target-1) when it makes sense. The (target-2) will not impact in anyway the functions that can be supported today and in the future.

Based on the above, the following key requirements for SERCP (independently of what is the implementation technique used) in accordance with the present invention are: (i) SERCP must provide a standard framework for an application to remotely control speech engines and audio sub-systems, and the associated SERCP messages amy be tuned to the particular speech engine; (ii) SERCP must not aim at supporting application interoperability across different speech engines with no changes of the SERCP messages; and (iii) SERCP should aim at distinguishing and defining messages that are invariant across engine changes from messages that are engine specific.

As a result, adding support of speech engines from another vendor may require changes of the SERCP messages and therefore changes of the application or dialog manager to support these new messages. In the web service framework proposed below, this results into changing the WSDL (XML) instructions exchanged with the engines. However, it does not imply any changes other than adaptation of the XML files exchanged with the engines.

In accordance with the present invention, one embodiment of SERCP is based on the following framework: (i) SERCP preferably reuses existing protocols; (ii) SERCP maintains integrity of existing protocols; and (iii) SERCP preferably avoids duplication of existing protocols.

In the context of the DSR framework, the following requirements have been considered. As noted above, a DSR framework according to the present invention is not limited to the use of DSR optimized codecs, but it can be used in general to distribute speech recognition functions with any encoding scheme. Preferably, SERCP controls the different speech engines involved to carry a dialog with the user. As such, SERCP should not distinguish between controlling a single engine or several engines responsible to process speech input and generate speech or audio output.

Further, SERCP should not be limited to ASR or TTS engines. SERCP should enable control of the audio sub-systems (e.g. control of settings of codecs, acoustic front-end, handling of voice activity detection, barge-in, noise subtraction, etc . . . ). Audio sub-systems amy be considered as "engines" that may be controlled by the application using SERCP messages.

Moreover, SERCP preferably supports control of speech engines and audio sub-systems by an application located on the component where audio-system functions are located (e.g. wireless terminal), an by an application located elsewhere on the network (i.e. not collocated with speech engines or audio input or output sub-systems).

Further, SERCP should not specify call-control and session control (re-direction etc . . . ) and other platform/network specific functions based on dialog, load balancing or resource considerations. However SERCP preferably supports the request to expect or establish streaming sessions between target addresses of speech engines and audio-sub-systems. Session establishment and control MUST rely on existing protocols.

Further, SERCP must not address the transport of audio. SERCP may address the exchange of result messages between speech engines. SERCP preferably supports the combination of different engines that will process the incoming audio stream or post-process recognition results. For example, it should be possible to specify an ASR system able to provide an N-Best list followed by another engine able to complete the recognition via detailed match or to pass raw recognition results to a NL parser that will tag them before passing the results to the application dialog manager.

In addition, SERCP preferably enables engines to advertise their capabilities, their state or the state of their local system. This is especially important when the framework is used for resource management purpose.

Moreover, SERCP should not constrain the format, commands or interface that an engine can or should support. SERCP is preferably vendor neutral: SERCP preferably supports any engine technology and capability, any type of engine functionality (existing and future), as well as vendor specific commands, results and engine combination through a well specified extensible framework.

Furthermore, SERCP is preferably asynchronous. SERCP is preferably able to stop, suspend, resume and reset the engines. SERCP is preferably not subject to racing conditions. This requirement is extremely important. It is often difficult from a specification or a deployment point of view to efficiently handle the racing conditions that may occur when hand holding the engine to load appropriate speech data files (e.g. grammars, language model, acoustic models etc . . . ) and report/handle error conditions while simultaneous racing with the incoming audio stream. It is also important to consider, when developing the SERCP framework, issues of: scalability and robustness of the solution, simplicity of deployment, and transmission across firewalls, gateways and wireless networks. This implies that the end-to-end specification of SERCP and the assumed protocols that it may use for transport must be supported by the target deployment infrastructure. This is especially important for 3G deployments.

Another issues to consider is the need to support the exchange of additional meta-information useful to the application or the speech engines (e.g. speech activity (speech-no-speech), barge-in messages, end of utterance, possible DTMF exchanges, front-end setting and noise compensation parameters, client messages—settings of audio-sub-system, client events, externally acquired parameters—, annotations (e.g. partial results), application specific messages). As noted above, a DSR framework according to the invention transmits some of the speech meta-information as part of the audio transport or the audio session control (e.g. SIP) exchanges.

Although a RTSP-based framework (or similar variations carried on other protocols like SIP, HTTP or TCP) does not satisfy the requirements above, it may be used in other embodiments. RTSP is essentially a fixed speech engine API designed to be remotely used. RTSP aims at satisfying (target-1) instead of (target-2). RTSP does not handle efficiently extensibility, beyond a standardized syntax (speech invariant messages). RTSP only allows to pass proprietary parameters in a non-standardized manner. RTSP may be subject to racing conditions when used to control the speech engines with an application that is not collocated with the audio-sub-systems. RTSP does not address combination of different engines (e.g. speech engine followed by NL parser;

exchange of partial results, parallel use of speaker recognition and speech recognition engine, ect . . . ). The underlying transport protocols may be problematic in 3G deployments: RTSP may not be supported by 3GPP and SIP may not handles as well the racing conditions. RTSP is confusing in the way that it relies and extends RTSP.

In a preferred embodiment, the framework of web services is considered as an efficient, extensible and scalable way to implement SERCP that satisfy the different requirements enumerated above. According to the proposed framework, speech engines are defined as web services that are characterized by an interface that consists of some of the following ports: (1) "control in" port(s): sets the engine context, i.e. all the settings required for a speech engine to run. It may include address where to get or send the streamed audio or results; (2) "control out" port(s): produces the non-audio engine output (i.e. results and events). It may also involve some session control exchanges; (3) "audio in" port(s): Streamed input data; and (4) "audio out" port(s): Streamed output data.

Similarly, audio sub-systems, can also be treated as web services that can produce streamed data or play incoming streamed data as specified by the control parameters. It is possible that the "control in" or "control out" messages are in practice sent or received interleaved with "audio in or out" data. This can be determined in the context (setup) of the web services. Speech engines and audio sub-systems are preprogrammed as web services and composed into more advanced services. Once programmed by the application/controller, audio-sub-systems and engines await an incoming event (established audio session, ect . . . ) to execute the speech processing that they have been programmed to do and send the result as programmed.

Speech engines as web services are typically programmed to handle completely a particular speech processing task, including handling of possible errors. For example, as speech engine is programmed to perform recognition of the next incoming utterance with a particular grammar, to send result to a NL parser and to contact a particular error recovery process if particular errors occur.

The following list of services and control types is not exhaustive. It is provide purely as illustration. These examples assume that all control messages are sent as "control in" and "control out". As explained above, the framework could support such exchanges implemented by interleaving with the streamed audio, etc . . . The following are examples of SERCP web services according to the present invention:

(1) Audio input Subsystem—Uplink Signal processing: (i) control in: silence detection/barge-in configuration, codec context (i.e. setup parameters), asynchronous stop (ii) control out: indication of begin and end of speech, barge-in, client events; (iii) audio in: bound to platform; and (iv) audio out: encoded audio to be streamed to remote speech engines;

(2) Audio output Subsystems—Downlink Signal processing: (i) control in: codec/play context, barge-in configuration, play, etc. ; (ii) control out: done playing, barge-in events; (iii) audio in: from speech engines (e.g. TTS); and (iv) audio out: to platform;

(3)—Speech recognizer (ASR): (i) control in: recognition context, asynchronous stop; (ii) control out: recognition result, barge-in events; (iii) audio in: from input sub-system source; and (iv) audio out: none;

(4) Speech synthesizer (TTS) or prerecorded prompt player: (i) control in: annotated text to synthesize, asynchronous stop; (ii) control out: status (what has been synthesized so far); (iii) audio in: none; and (iv) audio out: audio streamed to audio output sub-system (or other processor);

(5) Speaker recognizer (identifier/verifier): (i) control in: claimed user id (for verification) and context; (ii) control out: identification/verification result, enrollment data; (iii) audio in: from audio input sub-system; (iv) audio out: none;

(6) DTMF Transceiver: (i) control in: how to process (DTMF grammar), expected output format, etc.; (ii) control out: appropriately encoded DTMF key or string (e.g. RFC 2833); (iii) audio in: bound to platform events (possibly programmed by control-in); and (iv) audio out; and (7) Natural language parser: (i) control in: combined recognition and DTMF detector results; (ii) control out: natural language results; (iii) audio in: none; and (iv) audio out: none It is to be understood that variations and additional examples of speech engines as web service examples can be considered.

The use of web services enables pre-allocating and pre-programming the speech engines. This way, the web services framework automatically handles the racing conditions issues that may otherwise occur, especially between the streamed audio and setting up the engines. This is especially critical when engines are remote controlled across wireless networks where control and stream transport layer may be treated in significantly different manners.

This approach also allows to decouple handling streamed audio from control and application level exchanges. This simplifies deployment and increase scalability. By using the same framework as web services, it is possible to rely on the numerous tools and services that have been developed to support authoring, deployment, debugging and management (load balancing, routing ect . . . ) of web services. With such a web service view, the specification of SERCP can directly reuse of protocols like SOAP, WSDL, WSFL and UDDI . Contexts can be queried via WSDL or advertised via UDDI. Using WSDL, it is possible to asynchronously program each speech engine and audio sub-systems.

To illustrate a preferred embodiment of SERCP, let us consider the case where speech engines are allocated via an external routing/load balancing mechanism. A particular engine can be allocated to a particular terminal, telephony port and task on an utterance or session basis. Upon allocation, the application sets the context via WSDL. This includes the addresses of the source or target control and audio ports.

As an example, consider a speech recognition engine allocated to a particular application and telephony port. WSDL instructions program the web service to recognize any incoming audio stream from that telephony port address with a particular grammar, what to do in case of error (what event to throw where), how to notify of barge-in detection, what to do upon completion of the recognition (where to send result and end of recognition events). Similarly the telephony port is programmed via WSDL to stream incoming audio to the audio port of the allocated ASR web service. When the user speaks, audio is streamed by the port to the ASR engine that performs the pre-programmed recognition task and sends recognition results to the preprogrammed port for example of the application (e.g. VoiceXML browser). The VoiceXML browser generates a particular prompts and programs its allocated TTS engine to start generating audio and stream it to the telephony port. The cycle can continue.

WSFL provides a generic framework from combining web services through flow composition. Preferably, WSFL is implemented to define the flow of the speech engines as web services. Accordingly, sources, targets of web services and overall flow can be specified with WSFL. The use of web services in general and WSFL particular greatly simplifies the remote control of chained engines that process the result of the previous engine or engines that process a same audio stream.

UDDI is a possible way to enable discovery of speech engines. Other web services approaches can be considered. Speech engines advertise their capability (context) and availability. Applications or resource allocation servers interrogate to UDDI repository to discover available engines that can be allocated for the next utterance or session.

In a preferred embodiment, SERCP is implemented by transporting WSDL and WSFL on top of SOAP. It is also particularly attractive as events and other messages between controllers and web services as well as among speech engine/audio sub-systems web services can also be transported via SOAP. Exchanges of results and events (including, stop, resume reset ect . . . ) among speech engine and audio sub-system web services and between web services and the controller or application, can be done via SOAP.

In the future, more advanced coordination mechanisms can be used for example following frameworks as proposed in WSXL. SOAP presents the advantage that SOAP: is a distributed protocol that is independent of the platform or language; is a lightweight protocol, requiring a minimal amount of overhead; runs over HTTP (allowing access through firewalls); can run over multiple transport protocols such as HTTP, SMTP, and FTP (which simplifies its transport through wireless networks and gateways); is based on XML which is a highly recognized language used within the Web community; SOAP/XML is gaining increasing popularity in B2B transactions and other non-telephony applications; SOAP/XML is appealing to the Web and IT development community due to the fact that is a current technology that they are familiar with; and SOAP can carry XML documents.

At the same time, this may require exploring additional transport protocols for SOAP to facilitate it support by particular network (e.g. 3G as specified by 3GPP). This may include SOAP over SIP etc . . . . Syntax and semantics can be specified in numerous ways to describe for the speech engine and audio sub-system context and additional SOAP events and control messages. The SERCP syntax and semantics are preferably extensible to satisfy (target-2). As such it should be XML-based with clear extensibility guidelines. This web service framework is inherently extensible and enables the introduction of additional parameters and capabilities. The SERCP syntax and semantics are preferably designed to support the widest possible interoperability between engines by relying on message invariant across engine changes as discussed earlier. This should enable to minimize the need for extensions in as many situations as possible. Existing speech API can be considered as good starting points.

To that effect, we also recommend that speech engines as web services be considered to come with internal contexts that typically consists of the context beyond the scope of the invariant-based SERCP syntax and semantics. In as much as possible, the semantics and syntax should rely on the W3C Voice Activity specifications to describe the different speech data files required by the engines. Speech engine and audio sub-system syntax and semantics have numerous solutions covered by the teachings of the present invention.

In one of the target usage scenario introduced earlier, the source of the audio may control remote engines. It is possible that this be implemented on thin terminals that are not capable of running a WSDL engine. To address this issue, we may consider investigating the use of SERCP proxies to enable lightweight exchanges between terminal and proxy and full web service capabilities between the proxy and the speech engines. The proxy can also handle engine allocation or engine requests to resource allocation services. The CATS activity may also address the specification of lightweight exchanges that would not require the presence of a SOAP/WSDL engine on the terminal.

In general, proxies may support the translation of SERCP exchanges for example to add an appropriate set internal engine contexts while hiding them to the application or terminal that would issue only invariant (non-extended) SERCP calls.

A preferred SERCP framework relies on a complete web service framework based on SOAP and WSDL, and the advantages thereof have been described above. A SERCP based on the web service framework satisfies all the requirements enumerated earlier. However, other frameworks for providing speech engine services outside a SOAP-based web service framework can be implemented based on the teachings herein. For example, it may be possible that a RTSP-derived type of protocol can be used to asynchronously program and control such web services.

In summary, a preferred SERCP framework according to the invention employs a WSDL/SOAP/WSFL/UDDI framework to program and control remote engine. In addition, the SERCP syntax and semantics engine invariants are preferably based on RTSP-derived protocols.

SERCP may raise several security issues that can be addressed by appropriate authentication, integrity control and other conventional security approaches. Engine remote control may come from non-authorized sources that may request unauthorized processing (e.g. extraction of voice prints, modification of the played back text, recording of a dialog, corruption of the request, rerouting of recognition results, corrupting recognition), with significant security, privacy or IP/copyright issues. Web services are confronted to the same issues and same approaches (encryption, request authentication, content integrity check and secure architecture ect . . . ) can be used with SERCP. Further, engine remote control may enable third party to request speech data files (e.g. grammar or vocabulary) that are considered as proprietary (e.g. hand crafted complex grammar) or that contain private information (e.g. the list of names of the customer of a bank), etc. A SERCP framework preferably addresses how to maintain the control on the distribution of the speech data files needed by web services and therefore not only the authentication of SERCP exchanges but also of target speech engine web services. The exchange of encoded audio streams may raise also important security issues.

Figure 22:
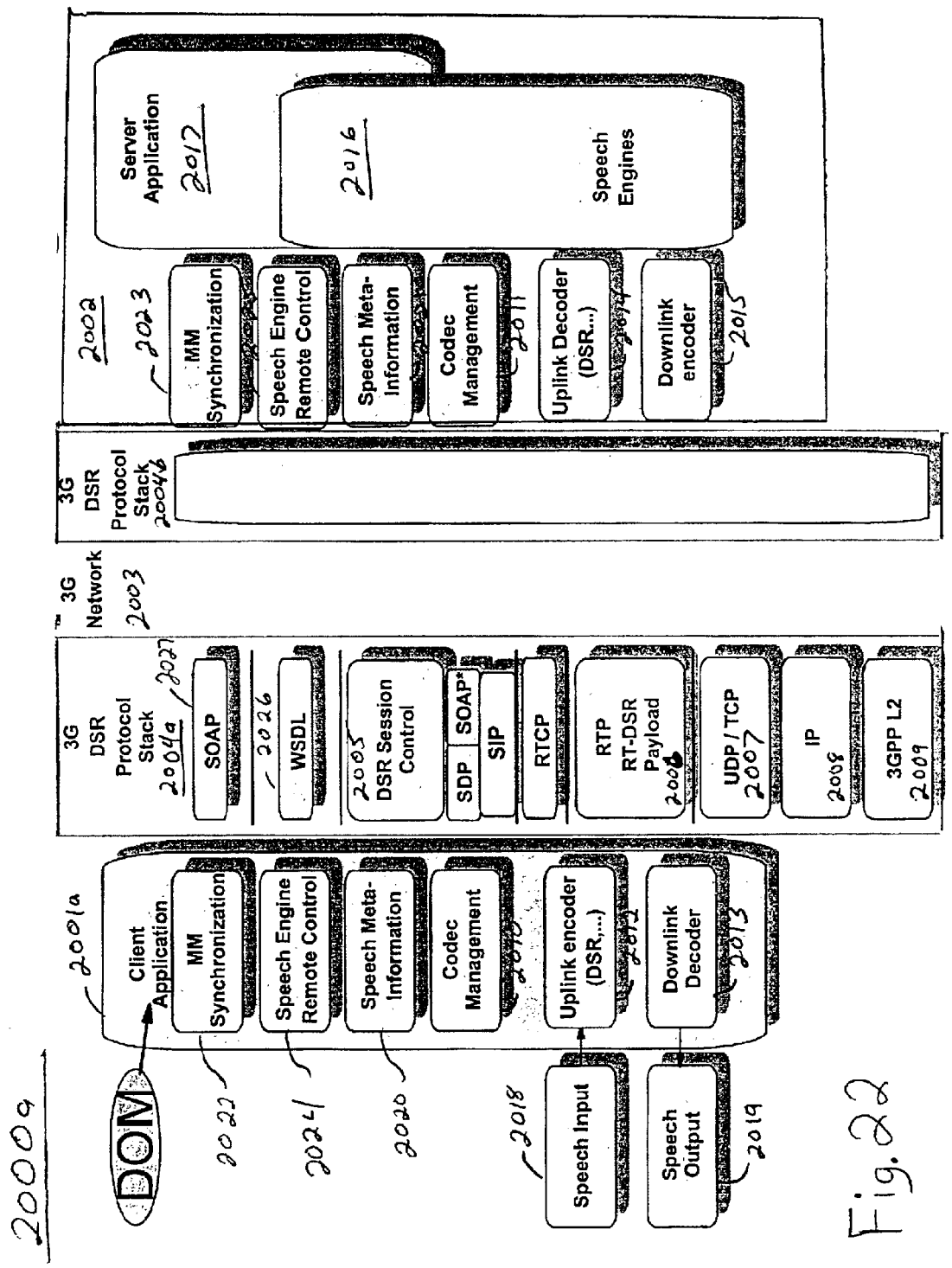
FIG. 22 is a diagram illustrating a DSR system according to another embodiment of the present invention.

Referring now to FIG. 22, a diagram illustrates a DSR system according to another embodiment of the present invention that also encompasses support for SERCP and multi-modal synchronization as discussed, for example, in the above-incorporated U.S. Ser. No. 10/007,092. The framework is based on a 3G Profile that may have other profile equivalent tuned to other infrastructures. The system 2000a of FIG. 22 is an extension of the system 2000 of FIG. 20 to provide a multi-modal DSR protocol stack. The system 2000a comprises multi-modal synchronization modules 2022 (client) and 2023 (server) for managing the meta-information that enables synchronization of different views (speech, GUI) of a multi-modal browser application 2001a (e.g., multi-modal DOM-based browser as described in the above-incorporated U.S. patent application Ser. No. 10/007,092). The system further comprises speech engine remote control modules 2024 (client) and 2025 (server) for managing meta-information that enables remote control of conversational engines 2016.

In general, in the system 2000a of FIG. 22, audio (speech input 2018) is encoded according to particular encoding scheme, e.g., preferably a DSR optimized codec (e.g. RecoVC), or any other suitable scheme. The encoded data (e.g., DSR data) is transported on the network transport layers via RTP (RT-DSR payload). In addition, codec description, negotiation, dynamic switches and setup is preferably exchanged via SDP over SIP or SOAP over SIP. For a client unable to perform XML parsing or to run a SOAP engine, it is possible to run a statically defined version of SOAP (denoted SOAP*). In other words, the SOAP* layer is optional and does not require a SOAP engine for providing basic SOAP functionalities (the SOAP* layer can be replaced by other extensible protocols). Additional speech meta-information is exchanged over SOAP or over RTP (interleaved with the RTP package). In addition, multi-modal synchronization can be implemented via SOAP 2027 or remote DOM and engine remote control can be implemented via WSDL 2026 over SOAP or SOAP*.

As noted above, the MM synchronization managers 2022, 2023 and associated synchronization protocols provide mechanisms for synchronizing the channel-specific (views) browsers of a DOM-based multi-modal browser (as described in the above-incorporated U.S. patent application Ser. No. 10/007,092). The synchronization protocols comprise mechanisms for exchanging synchronization information between a multi-modal shell and channel-specific browsers. In one embodiment, synchronization information that is exchanged comprises (1) DOM filtered events such as DOM Level 2 UI events (and higher), XHTML generalized UI events, VoiceXML events, etc. (2) HTTP (or other protocols) requests, such as URI requests; (3) DOM commands such as page push, output events, set events, get/set variables, DOM tree manipulation, etc. (4) blocking messages and (5) confirmation messages. To enable synchronization, events are systematically time stamped. This allows the different events to be ordered and enables disambiguation of ambiguous or contradictory events coming from different views. Preferably, clock synchronization protocol/exchange mechanisms are provided, such as the Network Time Protocol (NTP) adapted to the network capabilities (e.g. WAP), to provide time synchronization. In a preferred embodiment, the synchronization protocols are implemented using SOAP. As is known in the art, SOAP provides a mechanism for information exhchange using HTTP and XML to provide communication between systems in a network. In other embodiments, synchronization may be implemented using, for example, socket connections (event communication) and HTTP update messages.

As noted above, the speech engine remote control managers 2024, 2025, and associated control protocols provide mechanisms for remotely controlling the speech engines 2016. In one embodiment (as described above) the engine control meta-information is transmitted via one of the proposed mechanism as discussed above. In another preferred embodiment, SERCP is implemented via SOAP over RTSP SIP, HTTP , TCP, RTP, etc., or via WSDL (on top of SOAP) 2026 to describe the commands/interfaces supported by the engines 2016. In particular, WSDL allows the speech and audio subsystems to be implemented as web services or described as a syntax and semantics derived from RTSP on top of RTSPs, SIP, HTTP or TCP. When using WSDL, this framework is compatible with the web service evolution. WSDL is standard-based and is robust, modular, scalable and distributable. WSDL provides ease of integration: WDSL is independent of connectivity and gateway vendor, it provides integration of different engines, it is independent of the application platform (e., can be implemented with IVR scripts (State tables, Scripts), imperative (C/C++ or java), with VoiceXML Browsers, free flow applications, and multi-modal applications). WSDL removes complexities: engine step by step hand holding, racing conditions and is extensible (no limitations as previous APIs approaches).

It is to be understood that although SOAP (SOAP over SIP, RTP, HTTP, TCP, . . . ) is a preferred embodiment for implementing DSR session control 2005 in the DSR stack 2004a, it is not required. It is only preferred that the DSR session control 2005 support the exchange of: (i) capability/support description (ii) support codec (lists, 3-message or more when parameter settings must be exchanged); and (iii) speech meta-information exchanges, and that the DSR session control layer be extensible.

There are various advantages associated with SOAP that make it a preferred protocol for implementation within the DSR framework stack. For instance, SOAP is a distributed protocol that is independent of the platform or language. In addition, SOAP is a lightweight protocol, requiring a minimal amount of overhead. Further, SOAP runs over HTTP, which allows access though firewalls. Another advantage is that SOAP can run over multiple transport protocols such as HTTP, SMTP, and FTP. In addition, SOAP is based on XML which is a highly recognized language used within the Web community. Indeed, SOAP/XML is gaining increasing popularity in B2B transactions and other non-telephony applications. SOAP/XML is appealing to the Web and IT development community due to the fact that is a current technology which they are familiar with. Further, SOAP can carry XML documents (such as images, etc).

In the case of DSR, SOAP presents the advantage to be a standard and extensible mechanism for the exchange of RPC calls. The capability of SOAP to piggy back on top of SIP (and other transport protocols like TCP/IP and HTTP) make it transparent to the transport mechanism and it guaranteed that it can tunnel when transported by HTTP. In addition, SOAP is an ideal protocol to implement on top of HTTP DOM remote control (multi-modal synchronization) and to support WSDL to treat speech engines and audio subsystems as web services.

On the other hand, SOAP is based on XML and as such it is sometimes excessively verbose, which results into higher bandwidth requirements and lower efficiencies compared to imperative implementations (RPC, RMI, CORBA). In addition, processing generic SOAP messages requires a SOAP engine, including a XML parser. All terminal may not be able to run SOAP engines. Even when within the capabilities of the terminal equipment/client, the networks operators, service providers and users may decide to avoid such verbose exchanges.

Figure 24:
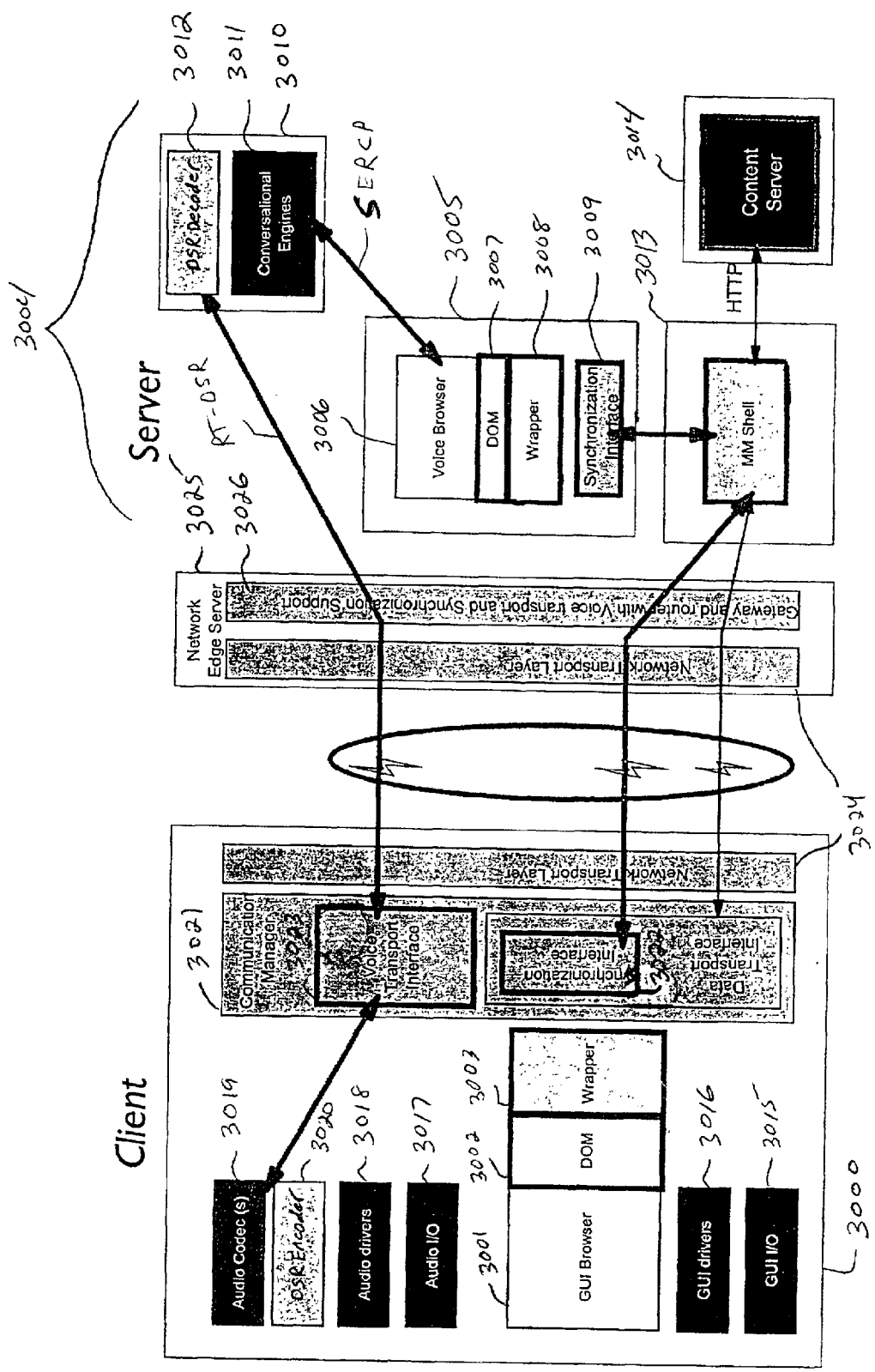
FIG. 24 is diagram illustrating an exemplary implementation for DSR with SERCP, for a thin client multi-modal browser application.
Figure 25:
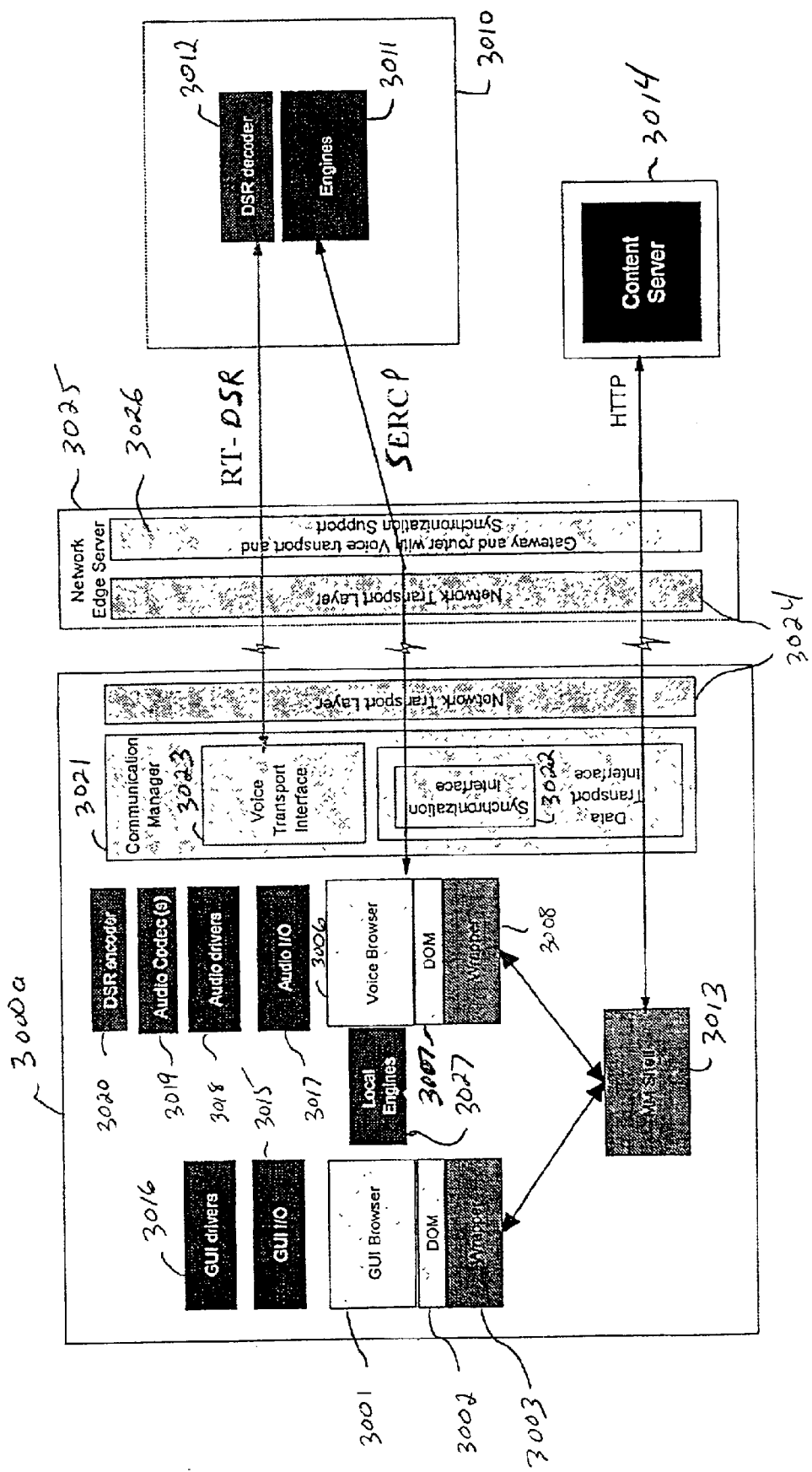
FIG. 25 is diagram illustrating an exemplary implementation for DSR with SERCP, for a fat client multi-modal browser application.

In summary, in a preferred embodiment, DSR session control is preferably implemented via SOAP over SIP, HTTP (MEXE) or in-band. The DSR session control layer preferably supports SDP (and extensions thereof) over SIP and provides capability description, optional support, codec negotiation, codec identification, multiple codecs, and dynamic codec switches FIGS. 24 and 25 are diagrams illustrating exemplary implementations for DSR with SERCP. In particular, FIGS. 24 and 25 are, respectively, diagrams of thin and fat client distributed MVC (model-view-controller) DOM-based multi-modal browser systems that implement a DSR communication stack according to the present invention. In both exemplary embodiments, a DOM interface and associated mechanisms are preferably implemented with conventional browsers (such as WML and VoiceXML browsers) (such as described in the above-incorporated U.S. patent application Ser. No. 10/007,092) to provide support for browser control and event notification in a multi-modal browser using event specifications and, e.g., DOM L2 event specifications.

The thin client framework depicted in FIG. 24 comprises client device 3000 comprising a GUI browser 3001 and associated DOM and wrapper layers 3002, 3003, wherein server-side processing 3004 comprises a server 3005 comprising a Voice browser 3005 and associated DOM and wrapper layers 3007, 3008. Server-side components further comprise an engine server 3010 that supports a plurality of conversational engines 3011 (speech reco, etc.) and DSR decoders 3012. Server-side components further comprise a multi-modal shell server 3013 and content server 3014.

As explained in detail in the above-incorporated U.S. patent application Ser. No. 10/007,092, the use of a DOM interface enables the implementation of a multi-modal browser using conventional channel-specific browsers (e.g., HTML, XHTML-MP and WML browsers) without requiring changes to the program code of such channel-specific browsers. Further, the DOM interfaces 3002, 3007 provide mechanisms to enable the GUI browser 3001 and Voice browser 3006 to be at least DOM Level 2 compliant. The DOM interfaces comprise supporting mechanisms for controlling the browsers and mechanisms for event notification. Further, each wrapper 3003, 3008 comprises interfaces and filters to the different views (browsers) (e.g., the wrappers implement a DOM filter and interfaces). The wrappers 3003, 3008 support granularity of the synchronization between the different channels by filtering and buffering DOM events. Although the wrappers 3003, 3008 can implement the support for synchronization protocols (i.e., the protocols for synchronizing the browsers 3001, 3006), the synchronization protocols are supported by a separate module (as explained below). The wrappers 3003, 3008 and/or the synchronization protocols implement the information exchange behind the MVC framework: when the user interacts on a View (via a (controller) browser), the action impacts a Model (which is supported by the multi-modal shell 3013) that updates the Views. The multi-modal shell 3013 (which comprises a Model in the MVC framework) preferably maintains the state of the application, manages the synchronization between the supported Views, and/or manages the interface with the backend 3014.

The logical software modules on the client device 3000 comprise GUII/O drivers 3016 and I/O peripherals 3015 which are controlled through the GUI browser 3001. Similarly, components of an audio system comprising audio drivers 3018, audio codecs 3019, DSR encoders 3020 and audio I/O peripherals 3017 are accessed through an audio subsystem The browser wrappers 3003, 3008 are built around the DOM interface (or DOM-like interfaces) to provide reuse of existing (DOM compliant) browsers or minimize the changes to the GUI browser. In the embodiment of FIG. 24, the wrappers 3003, 3008 do not implement the support of the synchronization protocols. Instead, on the client side, a communication manager 3021 supports synchronization protocols 3022 for processing event information. On the server side, a synchronization manager 3009 employs synchronization protocols for processing UI event information.

The communication manager 3021 (client side) captures the communication functions provided by a UI manager. The communication manager 3021 further supports DSR (voice coding and transport protocols 3023) for transport and control of encoded voice data (e.g., DSR optimized encoded data) to the DSR decoders 3012 for decoding (as described herein) and the engines 3011 for server-side processing.

The communication manager 3021 further provides support of synchronization protocols 3022, which protocols are used for synchronizing the browser as described above. The page push and pull functions can be implemented using HTTP or WSP, for example. Further, the synchronization protocols 3022 may further comprise protocols to remotely control the engines 3010. Protocols to remotely control conversational engines can be part of the synchronization protocols, or a stand-alone protocol (such as SERCP as described herein) when the conversational remote control protocols do not involve the client. For example in the embodiment of FIG. 24, SERCP are used on the server-side for communication between the voice browser 3006 and the conversational engines 3010.

An EDGE server 3025 provides all the necessary interfaces to identify the client device 3000, communicate with the client over the network and interface with the backend intranet (TCP/IP; HTTP) to convert client and server request across the different network protocols. The gateway 3026 performs the UI server function (but we emphasize the fact that it integrates with existing gateways). The EDGE server 3025 further supports voice transport, synchronization and remote control protocols between client and server components.

The conversational engines 3011 comprise backend speech recognition and TTS as well as any other speech engine functionality required by the speech channel. The engines are designed to support the selected voice coding and transport protocols. This may be DSR, but as explained above, it is not limited to DSR solutions. The engines can be distributed with respect to the voice browser 3006, which requires remote control of the engines (e.g., SERCP) from the Voice browser 3006 via conversational remote control protocols (control and event notification).

FIG. 25 comprises a fat client architecture comprising a client side GUI browser 3001, Voice Browser 3006, conversational (local) engines 3027 (typically limited), synchronization protocols 3022 to support the distributed conversational control protocols (e.g., SERCP) for remotely controlling the server-side distributed conversational engines 3011. This comprises a hybrid client-server solution. This architecture can exist with other variations where for example a VoiceXML browser can be on the client and as well as on the server and one will be used versus an other depending on the application or task at hand.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

Exemplary Embodiments of DSR Session Control Protocols

The following section provides further details regarding preferred embodiments of a DSR session control protocol for a DSR framework as described above. As noted above, one preferred DSR framework implements: SDP over SIP with a DSR codec syntax for codec description and selection; and SOAP over SIP to transmit: (i) capability/support description; (ii) supported codec negotiations (lists, 3-message or more when parameter settings must be exchanged); and (iii) speech meta-information exchanges.

Any other extensible mechanisms compatible with the 3GPP framework can be implemented, for example.

DSR SDP Syntax

Figure 27:
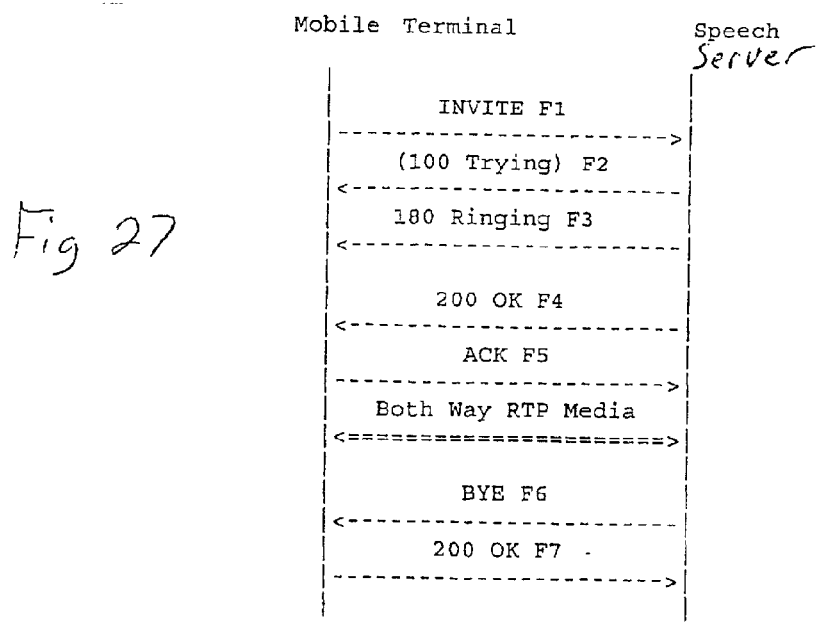
FIG. 27 is diagram illustrating method for initiating a DSR session according to one aspect of the invention

A preferred DSR SDP syntax is adapted from SDP, with modifications to extend the framework to possibly other negotiated codecs. The message flow is preferably based on SIP version 2.0. FIG. 27 is an exemplary diagram of SIP/DSP message exchanges (for a successful session setup and termination) between a client (mobile terminal) and speech server assuming a session initiated by the client. In this scenario, the Mobile Terminal (LittleGuy sip: UserA@here.com) completes a call to the Speech Server (BigGuy sip: UserB@there.com) directly. Again, a realistic scenario in 3GPP will include several SIP proxies (e.g. I-CSCF, P-CSCF, S-CSCF) between the Mobile Terminal and the Speech Server. The message flows show session initiation, exchange of media information in SDP payloads, media session establishment, and finally session termination.

SDP can be sent in the SIP INVITE or in subsequent messages. The Mobile Terminal or the Speech Server may send the initial SDP. The value of the content-length field may not be accurate. Details on the different parameters can be found in specs of SDP (see RFC). The following messages have been modified to include the SDP syntax that corresponds to a DSR codec on the uplink and a conventional codec on the downlink (e.g. AMR). The client and server can negotiate the codecs to exchange a narrow list. In the present case, the codecs are actually the default uplink and downlink codecs.

F1 INVITE Mobile Terminal->Speech Server
INVITE sip:UserB@there.com SIP/2.0
Via: SIP/2.0/UDP here.com:5060
From: BigGuy
To: LittleGuy
Call-ID: 12345601@here.com
CSeq: 1 INVITE
Contact: BigGuy
Content-Type: application/sdp
Content-Length: 147
v=0
s=Session SDP
t=0 0
o=user 2890844526 2890842807 IN IP4 192.16.64.4
c=IN IP4 192.16.64.4
m=audio 49230 RTP/AVP 96
a=sendonly
a=rtpmap:96 Aurora/DSR/8000/N
a=fmtp:96 fe=0/maxptime=60
m=audio 48230 RTP/AVP 97
a=recvonly
a=rtpmap:97 AMR/8000
a=fmtp:97 mode-set=0,2,5,7; mode-change-period=2; mode-change-neighbor;
maxframes=1

Note the change of codec naming to adapt SDP to the nomenclature as described above. If other codecs are used, the SDP syntax must follow the DSR naming convention and we must adapt the parameters to the characteristics of the DSR codecs.

F2 (100 Trying) Speech Server->Mobile Terminal
SIP/2.0 100 Trying
Via: SIP/2.0/UDP here.com:5060
From: BigGuy
To: LittleGuy
Call-ID: 12345601@here.com
CSeq: 1 INVITE
Content-Length: 0

F3 180 Ringing Speech Server->Mobile Terminal
SIP/2.0 180 Ringing
Via: SIP/2.0/UDP here.com:5060
From: BigGuy
To: LittleGuy;tag=8321234356
Call-ID: 12345601@here.com
CSeq: 1 INVITE
Content-Length: 0

F4 200 OK Speech Server->Mobile Terminal
SIP/2.0 200 OK
Via: SIP/2.0/UDP here.com: 5060
From: BigGuy
To: LittleGuy;tag-8321234356
Call-ID: 12345601@here.com
CSeq: 1 INVITE
Contact: LittleGuy
Content-Type: application/sdp
Content-Length: 147
v=0
o=system 22739 7244939 IN IP4 1.2.3.4
c=IN IP4 1.2.3.4
s=Session SDP
t=0 0
m=audio 4564 RTP/AVP 96
a=recvonly
a=rtpmap: 96 Aurora/DSR/8000/N
a=fmtp: 96 fe=0/maxptime=60
m=audio 5564 RTP/AVP 97
a=sendonly
a=rtpmap:97 AMR/8000
a=fmtp:97 mode-set=0,2,5,7; mode-change-period=2; mode-change-neighbor;
maxframes=1

F5 ACK Mobile Terminal->Speech Server
ACK sip: UserB@there.com SIP/2.0
Via: SIP/2.0/UDP here.com:5060
From: BigGuy
To: LittleGuy ;tag=8321234356
Call-ID: 12345601@here.com
CSeq: 1 ACK
/* RTP streams are established between A and B */
/* User B Hangs Up with User A. Note that the CSeq is NOT 2, since User A and User B maintain their own independent CSeq counts. (The INVITE was request 1 generated by User A, and the BYE is request 1 generated by User B) */

F6 BYE Speech Server->Mobile Terminal
BYE sip: UserA@here.com SIP/2.0
Via: SIP/2.0/UDP there.com:5060
From: LittleGuy ;tag=8321234356
To: BigGuy
Call-ID: 12345601@here.com
CSeq: 1 BYE
Content-Length: 0

F7 200 OK Mobile Terminal->Speech Server
SIP/2.0 200 OK
Via: SIP/2.0/UDP there.com:5060
From: LittleGuy ;tag=8321234356
To: BigGuy
Call-ID: 12345601@here.com
CSeq: 1 BYE
Content-Length: 0

SOAP over SIP

The following options can be considered to implement SOAP over SIP:

By relying on the SIP INFO method (and 200 OK reply)

By relying on the SIP INVITE method (and 200 OK reply)

By relying on a new SIP SERVICE method

In one embodiment, SOAP messages are exchanged as follows:

```
INVITE sip:server@speechserver.foo SIP/2.0
From: Client<sip: frontend@speechclient.foo.com>
Call-ID: 123456@speechclient.foo.com
Content-Type: multipart/mixed; boundary="----zzzz"
Cseq: 1234 INVITE
Subject: soap exchange
------zzzz
//Will contain whatever information may be required by the network provider
//(e.g. 3GPP) if needed or may contain SDP messages if the request includes a//new
codec selection or description. This section may be missing
------zzzz
Content-Type: text/xml; charset="utf-8"
<SOAP-ENV:Envelope
xmlns : SOAP-ENV="http ://schemas.xmlsoap.org/soap/envelope/"
SOAP-ENV:encodingStyle=
    "http://schemas.xmlsoap.org/soap/encoding/">
    <SOAP-ENV:Body>
        <m:SOAPmethodXXX xmlns:m="Some-URI">
            <parameter1 value=...></Parameter1>
            ...
            <parameterN value=...></ParameterN>
        </m: SOAPmethodXXX>
    </SOAP-ENV:Body>
</SOAP-ENV:Envelope>
------zzzz
// Other SOAP methods can be similarly passed in the same request
// This section may be missing
------zzzz
```

The INVITE method can be replaced by INFO, SERVICE and 200 OK to answer. We recommend using the INFO method (200 OK) if supported by 3GPP Release 5. Otherwise, we will use the INVITE/200 OK methods. This should guarantees support of the protocol. In general, we assume that a client should support incoming SOAP request, independently of the SIP method used to carry it. In the rest of this section, we assume that when INVITE examples are provided, it can be replaced by INFO, 200 OK or SERVICE, if supported by the network.

Poor Mans SOAP: SOAP Over SDP

We know that SOAP and XML parsers may impose too heavy constraints on some clients. This may be a concern for numerous vendors. Therefore, alternatives are recommended. First, for client able to handle the minimum set of speech meta-information exchanged over SOAP, it is easy to parse the parameters without needing a SOAP engine. Second, for clients even unable to do so, we recommend using SDP, with the following settings:

INVITE sip: server@speechserver.foo SIP/2.0
From: Client <sip:frontend@speechclient.foo.com>
Call-ID: 1234567@speechclient.foo.com
Cseq: 1234 INVITE
Content-Type: application/sdp
Content-Length: 147
v=0
s=Session SDP
t=0 0
o=user 2890844526 2890842807 IN IP4 192.16.64.4
c=IN IP4 192.16.64.4
m=audio 49230 RTP/AVP 96
a=sendonly
a=rtpmap:96 Aurora/SOAP/0/N
a=fmtp:96 method=SOAPmethodXXX; parameter1=xx; ... ; parameterN=. . .
m=audio 48230 RTP/AVP 97
a=recvonly
a=rtpmap: 97 Aurora/SOAP/0/N
a=fmtp: 97

Where Aurora/SOAP/0/N is used a default fake codec to indicate passage of parameters to emulate a SOPA exchange. There are probably other more efficient alternatives that can be considered—for example passing the parameters textually as a text MIME type.

DSR Session Control on SOAP and Conventions

In what follows, we assume that SOAP parameters and methods for DSR session control are exchanged by one of the methods described above. The rest of this section illustrates how the INVITE, 200 OK, INFO or SERVICE can be similarly used. Each section may be missing. For example: DSR codec list exchanges are in SOAP only, then SDP only with exchange of codec settings, then pure meta-information in SOAP until a change of codec is requested. Header are to be adapted with the syntax that may be required by 3GPP.

```
INVITE sip:server@speechserver.foo SLP/2.0
From: Client <sip:frontend@speechclient.foo.com>
Call-ID: 123456@speechclient.foo.com
Content-Type: multipart/mixed; boundary="----zzzz"
Cseq: 1234 INVITE
Subject: soap exchange
------zzzz
//SIP Session initiation and SDP exchange
------zzzz
Content-Type: text/xml; charset="utf-8"
<SOAP-ENV:Envelope
xmlns:SOAP-ENV="http://schemas.xmlsoap.org/soap/envelope/"
SOAP-ENV:encodingStyle=
    "http://schemas.xmlsoap.org/soap/encoding/">
```

-continued

```
<SOAP-ENV:Body>
    <m:DSRsessioncontrolfunction xmlns:m="Some-URI">
        <parameter1 value=...></Parameter1>
        ...
        <parameterN value=...></ParameterN>
    </m: DSRsessioncontrolfunction>
</SOAP-ENV:Body>
</SOAP-ENV:Envelope>
------zzzz
// Other SOAP methods can be similarly passed in the same request
// This section may be missing
------zzzz
```

In what follows, we propose a limited set of simple message methods and information types that can be supported even without supporting full SOAP capabilities as discussed above. Extensibility of the protocols beyond the proposed format, as offered by SOAP, may require a SOAP engine. Also, some meta-information information require specific data structures that will not be specified herein.

Meta-information Syntax Proposed Specification

In a preferred embodiment, session initiation is performed using SIP and SDP, but with an additional pre-exchange of the codec support capabilities within the DSR control layer. Dynamic codec switches are then performed following, with possible transmission of the frame switch value. Preferably, all the other speech meta-information is sent through SOAP over SIP that will consist of two sets of exchanges: (i) prearranged meta-information that would not require client and server to implement support for a full SOAP/XML engine as discussed above; and (ii) other meta-information is then exchanged within the SOAP framework and may require a SOAP engine. If the information is not understood or supported, it is returned in the OK message.

Exchange of Meta-Information using SOAP Over SIP

As discussed above, requests are sent through SIP INVITE or INFO. Responses are returned through 200 OK. The following is an example of the SOAP over SIP message structure (with INVITE—for INFO replace INVITE by INFO):

```
INVITE sip: server@speechserver.foo SIP/2.0
From: Client <sip:frontend@speechclient.foo.com>
Call-ID: 123456@speechclient.foo.com
Content-Type: multipart/mixed; boundary="----zzzz"
Cseq: 1234 INVITE
Subject: soap exchange
------zzzz
//Will contain whatever information may be required by the network provider
//(e.g. 3GPP) if needed or may contain SDP messages if the request includes a //new
codec selection or description. This section may be missing
------zzzz
Content-Type: text/xml; charset="utf-8"
<SOAP-ENV:Envelope
    xmlns:SOAP-ENV="http://schemas.xmlsoap.org/soap/envelope/"
    SOAP-ENV:encodingStyle=
        "http://schemas.xmlsoap.org/soap/encoding/">
    <SOAP-ENV:Body>
        <m:PassDSRSpeechMetaInformation xmlns:m="Some-URI">
            <parameter1 value=...></Parameter1>
            ...
            <parameterN value=...></ParameterN>
        </m: PassDSRSpeechMetaInformation>
    </SOAP-ENV:Body>
</SOAP-ENV: Envelope>
------zzzz
// Other SOAP methods can be similarly passed in the same request
// This section may be missing
------zzzz
The main method defined in the present context is PassDSRspeechMetainformation. The
200 OK Message contains a SOAP envelope as follows:
------zzzz
Content-Type: text/xml; charset="utf-8"
<SOAP-ENV:Envelope
    xmlns:SOAP-ENV="http://schemas.xmlsoap.org/soap/envelope/"
    SOAP-ENV:encodingStyle=
        "http://schemas.xmlsoap.org/soap/encoding/">
    <SOAP-ENV:Body>
        <m:AnswerDSRSpeechMetaInformation xmlns:m="Some-URI">
            <answer1 value="OK"></answer1>
            ...
            <answerK value="UNKNOWN"></answerK>
            <answerN value=...></answerN>
        </m: AnswerDSRSpeechMetaInformation>
    </SOAP-ENV:Body>
</SOAP-ENV:Envelope>
------zzzz
//This section may contain new calls and event handlers call for the previous //messages.
This session may be missing
------zzzz
```

AnswerDSRSpeechMetaInformation provides confirmation of receipt and support for this type of speech meta-information.

Initiators of requests and responses can be the client as well as the server.

Syntax for Speech Meta-Information

This section relies on the meta-information described above and proposes some syntax directions. Several categories are labelled as unspecified. At this stage, these extensions can be specified by vendors or application developers using their own SOAP messages and methods. Meta-information with established syntax must be passed with PassDSRSpeechMetaInformation and AnswerDSRSpeechMetaInformation in the 200 OK message. Extension parameters can also be passed within the same message. The propose list is still purely illustrative. Parameters may still be missing and other structure considered. However, it may be sufficient as proposal for 3GPP Release 5.

The symbol [ ] designates optional attributes, "xxx" designates attribute values. Italic explains but does not specify the syntax for other attributes. Indeed, some depend on finalizing the specification of the RTP payload, references (time, frames etc . . . ), units to be used (ms, s, . . . ), etc.

It should be clear that systems that do not provide a SOAP/XML parser can directly process the parameters as they can process SDP syntax.

"Unspecified" means that the actual syntax details are not important. Multiple could be proposed.

Frame Description
<DSRframedefinition
Frame=number of ms
FrameOverlap=frameoverlap in ms
Frameperpacket=numberof frames per RTP packet
callID=RTP SIP call ID of affected RTP stream>
</DSRframedefinition>
Frame Reference
</DSRfirstreference
framefirst=index of first frame of session
timefirst=time of beginning of first frame of session
packetfirst=packet number of first frame of session
callID=RTP SIP call ID of affected RTP stream>
</DSRfirstreference>
Other items can be similarly declared by the different participants: units of noise level, reference noise level in dB, etc . . .
Speech/non-speech Information
  Beginning of Speech Notification
<DSRmarker
Type="BeginSpeech"
Packet=packet number of beginning of speech
Frame=frame number of beginning of speech
[Time=time of beginning of speech]
[Who=(source|engine|intermediary)]
[WhoID=IP address of who determined the beginning of speech]
callID=RTP SIP call ID of affected RTP stream >
</DSRmarker>
End of Speech Notification
<DSRmarker
Type="EndSpeech"
Packet=packet number of end of speech
Frame=frame number of end of speech
[Time=time of end of speech]
[Who=(source|engine|intermediary)]
[WhoID=IP address of who determined the end of speech]
callID=RTP SIP call ID of affected RTP stream >
</DSRmarker>
Silence Detection
<DSRmarker
Type="BeginSilence"
Packet=packet number of beginning of silence
Frame=frame number of beginning of silence
[Time=time of beginning of silence]
Frameduration=Amount of frame of silence.
[Timeduration=Duration of silence]
[Who=(source|engine|intermediary)]
[WhoID=IP address of who determined the beginning of silence]
callID=RTP SIP call ID of affected RTP stream >
</DSRmarker>
Additional markers can be provided to overwrite the duration by extending the silence or shortening it.
End-Point Estimate
<DSRmarker
Type="endpoint"
Packet=packet number of beginning of speech
Frame=frame number of beginning of speech
[Time=time of beginning of speech]
[Who=(source|engine|intermediary)]
[WhoID=IP address of who determined the beginning of speech]
callID=RTP SIP call ID of affected RTP stream>
</DSRmarker>
Barge-in Detection or Attention
End of Played Prompt:
<DSRmarker
Type="bargeinattention"
Packet=packet number of end of prompt
Frame=frame number of end of prompt (if transmitted)
[Time=time of end of prompt]
[Who="source"]
[WhoID=IP address of client]>
[promptURI=URI of prompt (text, annotated text or audio file)]
[beginpacket=packet number of prompt audio sample interleaved in RTP stream]
[endpacket=packet number of prompt audio sample interleaved in RTP stream]
[othercallID=RTP SIP call ID of another RTP stream that ships the prompt audio sample]
callID=RTP SIP call ID of affected RTP stream>
</DSRmarker>
Barge-in Events:
<DSRmarker
Type="bargeinevent"
Packet=packet number of beginning of barge-in
Frame=frame number of beginning of barge-in
[Time=time of beginning of barge-in]
[Who="source"]
[WhoID=IP address of client]
callID=RTP SIP call ID of affected RTP stream >
</DSRmarker>
DTMF Support
Decoded DTMF Strings
<DSRannotation
Type="DTMFresult"
DTMFvalues=recognized string or isolated DTMF value (depending how DTMF recognizer has been programmed
StartFrame=frame number of beginning of recognized DTMF
EndFrame=frame number of end of recognized DTMF
[StartTime=time of start of recognized DTMF]
[EndTime=time of end of recognized DTMF]
Frameduration=Amount of frame of recognized DTMF

[Timeduration=Duration of recognized DTMF ]
Framedurationvector=Vector of amount of frame of per recognized DTMF element]
[Timeduration=Vector of duration per recognized DTMF element]
[Who="source"]
[WhoID=IP address of client]
callID=RTP SIP call ID of affected RTP stream >
</DSRannotation>
DTMF duration can be Key for Particular Applications Programmed by Value and Duration.
DTMF Detection Events
<DSRmarker
Type="DTMFevent"
Packet=packet number of beginning of DTMF
Frame=frame number of beginning of DTMF
[Time=time of beginning of DTMF]
Frameduration=Amount of frame of DTMF]
[Timeduration=Duration of DTMF]
[Who=(source|engine|intermediary)]
[WhoID=IP address of who determined the beginning of speech]
callID=RTP SIP call ID of affected RTP stream>
</DSRmarker>
Additional markers can be provided to overwrite the duration by extending the DTMF.
Front-end and Noise Compensation Parameters
Tuning parameters for silence detection, speech detection via settings to control.
Unspecified.
This is left for now as speech vendor or integrator specific exchanges.
Front-End Parameters
Unspecified
This is left for now as speech vendor specific exchanges
Background Noise Level
<DSRannotation
Type="Noiselevel"
Noiselevel=estimated noise level
StartFrame=frame number of beginning of estimated noise
[EndFrame=frame number of end of estimated noise]
[StartTime=time of start of recognized DTMF]
[EndTime=time of end of recognized DTMF]
[Who=(source|engine|intermediary)]
[WhoID=IP address of who estimated the noise level]
[URInoisesample=URI of sample of noise or similar noise]
[beginpacket=packet number of first noise sample interleaved in RTP stream]
[endpacket=packet number of last noise sample interleaved in RTP stream]
[othercallID=RTP SIP call ID of another RTP stream that ships the noise samples]
callID=RTP SIP call ID of affected RTP stream >
</DSRannotation>
Client Messages
Client Settings
<DSRsettings
Type="clientsettings"
Clienttype=client model and vendor string identifier
Packet=packet number of setting estimate
Frame=frame number of setting estimate
[Time=time of setting estimate]
[Volumelevel=Volume level]
[Microphonemodel=model of the client]
[Speechmode=(dictation|Command)]
[Interactionlevel=(interactive|batch)]
[URIClientprofile=URI of client profile (e.g. UAProf or CC/PP. Includes some user preferences]
[echospokentext=(yes|no)]
[echorecognizedtext=(yes|no)]
[Who=(source|engine|intermediary)]
[WhoID=IP address of who determined the settings]
callID=RTP SIP call ID of affected RTP stream >
</DSRsettings>
Numerous other settings are unspecified but can be directly added to this message. They can be considered for now as client, speech vendor or application specific exchanges.
Client Events
<DSRmarkers
Type="clientevents"
Packet=packet number of events
Frame=frame number of events
[Time=time of events]
[Volumelevel=new Volume level]
[Deltavolumelevel=change of volume level]
[Microphonemodel=new model of the client]
[Speechmode=new (dictation|Command)]
[Interactionlevel=new (interactive|batch)]
[echospokentext=new (yes|no)]
[echorecognizedtext=new (yes|no)]
[Who=(source|engine|intermediary)]
[WhoID=IP address of who changed the settings]
callID=RTP SIP call ID of affected RTP stream >
</DSRmarkers>
<DSRannotation
Type="pushtotalk"
StartFrame=frame number of push to talk
EndFrame=frame number of push to talk
[StartTime=time of start of push to talk]
[EndTime=time of end of push to talk]
[Who="source"]
[WhoID=IP address of client]
callID=RTP SIP call ID of affected RTP stream>
</DSRannotation>
Numerous other events are unspecified but can be directly added to this message. They can be considered for now as client, speech vendor or application specific exchanges.
Externally Acquired Parameters
<DSRmarkers
Type="externalevents"
Packet=packet number of events
Frame=frame number of events
[Time=time of events]
[event information]
[Who=(source|engine|intermediary)]
[WhoID=IP address of who acquired the event]
callID=RTP SIP call ID of affected RTP stream >
</DSRmarkers>
Event information is passed as additional unspecified parameters within this proposed structure. As discussed earlier, examples of such events can include:
  Speed in a car environment.
  Local noise level
  Noise level changes
  ID of selected input microphone in microphone array/multiple microphone systems.
They can be considered for now as client or application specific exchanges.
Speaker identity (local recognition) can be transmitted as follows:
<DSRannotation
Type="speakerlabel"
StartFrame=frame number of push to talk
EndFrame=frame number of push to talk
[StartTime=time of start of push to talk]

[EndTime=time of end of push to talk]
SpeakerID=Speaker identity
[NbestspeakerID=list of Nbest speakers]
[SpeakerIDscore=score of ID or Nbest lists]
[Who="source"]
[WhoID=IP address of client]
callID=RTP SIP call ID of affected RTP stream >
</DSRannotation>
Security
Unspecified
They can be considered for now as client, speech vendor or application specific exchanges.
Annotations
Local Recognition Estimates
<DSRannotation
Type="Speechresults"
Speechresults=recognized text (string, isolated words or attribute value pairs depending how engines have been programmed)
[scores/results/information]
StartFrame=frame number of beginning of recognized results
EndFrame=frame number of end of recognized results
[StartTime=time of start of recognized results]
[EndTime=time of end of recognized results]
[Who=(source|engine|intermediary)]
[WhoID=IP address of who performed the recognition]
callID=RTP SIP call ID of affected RTP stream >
</DSRannotation>
Results are passed as additional unspecified parameters within this proposed structure. They can be considered for now as speech vendor specific exchanges.
Data Files Updates
Unspecified
They can be considered for now as speech vendor or application specific exchanges.
Application Specific
Unspecified
They can be considered for now as application specific exchanges.
Speech Frame Markers
<DSRmarker
Type="codecswitch"
Packet=packet number of codec switch
Frame=frame number codec switch
[Time=time of codec switch]
Oldcodec=old codec ID
Newcodec=new codec ID
callID=RTP SIP call ID of affected RTP stream >
</DSRmarker>
Guaranteed Transmission Exchanges
<DSRannotation
Type="transmissionguarantee"
StartPacket=packet number of beginning of frame to guarantee delivery
EndPacket=packet number of end of frame to guarantee delivery
[Who=(source|engine|intermediary)]
[WhoID=IP address of who performed the recognition]
callID=RTP SIP call ID of affected RTP stream >
</DSRannotation>
Functions to request retransmissions, changes of priorities of packets, etc . . . is unspecified. They can be considered for now as application/integrator specific exchanges. It may be advantageous to address specification of this for the 3GPP submission or at least further discuss an appropriate mechanism.
Application Specific Exchanges
Unspecified
They can be considered for now as application specific exchanges.
Call Control Instructions
Unspecified
They can be considered for now as integrator or application specific exchanges. It may be advantageous to address specification of this for the 3GPP submission or at least further discuss an appropriate mechanism.
At some point this will have to be related to the W3C voice activity call control work. Depending on the functionality added for cal control instructions, this formalism will enable to address numbers of the requirements in the W3C work, actually in a broader framework that just VoiceXML voice browsers.
Information On Other Audio Streams
<DSRframedefinition
Frame=number of ms
Frameinotherstream=frame number in other RTP stream
othercallID=RTP SIP call ID of another RTP stream
callID=RTP SIP call ID of affected RTP stream>
</DSRframedefinition>
Codec Negotiation
The following parameters are preferably described in the SDP exchange: (i) Codec name (this also provides information on sampling rate, reconstruction support); (ii) Frame duration; (iii) Frameshift; (iv) Frame per multiframe or other unit; (v) ADUs per packet; (vi) Size and format of ADU; (vii) Feature dimension.
The meta-information should enable setting at least the following parameters: (i) Other front-end parameters for parametric front-ends; (ii) VAD scheme and parameter configuration.
First Leg: SOAP Over SIP
Uplink Initiation:
Codec List Communication:

------zzzz

Content-Type: text/xml; charset="utf-8"
<SOAP-ENV:Envelope
    xmlns:SOAP-ENV="http://schemas.xmlsoap.org/soap/envelope/"
    SOAP-ENV:encodingStyle=
        "http ://schemas.xmlsoap.org/soap/encoding/">
        <SOAP-ENV:Body>
            <m:DSRcodeclistcomparerequest xmlns:m="Some-URI">
                <codecname1 value=...></codecname1 ><codecmode1 value=...></codecname 1>

```
            ...
            <codecnameN value=...></codecnameN><codecmodeN
value=...></codecnameN>
          </m:DSRcodeclistcomparerequest>
       </SOAP-ENV:Body>
    </SOAP-ENV:Envelope>
------zzzz
```
Where codecmode value can be set to sendonly, receiveonly or sendreceive.
Codec list response:
------zzzz
```
Content-Type: text/xml; charset="utf-8"
<SOAP-ENV:Envelope
    xmlns:SOAP-ENV="http://schemas.xmlsoap.org/soap/envelope/"
    SOAP-ENV:encodingStyle=
       "http://schemas.xmlsoap.org/soap/encoding/">
       <SOAP-ENV:Body>
          <m:DSRcodeclistcompareanswer xmlns:m="Some-URI">
             <codecname1 name=...></codecname><codecmode1 value=...></codecname1>
             ...
             <codecname name=...></codecname><codecmodeN value=...></codecnameN>
          </m:DSRcodeclistcompareanswer>
       </SOAP-ENV:Body>
    </SOAP-ENV:Envelope>
------zzzz
```

This is followed by SIP/SDP session initialisation on the appropriate codec name. Compatible codecs are now known. A few may be included in SDP if we expect periodic changes between these.

Upon selection of the codec and initiation of the session, the client or the server can send codec settings for the selected codec.

```
-------zzzz
Content-Type:text/xml; charset="utf-8"
<SOAP-ENV:Envelope
    xmlns:SOAP-ENV="http://schemas.xmlsoap.org/soap/envelope/"
    SOAP-ENV:encodingStyle=
       "http://schemas.xmlsoap.org/soap/encoding/">
       <SOAP-ENV:Body>
          <m:DSRcodecset xmlns:m="Some-URI">
             <codecname>selectedcodecname</codecname>
             <codecparameter1 value=...></codecparameter1>
             ...
             <codecparameterN value=...></codecparameterN>
          </m:DSRcodecset>
       </SOAP-ENV:Body>
    <SOAP-ENV:Envelope>
------zzzz
with an answer:
------zzzz
Content-Type:text/xml; charset="utf-8"
<SOAP-ENV:Envelope
    xmlns:SOAP-ENV="http://schemas.xmlsoap.org/soap/envelope/"
    SOAP-ENV:encodingStyle=
       "http://schemas.xmlsoap.org/soap/encoding/">
       <SOAP-ENV:Body>
          <m:DSRcodecsetconfirm xmlns:m="Some-URI">
             <codecname value=selectedcodecname></codecname>
             <confirmation value="OK"></confirmation>
          </m:DSRcodecsetconfirm>
       </SOAP-ENV:Body>
    </SOAP-ENV:Envelope>
------zzzz
```

This must be repeated the other way for the downlink initiation.

Codec settings can be changed at anytime through the speech-meta-information exchange. Codec switches is performed by re-inviting (and exchanging by meta-information the frame where the switch occurs).

Figure 28:
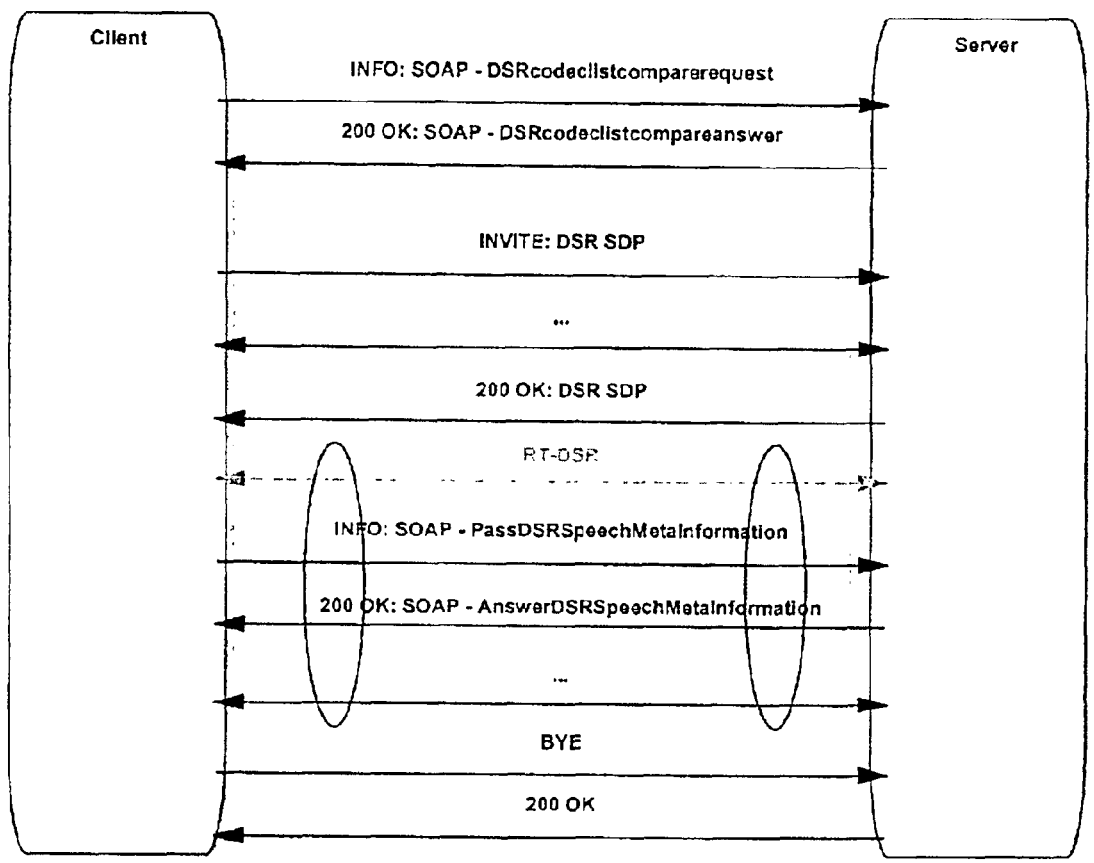
FIG. 28 is a diagram illustrating a DSR session exchange according to one aspect of the invention.

FIG. 28 illustrates the SDR session exchanges associated with a SOAP/SIP session the BYE and dynamic codec switches are symbolically in the last set of exchanges.

Optional Support

In another embodiment, to allow for minimization of the requirements on the client, we want to make optional the support for codec switches (codec negotiation or dynamic-codec switches) and exchanges of complex meta-information. Limited codec support is achieved by limited list of exchanged codec during negotiation. Meta-information support can be checked via SupportqueryDSR-SpeechMetaInformation and SupportconfirmDSRSpeech-MetaInformation.

```
INVITE sip:server@speechserver.foo STP/2.0
From: Client <sip:frontend@speechclient.foo.com>
Call-ID: 123456@speechclient.foo.com
Content-Type: multipart/mixed; boundary="----zzzz"
Cseq: 1234 INVITE
Subject: soap exchange
------zzzz
//Will contain whatever information may be required by the network provider
//(e.g. 3GPP) if needed or may contain SDP messages if the request includes a //new
codec selection or description. This section may be missing
------zzzz
Content-Type: text/xml; charset="utf-8"
<SOAP-ENV:Envelope
    xmlns:SOAP-ENV="http://schemas.xmlsoap.org/soap/envelope/"
    SOAP-ENV:encodingStyle=
        "http://schemas.xmlsoap.org/soap/encoding/">
        <SOAP-ENV:Body>
            <m:SupportqueryDSRSpeechMetaInformation xmlns:m="Some-URI">
                <parameter1 value="..."></Parameter1>
                    ...
                <parameterN value="..."></ParameterN>
            </m:SupportqueryDSRSpeechMetaInformation>
        </SOAP-ENV:Body>
    </SOAP-ENV:Envelope>
------zzzz
// Other SOAP methods can be similarly passed in the same request
// This section may be missing
------zzzz
```

In <parameter1></parameter1>, other mandatory attributed are present and left unset, set to a default value or set to attribute="".

The 200 OK message contains a SOAP envelop as follows:

```
------zzzz
Content-Type:text/xml; charset="utf-8"
<SOAP-ENV:Envelope
xmlns :SOAP-ENV="http://schemas.xmlsoap.org/soap/envelope/"
SOAP-ENV:encodingStyle=
    "http://schemas.xmlsoap.org/soap/encoding/">
    <SOAP-ENV:Body>
        <m:SupportconfirmDSRSpeechMetaInformation xmlns:m="Some-URI">
            <answer1 value="OK"></answer1>
                ...
            <answerK value="UNKNOWN"></answerK>
                <answerN value=...></answerN>
        </m:SupportconfirmDSRSpeechMetaInformation>
    </SOAP-ENV:Body>
</SOAP-ENV:Envelope>
------zzzz
//This section may contain new calls and event handlers call for the previous //messages.
This session may be missing
------zzzz
```

Support for dynamic codec switches is checked by exchanging the message:
    <m: SupportqueryDSRSpeechMetaInformation xmlns: m="Some-URI">
      <DSRSettings type="DSRdynamiccodecswitch"></DSRsettings>
    </m: SupportqueryDSRSpeechMetaInformation>

Support for switched between particular codec pairs is checked as follows:
    <m: SupportqueryDSRSpeechMetaInformation xmlns: m="Some-URI">
      <DSRSettings type="DSRdynamiccodecswitch"from= currentcodec to=newcodec></DSRsettings>
    </m: SupportqueryDSRSpeechMetaInformation>

When a codec switch is not supported, codec switch requests will be ignored by the systems that does not support it. Typically, this system will also not initiate such a codec switch request.

Unsupported meta-information is ignored by the recipient and accordingly acknowledged as UNKNOWN as described herein. Support check methods are provided, as described in the current section, to avoid sending useless information. Again, most of these messages can be exchanged without needing a full SOAP engine.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A system, comprising:

a DSR (distributed speech recognition) communication stack, the DSR communication stack comprising:

a session control layer for managing a communication session, negotiating an upstream and downstream codec at initiation of the session, dynamically switching the upstream or downstream codec during the session, managing an uplink data transmission comprising DSR encoded data, and for managing a downlink transmission comprising results of server-side speech processing; and a transport control layer comprising RTP (real-time protocol) for transmitting DSR encoded data and RTCP (real time control protocol) for controlling transmission of the DSR encoded data.

2. The system of claim 1, wherein the session control layer supports (i) SDP (session description protocol) over SIP (session initiation protocol) or (ii) SOAP (simple object access protocol) over SIP, or extensions thereof.

3. The system of claim 2, wherein the communication stack further comprises a transport layer that supports UDP.

4. The system of claim 2, wherein the communication stack further comprises a transport layer that supports TCP (transmission control protocol).

5. The system of claim 1, wherein the session control layer implements H.323.

6. The system of claim 1, wherein the communication stack exchanges speech meta-information in band using RTP.

7. The system of claim 1, wherein the communication stack exchanges speech meta-information out of band using the session control layer.

8. The system of claim 7, wherein the session control layer supports SIP.

9. The system of claim 1, wherein the communication stack exchanges speech meta-information out of band using RTCP.

10. The system of claim 1, wherein the communication stack exchanges speech meta-information via HTTP (hypertext transfer protocol).

11. The system of claim 1, wherein different DSR encoded data are transmitted on separate RTP streams.

12. The system of claim 1, wherein different DSR encoded data streams are transmitted sequentially in one RTP stream separated by a frame marker.

13. The system of claim 1, wherein the communication stack further comprises a mechanism for specifying when a DSR encoded data stream is to be transmitted with guaranteed delivery.

14. The system of claim 1, wherein the session control layer supports barge-in.

15. The system of claim 1, wherein the communication stack further comprises an engine control layer for remote control of conversational engines.

16. The system of claim 15, wherein the engine control layer exchanges meta information to determine engine capabilities and to reserve engines.

17. The system of claim 16, wherein the engine control layer supports RTSP (real time streaming protocol).

18. The system of claim 16, wherein the engine control layer supports WSDL (web services description language).

19. The system of claim 18, wherein the engine control layer supports WSDL over SOAP.

20. The system of claim 16, wherein the engine control layer supports SOAP (simple object access protocol) over RTSP.

21. A method for providing network communication, comprising the steps of:

establishing a network connection;

negotiating an initial uplink codec and an initial downlink codec;

determining conversational engine capabilities;

real-time transmitting DSR (distributed speech recognition) data encoded with a selected uplink codec scheme;

transmitting engine control data to remotely control an engine for processing the DSR data; and dynamically negotiating and switching between different uplink and/or downlink codecs during a communication session ni response to a predetermined request.

* * * * *